United States Patent
Ukai

(10) Patent No.: US 9,043,581 B2
(45) Date of Patent: May 26, 2015

(54) STORING IN OTHER QUEUE WHEN RESERVATION STATION INSTRUCTION QUEUE RESERVED FOR IMMEDIATE SOURCE OPERAND INSTRUCTION EXECUTION UNIT IS FULL

(75) Inventor: Masaki Ukai, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 516 days.

(21) Appl. No.: 13/373,386

(22) Filed: Nov. 14, 2011

(65) Prior Publication Data

US 2012/0173853 A1 Jul. 5, 2012

(30) Foreign Application Priority Data

Dec. 29, 2010 (JP) ................................ 2010-294382

(51) Int. Cl.
G06F 9/302 (2006.01)
G06F 9/30 (2006.01)
G06F 9/38 (2006.01)

(52) U.S. Cl.
CPC .......... *G06F 9/3016* (2013.01); *G06F 9/30141* (2013.01); *G06F 9/30167* (2013.01); *G06F 9/3822* (2013.01); *G06F 9/3824* (2013.01); *G06F 9/3836* (2013.01); *G06F 9/3889* (2013.01)

(58) Field of Classification Search
CPC ....... G06F 9/34; G06F 9/3885; G06F 9/3897; G06F 9/345
See application file for complete search history.

(56) References Cited

U.S. PATENT DOCUMENTS

| 5,442,762 A * | 8/1995 | Kato et al. .................... 712/208 |
| 5,832,202 A | 11/1998 | Slavenberg et al. |
| 5,974,523 A | 10/1999 | Glew et al. |

FOREIGN PATENT DOCUMENTS

| EP | 0 605 927 | 7/1994 |
| JP | 61-103241 | 5/1986 |
| JP | 3-147021 | 6/1991 |
| JP | 10-91442 | 4/1998 |
| JP | 2001-504959 | 4/2001 |
| JP | 3452771 | 7/2003 |
| JP | 3469469 | 9/2003 |
| JP | 3481479 | 10/2003 |
| JP | 3490005 | 11/2003 |
| JP | 3490006 | 11/2003 |

(Continued)

OTHER PUBLICATIONS

Patent Abstracts of Japan, Publication No. 2004-38751, Published Feb. 5, 2004.

(Continued)

*Primary Examiner* — Kenneth Kim

(74) *Attorney, Agent, or Firm* — Staas & Halsey LLP

(57) ABSTRACT

A processing apparatus includes an execution unit which performs computation on two operand inputs each being selectable between read data from a register and an immediate value. The processing apparatus also includes another execution unit which performs computation on two operand inputs, one of which is selectable between read data from a register and an immediate value, and the other of which is an immediate value. A control unit determines, based on a received instruction specifying a computation on two operands, whether each of the two operands specifies read data from a register or an immediate value. Depending on the determination result, the control unit causes one of the execution units to execute the computation specified by the received instruction.

5 Claims, 26 Drawing Sheets

(56) References Cited

FOREIGN PATENT DOCUMENTS

| | | |
|---|---|---|
| JP | 2004-38751 | 2/2004 |
| JP | 3816844 | 6/2006 |
| WO | WO 98/20422 | 5/1998 |

OTHER PUBLICATIONS

Patent Abstracts of Japan, Publication No. 10-91442, Published Apr. 10, 1998.
Patent Abstracts of Japan, Publication No. 11-110214, Published Apr. 23, 1999.
Patent Abstracts of Japan, Publication No. 2000-20306, Published Jan. 21, 2000.
Patent Abstracts of Japan, Publication No. 2000-181707, Published Jun. 30, 2000.
Patent Abstracts of Japan, Publication No. 2000-181713, Published Jun. 30, 2000.
Patent Abstracts of Japan, Publication No. 2000-181714, Published Jun. 30, 2000.
European Search Report dated Mar. 2, 2012 in Appln. No. 11191623.5.
Japanese Office Action issued Jun. 17, 2014 in corresponding Japanese Patent Application No. 2010-294382.
Patent Abstracts of Japan, Publication No. 61-103241 published May 21, 1986.
Patent Abstracts of Japan, Publication No. 03-147021 published Jun. 24, 1991.

* cited by examiner

STORING IN OTHER QUEUE WHEN RESERVATION STATION INSTRUCTION QUEUE RESERVED FOR IMMEDIATE SOURCE OPERAND INSTRUCTION EXECUTION UNIT IS FULL

CROSS-REFERENCE TO RELATED APPLICATION

This application is based upon and claims the benefit of priority of the prior Japanese Patent Application No. 2010-294382, filed on Dec. 29, 2010, the entire contents of which are incorporated herein by reference.

FIELD

The embodiments discussed herein relate to a processing apparatus and method for performing computation.

BACKGROUND

Parallel processing of computational instructions has been used as a technique for boosting the performance of processors such as a central processing unit (CPU). A plurality of execution units integrated in a processor execute computational operations concurrently. Some of those computing devices employ, for example, reservation stations to make more efficient use of execution units. With this feature, a plurality of decoded instructions are distributed to relevant reservation stations associated with a plurality of execution units, so that the instructions are executed out of order under the control of those reservation stations.

A higher performance is achieved as the parallelism of computation is enhanced by integrating more execution units in the same processor. More execution units means more ports and wire lines for those execution units to exchange data with a register file. The consequent increase in the wiring space leads to longer wire lengths and larger propagation delays of signals between the execution units and register file, thus degrading performance of the processor.

Several techniques are proposed to reduce the increase of write paths to the register file. For example, one proposed technique determines, based on the decoding result of an instruction, to which execution unit the instruction is to be subjected and in which register the computational result is to be written. See, for example, the following patent literature:

Japanese Laid-open Patent Publication No. 2004-38751
Japanese Laid-open Patent Publication No. 10-91442

Generally, the execution units such as adders, subtractors, and logical operators perform a specific computation on two source values and output one computational result. For this purpose, there are two read paths from the register file to each execution unit, and one write path from each execution unit to the register file. This means that two read paths are routed each time one execution unit is added. In other words, the problem of increased wiring space and propagation delays is more prominent in the read paths than in the write paths.

SUMMARY

According to an aspect of the invention, there is provided a processing apparatus which includes the following elements: a first execution unit which performs computation on two operand inputs each being selectable between read data from a register and an immediate value; a second execution unit which performs computation on two operand inputs, one of which is selectable between read data from a register and an immediate value, and the other of which is an immediate value; and a control unit which determines, based on a received instruction specifying a computation on two operands, whether each of the two operands specifies read data from a register or an immediate value, and causes either the first execution unit or the second execution unit to execute the computation specified by the received instruction, depending on a result of the determination about the two operands.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
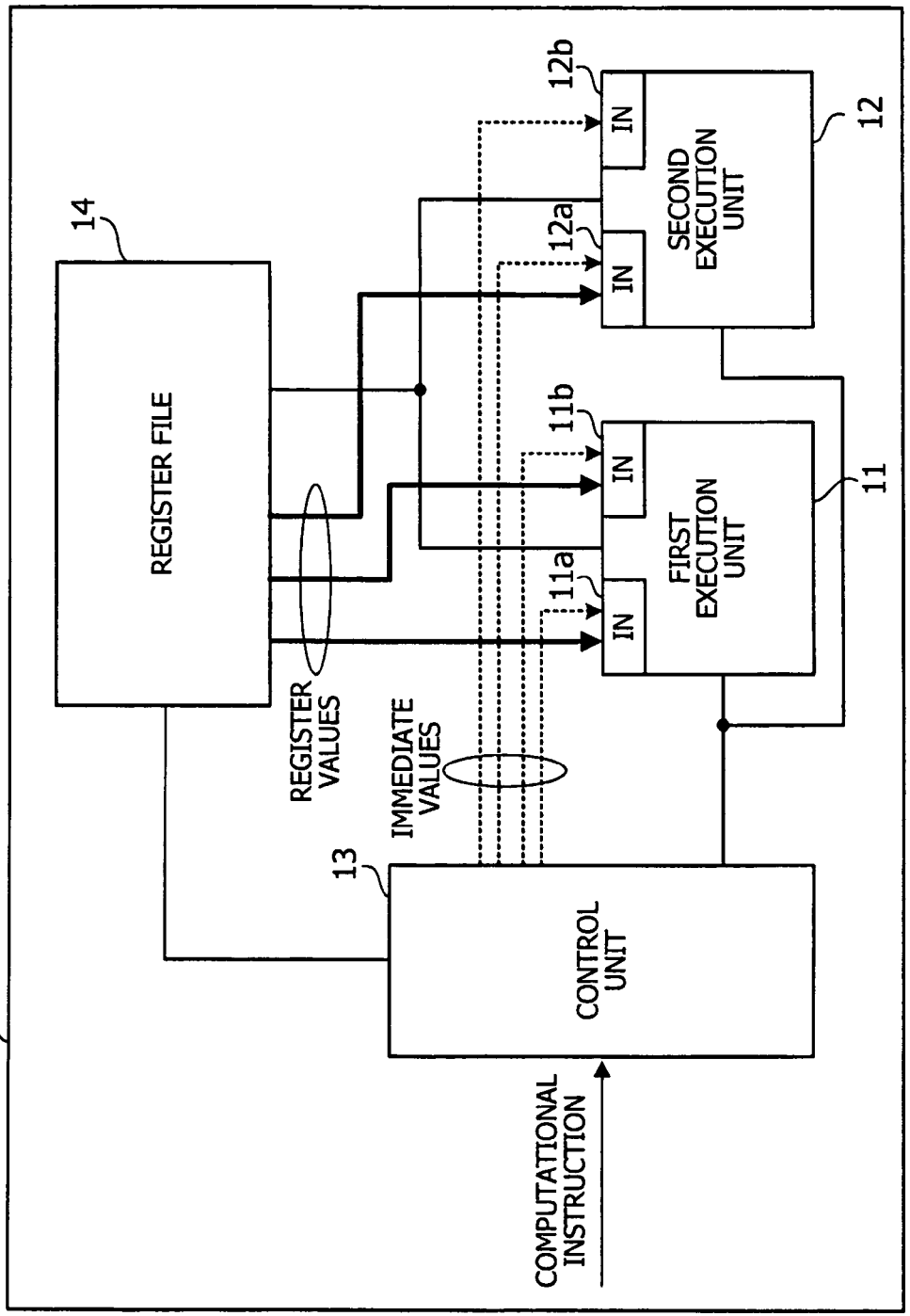
FIG. 1 illustrates an example structure of a processing apparatus according to a first embodiment.

Several embodiments will be described in detail below with reference to the accompanying drawings, wherein like reference numerals refer to like elements throughout.

(a) First Embodiment

FIG. 1 illustrates an example structure of a processing apparatus according to a first embodiment. The illustrated processing apparatus 1 decodes each given computational instruction and executes computational operations according to the decoding result. For example, this processing apparatus 1 may be implemented as a semiconductor circuit which is generally called a central processing unit (CPU) or a microprocessor unit (MPU). The illustrated processing apparatus 1 includes a first execution unit 11, a second execution unit 12, a control unit 13, and a register file 14.

The first execution unit 11 has two input ports 11a and 11b to receive two operands and executes a computation on those received operands. Similarly, the second execution unit 12 has two input ports 12a and 12b to receive two operands and executes a computation on the data of those operands. The two execution units 11 and 12 may operate in parallel. The first execution unit 11 may be able to execute the same kind of computational operations as the second execution unit 12.

The first and second execution units 11 and 12, however, receive different source data, or operands. FIG. 1 depicts two different types of input paths to the first and second execution units 11 and 12 by using different kinds of arrows. Specifically, the bold solid arrows indicate input paths for conveying data values read out of the register file 14 (referred to hereafter as "register values"), whereas the dashed arrows indicate input paths for conveying immediate values. While it is assumed in the example of FIG. 1 that immediate values are provided from the control unit 13, the first embodiment is not limited by this specific example. That is, immediate values may also be supplied from other processing portions than the control unit 13.

The first execution unit 11 has two input ports 11a and 11b. One input port 11a is configured to accept both types of operands, i.e., selectable between a register value and an immediate value. The other input port 11b is also selectable between a register value and an immediate value. This means that the first execution unit 11 is capable of executing computational operations on the following three combinations of operands: (i) both operands are register values, (ii) one operand is a register value while the other is an immediate value, and (iii) both operands are immediate values.

The second execution unit 12 also has two input ports 12a and 12b. Similarly to the first execution unit 11, one input port 12a is designed to accept both types of operands, i.e., selectable between a register value and an immediate value. The other input port 12b, on the other hand, is only capable of accepting immediate values. This means that the second execution unit 12 is capable of executing computational operations on the following two combinations of operands: (ii) one operand is a register value while the other is an immediate value, and (iii) both operands are immediate values.

Based on a given computational instruction (hereafter, simply "instruction"), the control unit 13 causes either the first execution unit 11 or the second execution unit 12 to execute a computation specified in that instruction. More specifically, the control unit 13 determines whether the given instruction specifies register values or immediate values in its two operands. According to the result of this determination, the control unit 13 then causes either the first execution unit 11 or the second execution unit 12 to execute the specified computation of the instruction.

In the case where, for example, the instruction specifies register values for both operands, the control unit 13 causes the first execution unit 11 to execute the computation specified in the instruction. In the case where the given instruction specifies an immediate value for at least one operand, the control unit 13 causes either the first execution unit 11 or the second execution unit 12 to execute the specified operation of the instruction. Here the control unit 13 may activate the first execution unit 11 or second execution unit 12 by sending their respective selection signals when it is determined which execution unit to use.

The example of FIG. 1 assumes that the control unit 13 has the functions of decoding instructions, controlling data read operations from the register file 14 to execution units, and supplying immediate values to execution units. These functions may wholly or partly be implemented in some other processing portions than the control unit 13. More specifically, the noted function of controlling data read operations is to send register addresses to the register file 14 as specified in the source operand fields of a given decoded instruction, so that a relevant execution unit is loaded with data values of the specified registers. The function of supplying immediate values is to load a relevant execution unit with immediate values described in the source operand fields of a given decoded instruction.

The above-described processing apparatus 1 permits parallel execution of computational operations by using its first and second execution units 11 and 12 concurrently, thus providing a higher performance than in the case of, for example, employing the first execution unit 11 alone. Also, the processing apparatus 1 is configured in such a way that one input port 12b of the second execution unit 12 is dedicated for immediate values. This means that there are three input paths from the register file 14 to execution units, as opposed to four input paths in the case where two execution units are implemented similarly to the illustrated first execution unit 11. In other words, the proposed configuration of FIG. 1 reduces the number of input paths to three.

As can be seen from the above, the processing apparatus 1 of FIG. 1 employs two execution units to achieve faster execution of computational operations than in the case of a single execution unit, while avoiding a proportional increase in the number of input paths from the register file 14 to execution units. Fewer input paths mean less requirement for wiring space. The reduced wiring space means reduced wiring lengths and shorter propagation times of signals between the execution units and register file 14, thus avoiding performance degradation due to signal delays.

The processing apparatus 1 illustrated in FIG. 1 includes two different types of execution units 11 and 12, one for each. The first embodiment may, however, be modified to include the second execution unit 12 in plurality, or both the first execution unit 11 and second execution unit 12 in plurality. In these implementations, the processing apparatus 1 may preferably be configured to include more second execution units 12 than the first execution units 11 to control the growing number of input paths from the register file 14 to execution units.

In another variation of the first embodiment, the processing apparatus 1 may include, in addition to the above execution units 11 and 12, an execution unit that only receives immediate values at both input ports. This variation also contributes to effective control of the growing number of input paths from the register file 14 to execution units.

(b) Second Embodiment

Figure 2:
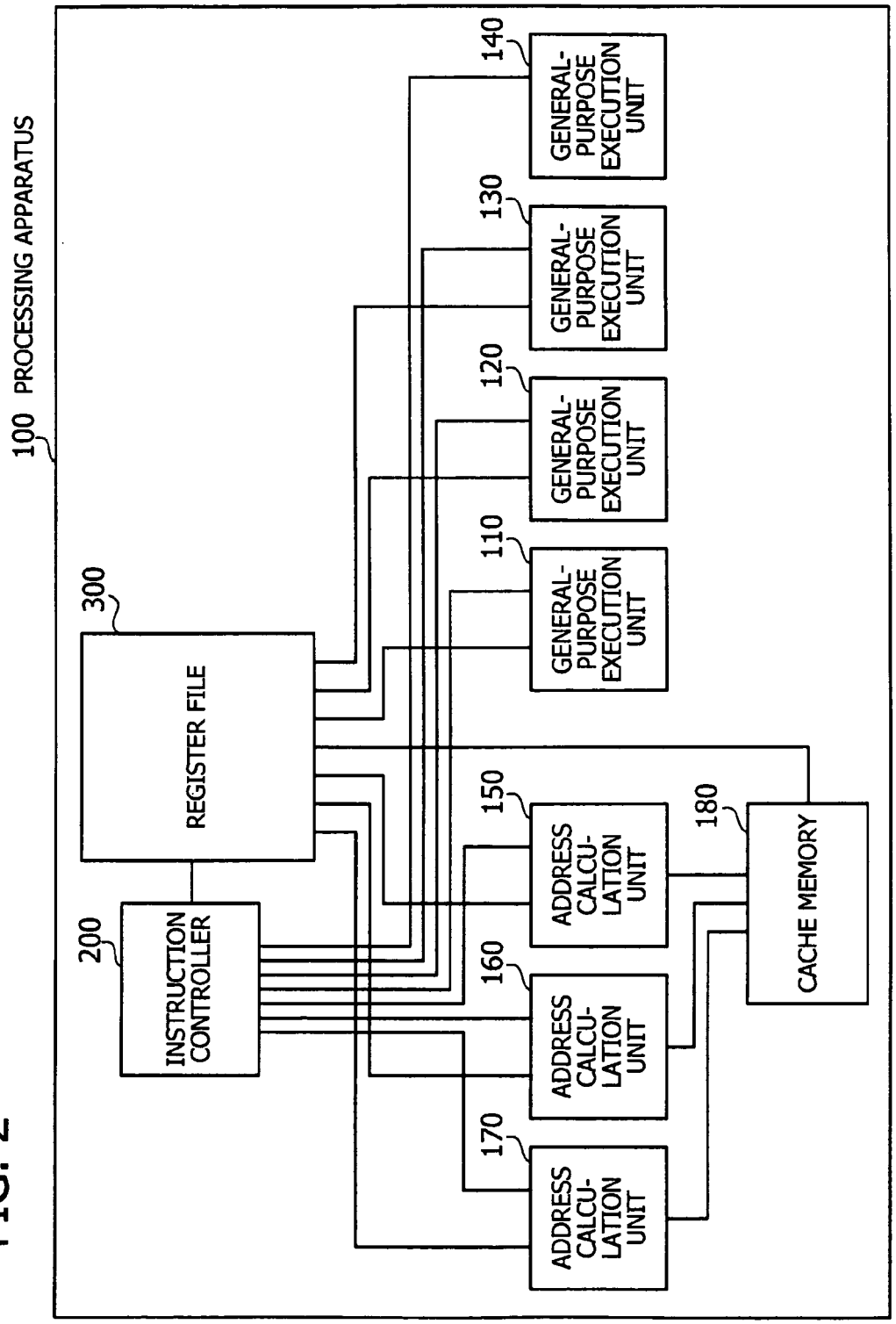
FIG. 2 illustrates an example structure of a processing apparatus according to a second embodiment.

FIG. 2 illustrates an example structure of a processing apparatus according to a second embodiment. The illustrated processing apparatus 100 includes general-purpose execution units 110, 120, 130, and 140, address calculation units 150, 160, and 170, a cache memory 180, an instruction controller 200, and a register file 300.

The instruction controller 200 decodes an instruction fetched from a memory (not illustrated). Based on this decoding result of the instruction, the instruction controller 200 selects one of the general-purpose execution units 110, 120, 130, and 140 and address calculation units 150, 160, and 170. The instruction controller 200 then causes the selected execution unit to execute a computational operation according to the decoding result. (The term "selected execution unit" is used herein to refer to a general-purpose execution unit or address calculation unit that is selected.) During this course, the instruction controller 200 controls input of operand data to the selected execution unit. The operand data may be register values (i.e., data read out of the register file 300), or immediate values specified in the instruction, or both of those register values and immediate values.

The register file 300 is a collection of a plurality of registers. Each individual register in this register file 300 stores the result of a computation performed by the general-purpose execution units 110, 120, 130, and 140 or data read out of a memory (not illustrated).

The instruction controller 200 decodes various instructions, and the general-purpose execution units 110, 120, 130, and 140 execute a subset of those decoded instructions, including arithmetic instructions such as add, subtract, multiply, and divide. The general-purpose execution units 110, 120, 130, and 140 may perform their respective operations in parallel with each other according to requests from the instruction controller 200.

Each general-purpose execution unit 110, 120, 130, and 140 operates on two source operands, which may be supplied as register values (read data) from the register file 300 or immediate values from the instruction controller 200. As will be described later, one general-purpose execution unit 110 accepts both register values and immediate values as either of the two operands. The next two general-purpose execution units 120 and 130 accept both register values and immediate values similarly, but for only one of the two operands. The other operand has to be an immediate value. The last general-purpose execution unit 140 only accepts immediate values as its operand inputs. While not specifically depicted in FIG. 2, the computation result of those general-purpose execution units 110, 120, 130, and 140 is directed to the register file 300 or some other memory (not illustrated).

Address calculation units 150, 160, and 170 are another type of execution units, which execute an address calculation for load instructions and store instructions when they are decoded by the instruction controller 200. The address calculation units 150, 160, and 170 may perform their respective operations in parallel with each other according to requests from the instruction controller 200.

Each address calculation units 150, 160, and 170 operates on two source operands, which may be supplied as register values or immediate values. As will be described later, one address calculation unit 150 accepts both register values and immediate values as either of the two operands. The other two address calculation units 160 and 170 accept both register values and immediate values similarly, but for only one of the two operands. The other operand has to be an immediate value.

The cache memory 180 stores a copy of data originally stored in some other memory (not illustrated). For example, one of the address calculation units 150, 160, and 170 calculates a read address of a specific piece of data in the memory when a load instruction is decoded. The calculated read address is sent to the cache memory 180. The cache memory 180 provides the register file 300 with read data corresponding to the given read address. For another example, when a store instruction is decoded, one of the address calculation units 150, 160, and 170 calculates a write address of data to be written in the memory. The calculated write address is sent to the cache memory 180, together with the write data read out of the register file 300. When the write operation is performed on the specified write address of the memory (not illustrated), the cache memory 180 stores the same write data in its own storage space which is associated with the write address.

Figure 3:
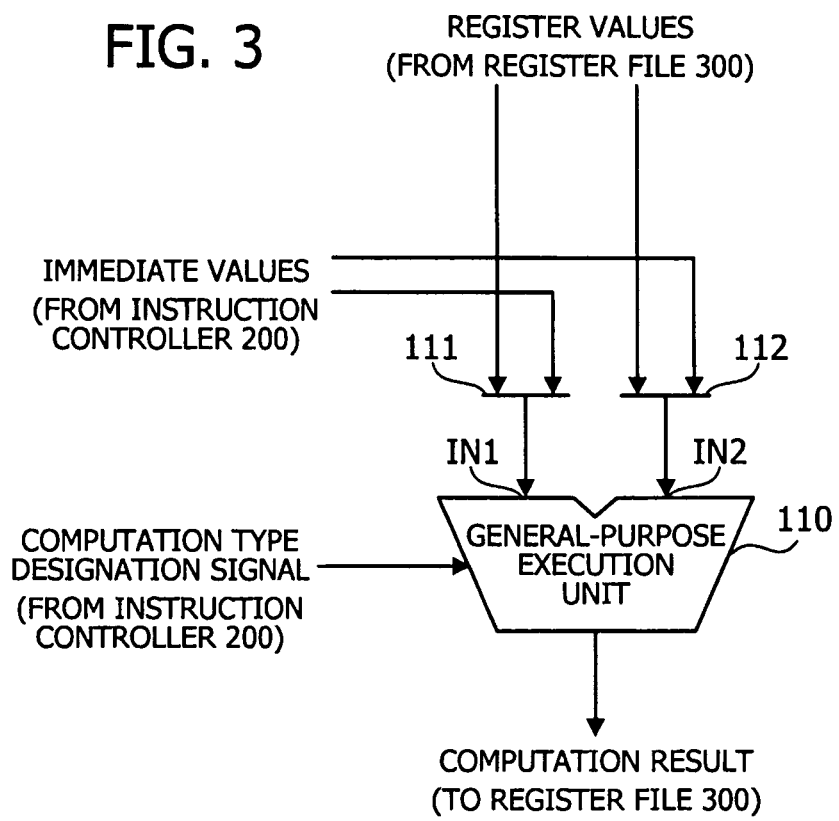
FIG. 3 is a first diagram illustrating an example of input and output signals of a general-purpose execution unit.
Figure 4:
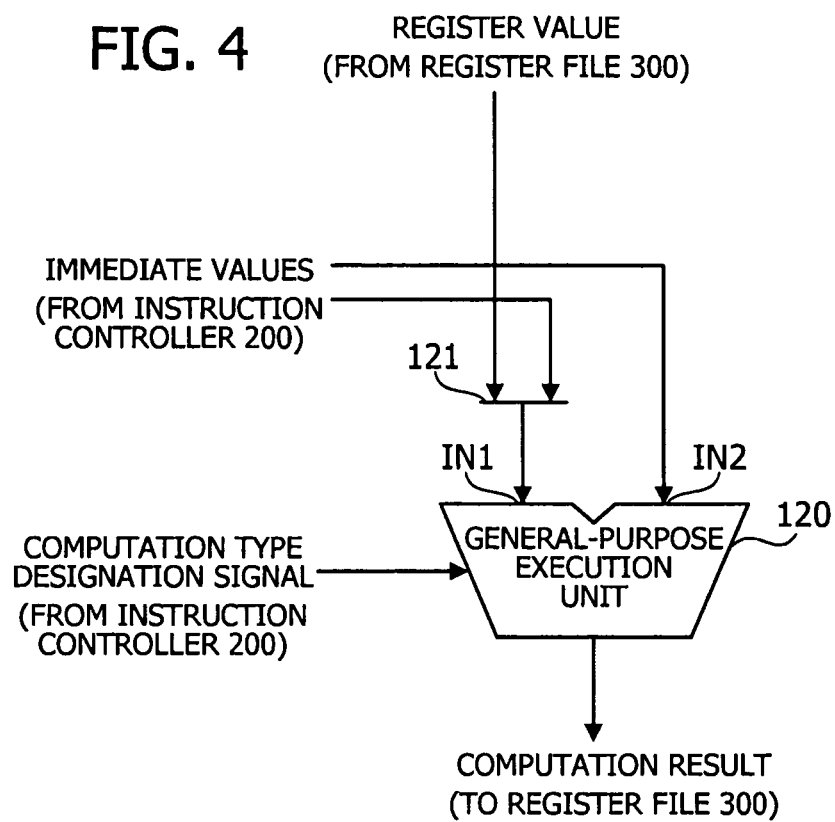
FIG. 4 is a second diagram illustrating an example of input and output signals of a general-purpose execution unit.
Figure 5:
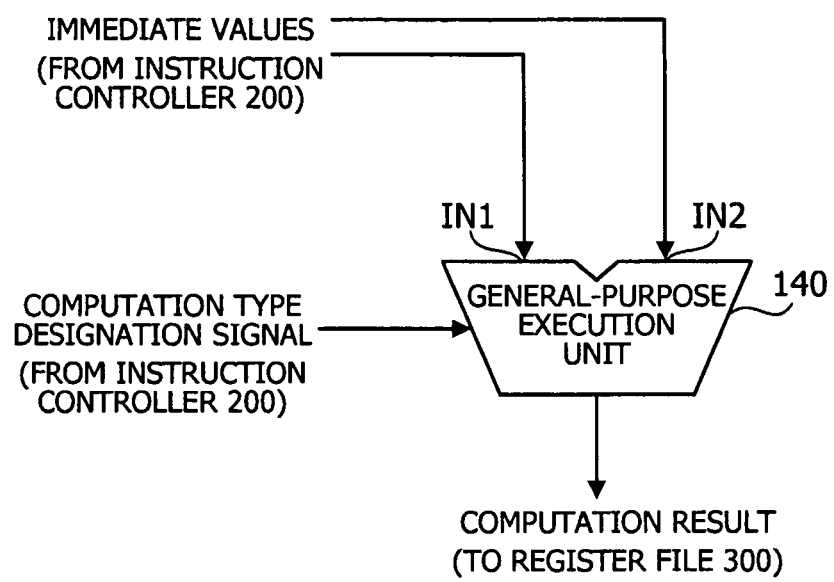
FIG. 5 is a third diagram illustrating an example of input and output signals of a general-purpose execution unit.

The following section will describe input and output signals of each execution unit. FIGS. 3 to 5 illustrate some examples of input and output signals of general-purpose execution units. As can be seen from FIGS. 3 to 5, each illustrated general-purpose execution unit 110, 120, and 140 has two input ports IN1 and IN2 and executes a computation on the input data supplied to those input ports IN1 and IN2. While not included in FIGS. 3 to 5, the general-purpose execution unit 130 similarly has two input ports IN1 and IN2 and executes a computation on input data supplied to those input ports IN1 and IN2.

It is assumed here that the instruction controller 200 handles instructions having at most two source operands. One is referred to as the first source operand, and the other is referred to as the second source operand. Input port IN1 of each execution unit is associated with the first source operand. Input port IN2 is associated with the second source operand. In other words, the two input ports IN1 and IN2 are supposed to receive data specified in the first and second source operands of an instruction, respectively.

Referring first to FIG. 3, one input port IN1 of the general-purpose execution unit 110 is configured to selectively receive either a register value from the register file 300 or an immediate value from the instruction controller 200. A multiplexer (MUX) 111 is placed before IN1 for the purpose of selecting a data source. Likewise, the other input port IN2 of the general-purpose execution unit 110 is configured to selectively receive either a register value from the register file 300 or an immediate value from the instruction controller 200. Another multiplexer 112 is placed before IN2 for the purpose of selecting a data source.

Referring next to FIG. 4, one input port IN1 of the general-purpose execution unit 120 is configured to selectively receive either a register value from the register file 300 or an immediate value from the instruction controller 200. A multiplexer 121 is placed before IN1 for the purpose of selecting a data source. In contrast, the other input port IN2 of the general-purpose execution unit 120 receives only immediate values from the instruction controller 200.

While not illustrated, input ports IN1 and IN2 of another general-purpose execution unit 130 are configured similarly to those of the general-purpose execution unit 120. That is, one input port IN1 of the general-purpose execution unit 130 selectively receives a register value from the register file 300 or an immediate value from the instruction controller 200.

The other input port IN2 of the general-purpose execution unit 130 only receives an immediate value from the instruction controller 200.

Referring now to FIG. 5, both input ports IN1 and IN2 of the general-purpose execution unit 140 receive immediate values from the instruction controller 200.

As captioned in FIGS. 3 to 5, the computation result of each general-purpose execution unit 110, 120, and 140 is directed to the register file 300. While not illustrated in FIGS. 3 to 5, this is also true to another general-purpose execution unit 130. The destination address of each computation result is specified in the destination operand field of instructions. The instruction controller 200 controls the register file 300 according to the specified destination address.

As can also be seen from FIGS. 3 to 5, each general-purpose execution unit 110, 120, and 140 receives a computation type designation signal from the instruction controller 200. The general-purpose execution units 110, 120, and 140 may execute different kinds of computational operations (e.g., add, subtract, multiply, divide) as specified by their respective computation type designation signals. While not illustrated in FIGS. 3 to 5, another general-purpose execution unit 130 similarly receives a computation type designation signal from the instruction controller 200 and executes a computation specified by the received computation type designation signal.

The above computation type designation signals may be implemented as a group of selection signals each provided for a specific kind of computational operations. In this implementation, each general-purpose execution unit receives a plurality of selection signals, only one of which is turned on to indicate a specific computation type while all the others are in the off state.

While not specifically illustrated in FIGS. 3 to 5, the address calculation units 150, 160, and 170 similarly have two input ports IN1 and IN2 and execute a computation on the input data supplied to those input ports IN1 and IN2. One address calculation unit 150 may receive several combinations of signals at its input ports IN1 and IN2 similarly to the general-purpose execution unit 110 discussed above. That is, one input port IN1 of the address calculation unit 150 is configured to selectively receive a register value from the register file 300 or an immediate value from the instruction controller 200. The other input port IN2 of the address calculation unit 150 is also configured to selectively receive a register value from the register file 300 or an immediate value from the instruction controller 200.

Another address calculation unit 160 may receive several combinations of signals at its input ports IN1 and IN2 similarly to the general-purpose execution units 120 and 130 discussed above. This is also true to yet another address calculation unit 170. That is, one input port IN1 of those address calculation units 160 and 170 is configured to selectively receive a register value from the register file 300 or an immediate value from the instruction controller 200. In contrast, the other input port IN2 of those address calculation units 160 and 170 only receive immediate values from the instruction controller 200.

It is noted that the load instructions and store instructions do not take two immediate values simultaneously as their source operands. In other words, those instructions do not require the address calculation units to have both input ports IN1 and IN2 capable of receiving immediate values.

The operands supplied to input ports of each execution unit may be classified into either register values or non-register values. Immediate values are a typical example of the latter category. However, it is not always easy to determine whether the given operand falls in the category of register values or the other. One such example is when a so-called "bypass computation" is under way. For the purpose of faster processing, the bypass computation technique uses the result of the immediately preceding operation as an operand of the current instruction even if the current instruction specifies a particular register as its source operand. It is also a kind of bypass computation to use the result of some other pipeline as an operand of the current instruction. These operations of bypass computation eventually neglect substantive registers designated in source operand fields of the instructions.

It is not possible in some implementations to determine whether the specified operand is a register value or not, without determining the presence of bypass. If this is the case, the determination of operand values may be performed under the assumption that there is no bypass. In some other implementations, it is allowed to determine whether the specified operand is a register value or not, at the time when the presence of bypass is determined. It is possible in this case to determine that the specified operand is not a register value.

Assuming that each operand given to an execution unit falls in the class of register values or the class of non-register values, the combinations of two operands are classified into the following three cases: One case is when both operands are register values (i.e., two registers are used). Another case is when one operand is a register value while the other operand is a non-register value (i.e., only one register is used). Yet another case is when both operands are non-register values (i.e., no registers are used). Instructions (e.g., MOV) assigning a constant value, as well as data transfer instructions, have a single source operand. The computational operations of those instructions fall under either the second noted case (i.e., when only one register is used) or the third noted case (i.e., when no registers are used).

A plurality of execution units are employed to increase the parallelism of computation. As can be seen from the above discussion, the combinations of two operands given to an execution unit are classified into three cases, depending on the number of registers that are used. It is, therefore, not necessarily required to make all those execution units capable of receiving register values as both of their two operands. For example, a computation involving a single register value as an operand may be executed by an execution unit that accepts register values at only one input port. For another example, a computation on two non-register values may be executed by an execution unit that does not accept register values.

In view of the above, the second embodiment provides a processing apparatus 100 which includes three types of execution units corresponding to the foregoing three cases. Specifically, the first type of execution units may receive register values as both operands. For example, the foregoing general-purpose execution unit 110 and address calculation unit 150 fall in this type. The second type of execution units may receive register values as only one of the two operands. For example, the foregoing general-purpose execution units 120 and 130 and address calculation units 160 and 170 fall in this type. The third type of execution units only receive immediate values as their operands. For example, the foregoing general-purpose execution unit 140 falls in this type.

As a result of combining these three types of execution units, the second embodiment reduces the number of read paths from the register file 300 to the execution units, besides increasing the parallelism of operations. A specific example of the reduction of read paths will be discussed below.

Figure 6:
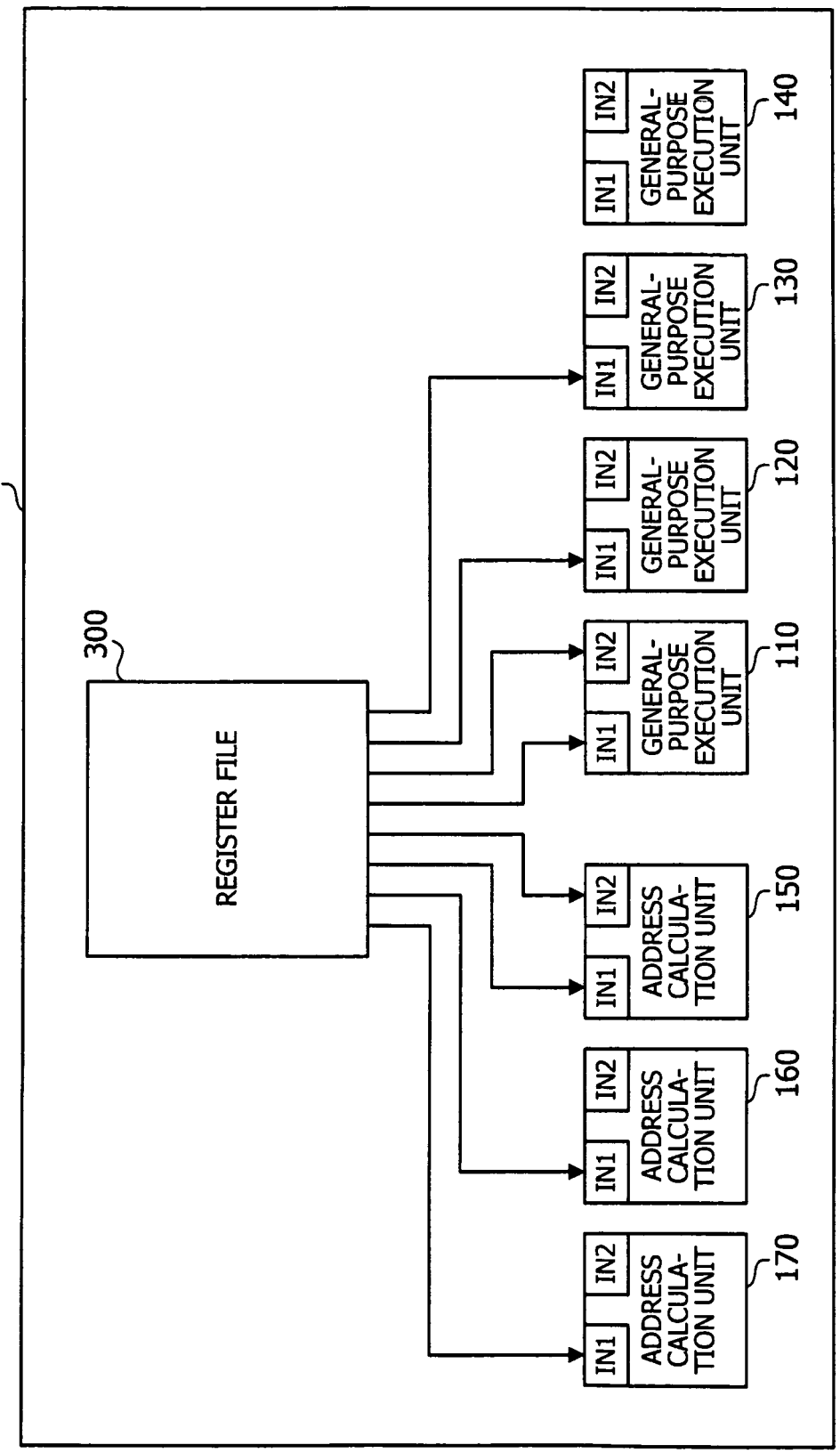
FIG. 6 illustrates read paths from a register file to execution units.

FIG. 6 illustrates read paths from a register file 300 to execution units. While not depicted in FIG. 6, multiplexers are placed between the register file 300 and some execution units.

Read paths run from the register file 300 to input ports IN1 and IN2 of a general-purpose execution unit 110, as well as to input port IN1 of other general-purpose execution units 120 and 130. More read paths run from the register file 300 to input ports IN1 and IN2 of one address calculation unit 150, as well as to input port IN1 of other address calculation units 160 and 170. The illustrated processing apparatus 100 also includes a general-purpose execution unit 140 that has no read paths from the register file 300.

Figure 7:
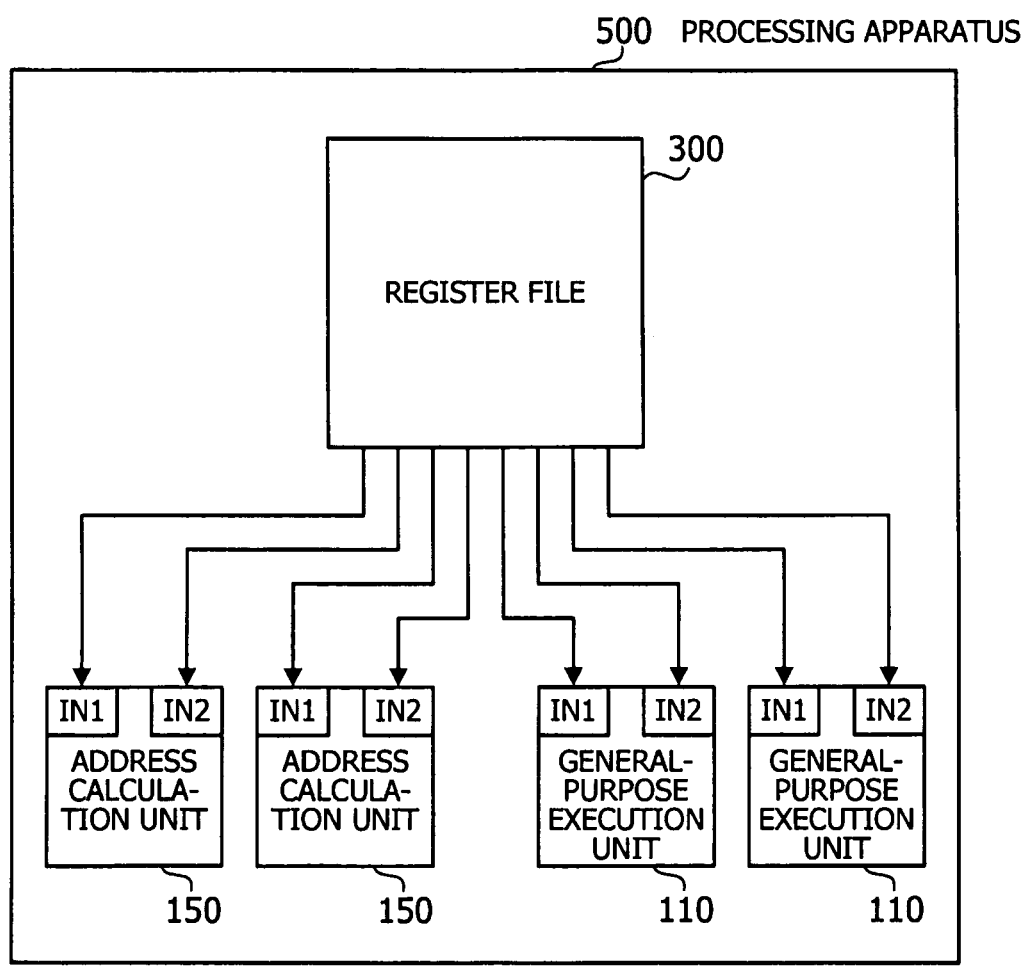
FIG. 7 illustrates another processing apparatus for comparison purposes.

The processing apparatus 100 of FIG. 6 includes four general-purpose execution units and three address calculation units, with eight read paths from the register file 300. The following section will compare this processing apparatus 100 with another processing apparatus that has a plurality of execution units capable of receiving register values as two operands. FIG. 7 illustrates a processing apparatus as a reference example for later comparison.

The processing apparatus 500 illustrated in FIG. 7 includes several elements which have previously been discussed in FIG. 6 and are thus designated by the same reference numerals. Specifically, the illustrated processing apparatus 500 includes two general-purpose execution units 110 whose input ports IN1 and IN2 are both coupled to the register file 300 via their respective read paths. The processing apparatus 500 further includes two address calculation units 150 whose input ports IN1 and IN2 are both coupled to the register file 300 via their respective read paths.

The processing apparatus 500 of FIG. 7 thus includes two general-purpose execution units and two address calculation units, with eight read paths routed from the register file 300 to those execution units. In comparison of the proposed processing apparatus 100 of FIG. 6 with this reference processing apparatus 500 of FIG. 7, the two processing apparatuses 100 and 500 have the same number of read paths, despite the fact that the former has more execution units than the latter. Considering that only a small number of received instructions specify registers in both of their two source operands, the proposed processing apparatus 100 of FIG. 6 executes computations at a higher degree of parallelism than the reference processing apparatus 500 of FIG. 7 because of its greater number of execution units. In other words, the processing apparatus 100 according to the second embodiment improves the efficiency of computation by employing more execution units while suppressing the increase of read paths from a register file to execution units.

Figure 8:
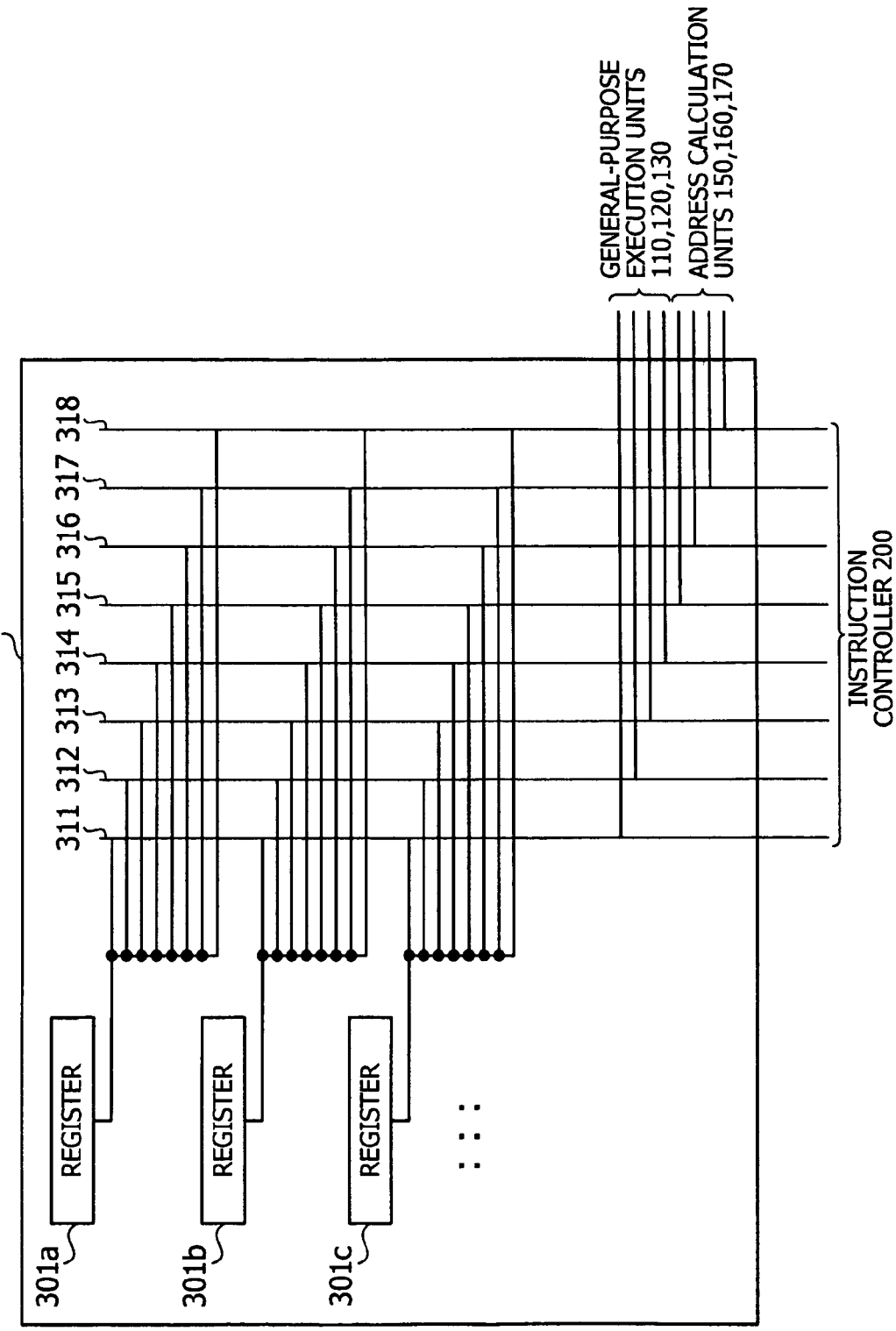
FIG. 8 illustrates an example structure of a register file.

FIG. 8 illustrates an example structure of a register file 300, with a focus on its circuit that supplies read data to execution units. Specifically, the illustrated register file 300 contains a plurality of registers 301a, 301b, 301c, and so on. This register file 300 also contains selection circuits 311 to 318 to provide register values to eight input ports of the execution units (i.e., input ports IN1 and IN2 of general-purpose execution unit 110, input port IN1 of general-purpose execution units 120 and 130, input ports IN1 and IN2 of address calculation unit 150, input port IN1 of address calculation units 160 and 170). These selection circuits 311 to 318 receive register numbers from the instruction controller 200, so that each selection circuit 311 to 318 supplies its corresponding execution unit with a data value read out of a register designated by the received register number. In the case where the instruction controller 200 executes instructions out of order, register renaming, register update buffer, and other various techniques may be applied to the implementation of this register file 300.

The following section describes how the instruction controller 200 controls execution units. Specifically, the description will discuss how the general-purpose execution units 110, 120, 130, and 140 are controlled, with reference to relevant drawings, while omitting explanation for address calculation units 150, 160, and 170 unless necessary.

Figure 9:
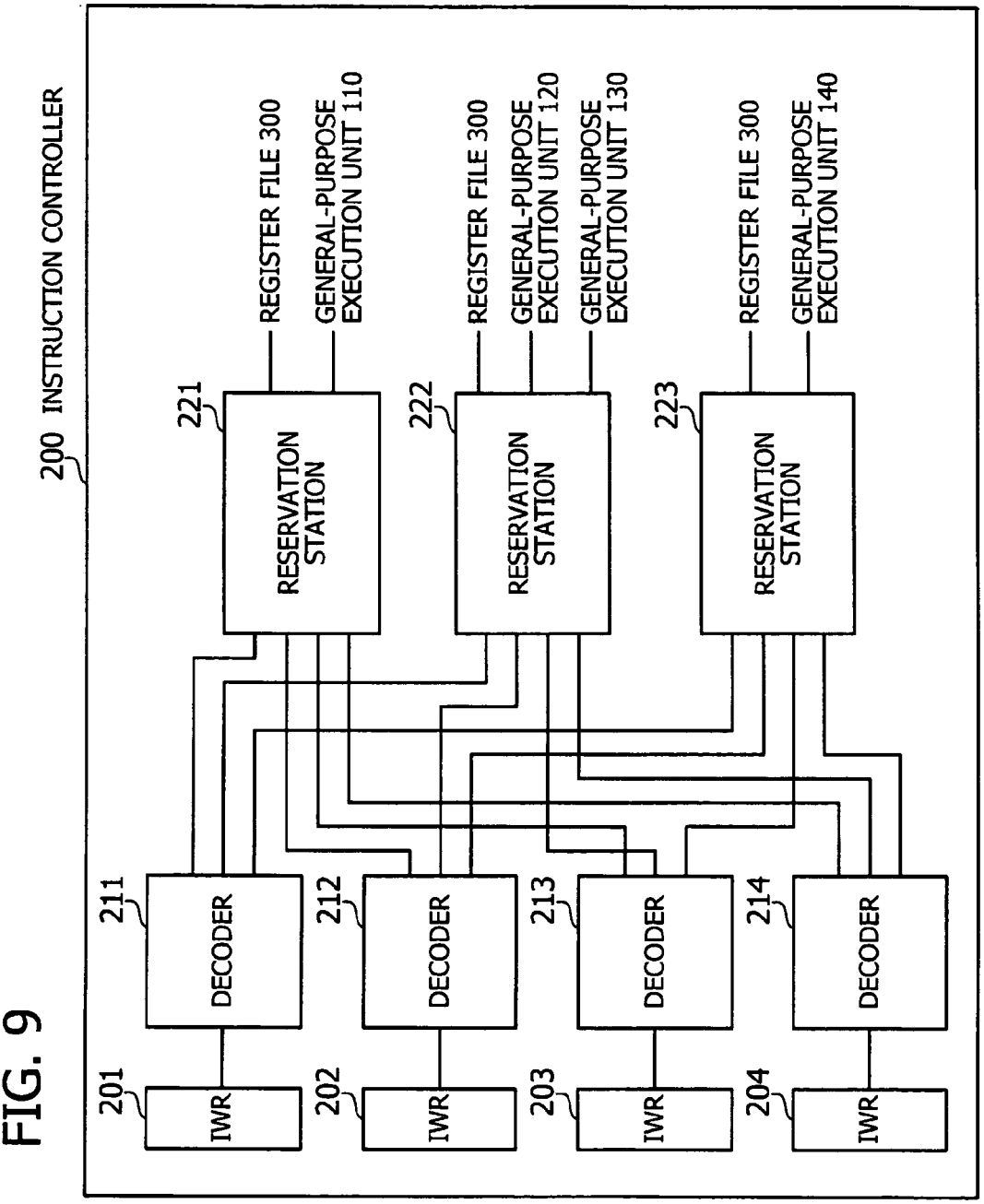
FIG. 9 illustrates an example internal structure of an instruction controller.

FIG. 9 illustrates an example internal structure of an instruction controller. The illustrated instruction controller 200 includes instruction word registers (IWR) 201 to 204, decoders 211 to 214, and reservation stations (RS) 221 to 223. The instruction word registers 201 to 204 temporarily store the instructions fetched by an instruction fetch unit (not illustrated) from memory (not illustrated). One decoder 211 reads and decodes an instruction stored in its associated instruction word register 201. Another decoder 212 reads and decodes an instruction stored in its associated instruction word register 202. Yet another decoder 213 reads and decodes an instruction stored in its associated instruction word register 203. Still another decoder 214 reads and decodes an instruction stored in its associated instruction word register 204.

The above-described four decoders 211 to 214 permit the instruction controller 200 to issue up to four instruction at a time. The embodiment is, however, not limited by this specific number of decoders. The decoders 211 to 214 may also be configured to, for example, check the dependence between each other's instructions and issue, when necessary, instructions from only one decoder, rather than issuing instructions concurrently from two or more decoders.

Each decoder 211 to 214 is supposed to send its decoded instruction to one of the reservation stations 221 to 223 if the decoded instruction is executable with a general-purpose execution unit. This type of instructions may include, for example, add, subtract, multiply, and divide instructions. Specifically, the decoders 211 to 214 select one of the reservation stations 221 to 223 for a decoded instruction, depending on the combination of information specified in its two source operands, as will be described later. The decoding result is then sent to the selected reservation station.

The reservation stations 221 to 223 have their respective execution queues to temporarily store the instructions supplied from the decoders 211 to 214. Each reservation station 221 to 223 issues those instructions from its execution queue to general-purpose execution units in the order that their specified resources are ready.

According to the second embodiment, one reservation station is provided for each single type of general-purpose execution units which is determined by the combinations of possible input data that they receive as two operands. For example, one reservation station 221 is associated with a general-purpose execution unit 110 capable of receiving register values at both input ports IN1 and IN2. That is, the reservation station 221 is supposed to supply the general-purpose execution unit 110 with instructions from its execution queue.

Another reservation station 222 is associated with two general-purpose execution units 120 and 130 capable of receiving register values at only one input port IN1. That is, the reservation station 222 is supposed to supply one of those general-purpose execution units 120 and 130 with instructions from its execution queue. For example, the reservation station 222 sends an instruction to one of the general-purpose execution units 120 and 130 which is not busy for other computation at the moment when resources are ready for execution of the instruction.

Yet another reservation station 223 is associated with a general-purpose execution unit 140 which is unable to receive register values at any of its input ports IN1 and IN2. That is, the reservation station 223 is supposed to supply the general-purpose execution unit 140 with instructions from its execution queue.

As noted above, one reservation station is provided for each single type of general-purpose execution units which is determined by the combinations of possible input data that they receive as two operands. In other words, the decoders 211 to 214 eventually select which general-purpose execution unit to use, by selecting a specific reservation station as the destination of a decoded instruction.

When resources are ready for execution of a specific instruction, the reservation station 221 to 223 storing that instruction operates as follows. Based on the instruction code specified in the given instruction, the reservation station 221 to 223 sends a computation type designation signal to a particular general-purpose execution unit to indicate what type of computation it is supposed to perform. The computation type designation signal may be formed from a plurality of selection signals each corresponding to a specific type of computation. When this is the case, the reservation station 221 to 223 turns on one of those selection signals.

The instruction may contain a register number(s) in its source operand field(s). In this case, the reservation station 221 to 223 specifies the register number(s) to the register file 300, thus causing the relevant register(s) to output data to the general-purpose execution unit that executes the instruction. The instruction may also or alternatively contain an immediate value(s) in its source operand field(s). In this case, the reservation station 221 to 223 sends the immediate value(s) to the general-purpose execution unit that executes the instruction. In another case, the reservation station 221 to 223 may further generate an immediate value, depending on the source operand value (e.g., register value) of the instruction, and sends the generated immediate value to the general-purpose execution unit that executes the instruction.

While not specifically depicted, the instruction controller 200 of FIG. 9 further includes reservation stations associated with the address calculation units 150, 160, and 170. These reservation stations are called "reservation station for address generate" (RSA). Each decoder 211 to 214 sends its decoded instruction to an execution queue in one of those RSAs if the decoded instruction needs some processing by an address calculation unit. This type of instructions may include, for example, load instructions and store instructions. Each decoder 211 to 214 selects a specific RSA as the destination of the decoded instruction, depending on the combination of information specified in two source operands of that instruction. The receiving RSA stores such instructions in its execution queue as they arrive from decoders 211 to 214, and dispatches those instructions to relevant address calculation units in the order that their required resources are ready.

The operation of decoders 211 to 214 will now be described in greater detail below. As those decoders 211 to 214 have similar circuit structure and operate similarly, the following description will focus on one decoder 211.

Figure 10:
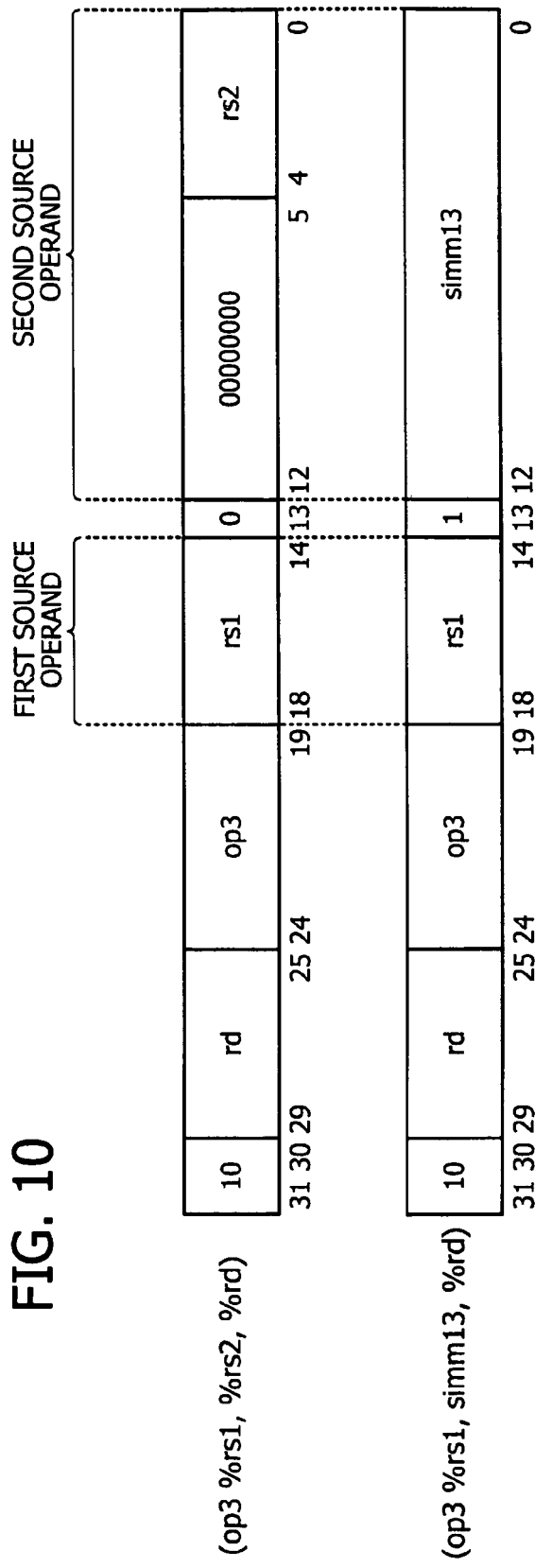
FIG. 10 illustrates example formats of computational instructions to be entered to a decoder.

FIG. 10 illustrates example formats of instructions to be entered to a decoder. What is seen in this example of FIG. 10 is a part of the instruction set of the SPARC V9 processor architecture, where SPARC is a registered trademark of SPARC International, Inc. Instructions of SPARC V9 are 32 bits in length. When an instruction is given, the decoder 211 identifies the type of computation from the combination of two field values, one in a six-bit field of bit 19 to bit 24, and the other in a two-bit field of bit 30 and bit 31. The latter two-bit field is set to "10" for the instructions to be executed by a general-purpose execution unit. The former six-bit field contains an operation code (referred to as "op3") that indicates a specific computational operation. In the case of, for example, add instructions, the lower four bits of op3 are set to 0x00 while the remaining two bits are set to zeros. In the case of subtract instructions, the lower four bits of op3 are set to 0x04 while the remaining two bits are set to zeros.

The instructions have a five-bit field in bit 25 to bit 29 to contain a register number (hereafter "rd") indicating which register is to receive the computation result. Another five-bit field is defined in bit 14 to bit to accommodate a first source operand. The five-bit value in this first source operand field represents a register number (hereafter "rs1") indicating which register is to supply its data to input port IN1 of the specified execution unit.

The illustrated instructions also have a 13-bit field in bit 0 to bit 12 to accommodate a second source operand. Bit 13 indicates whether the second source operand is a register number or an immediate value. More specifically, if bit 13 is set to zero, it means that the second source operand is a register number as seen in the upper half of FIG. 10. In this case, the lowest five bits (bit 0 to bit 4) carry a register number (hereafter "rs2") indicating which register is to supply its data to input port IN2 of the specified execution unit. The remaining part (bit 5 to bit 12) is fixed to "00000000." If bit 13 is set to one, it means that the second source operand is a signed immediate value (hereafter "simm13") with a length of 13 bits as seen in the lower half of FIG. 10.

The instruction seen in the upper half of FIG. 10 is expressed as "op3 % rs1, % rs2, % rd" in the assembly language. This instruction instructs that the values stored in registers rs1 and rs2 are subjected to a computation specified by op3, and register rd is to receive the result of the computation. On the other hand, the instruction seen in the lower half of FIG. 10 is expressed as "op3 % rs1, simm13, % rd" in the assembly language. This instruction instructs that the value stored in register rs1 and an immediate value simm13 are subjected to a computation specified by op3, and register rd is to receive the result of the computation.

As can be seen from FIG. 10, the decoder 211 receives instructions which basically specify a register number in their first source operand field and a register number or an immediate value in their second source operand field. The instruction set discussed in FIG. 10 may further include a register number "g0" in a source operand. When specified in a source operand, this register number "g0" causes a constant value of zero to be read out of a corresponding register. The decoder 211 interprets this register number "g0" as if an immediate value "0" were specified in the source operand field, thus outputting that immediate value "0" instead of register number g0 per se. In the rest of this description, this constant-valued register number g0 in a source operand will be distinguished from other register numbers rs1 and rs2, which represent substantive (or real) registers used to store variables.

While the above section has exemplified g0 as a register number producing a constant value of zero, the proposed processing apparatus is not limited by that specific example. For example, the processing apparatus may have more register numbers to produce other non-zero constant values. The decoder 211 handles such register numbers as immediate values in the same way as it does for g0.

As can be seen from the above, various data types (e.g., rs1, rs2, simm13, g0) are available for the first and second source operands. The following six patterns represent the possible combinations of source operands:

pattern #1: rs1, rs2
pattern #2: rs1, g0
pattern #3: g0, rs2
pattern #4: g0, g0
pattern #5: rs1, simm13
pattern #6: g0, simm13 where, for example, the pattern "rs1, rs2" denotes that two register numbers rs1 and rs2 are specified in the first source operand and second source operand, respectively.

The decoder 211 determines what combination pattern of data types is specified in the first and second source operands of a given instruction. Based on the determined combination pattern, the decoder 211 then selects an execution unit for execution of the instruction. While the above list provides six possible patterns, it is only pattern #1 and pattern #3 that allows the second source operand to specify substantive registers. Pattern #4 and pattern #6 allow neither of the first source operand and second source operand to specify substantive registers.

In view of the above, the decoder 211 according to the second embodiment classifies the above combination patterns into three groups listed below, depending on the number of substantive registers that are specified in the second source operand.

group A1: pattern #1 (rs1, rs2), pattern #3 (g0, rs2)
group B1: pattern #2 (rs1, g0), pattern #5 (rs1, simm13)
group C1: pattern #4 (g0, g0), pattern #6 (g0, simm13)

Each group corresponds to particular execution units, and the decoder 211 uses this classification in determining to which execution unit the given instruction has to be issued.

Figure 11:
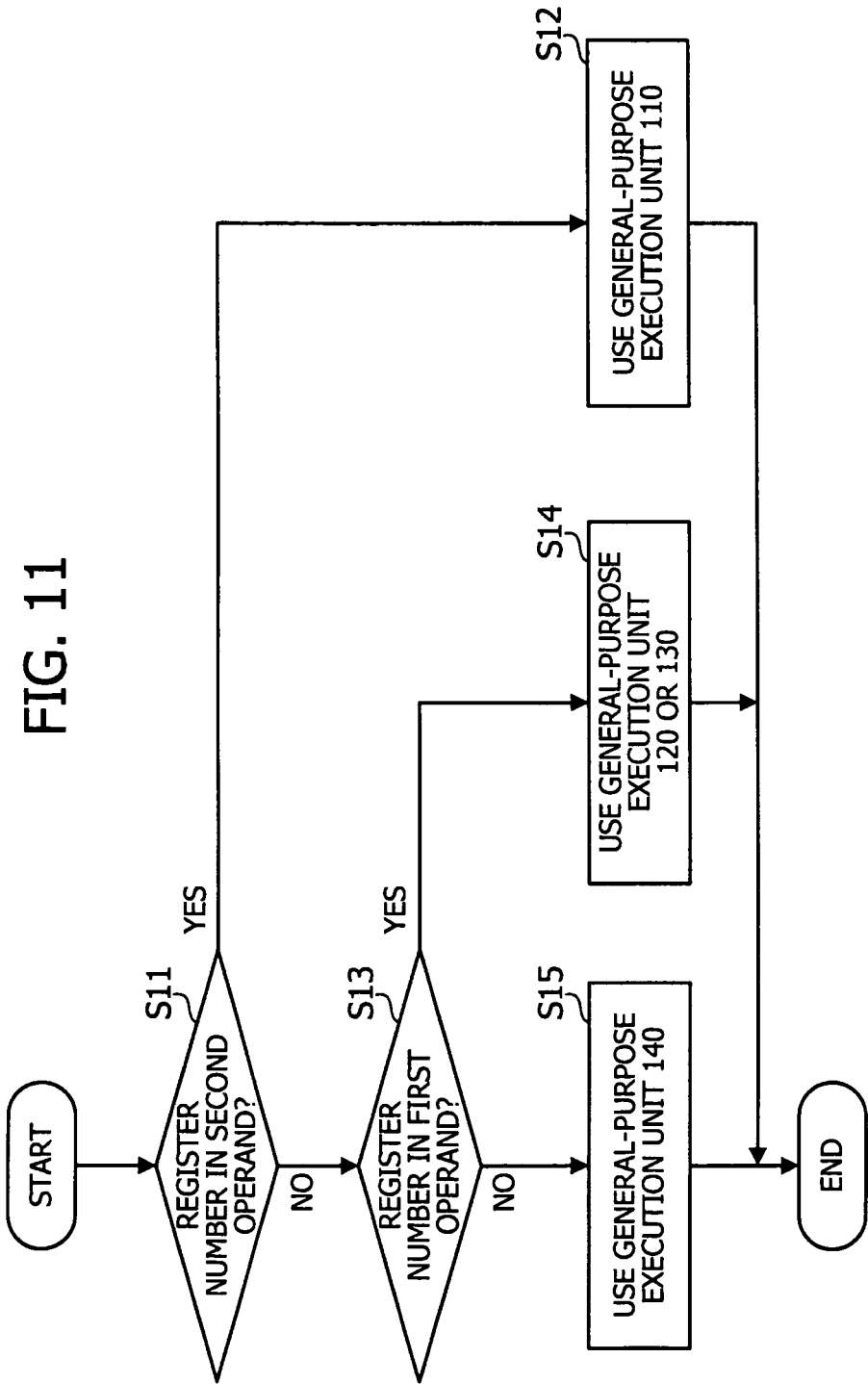
FIG. 11 is a flowchart of a process executed by a decoder according to the second embodiment.

FIG. 11 is a flowchart of a process executed by a decoder according to the second embodiment. The process illustrated in FIG. 11 is executed by a decoder 211 when its decoded instruction is determined to request a computation that is executable with a general-purpose execution unit.

(Step S11) The decoder 211 determines whether the second source operand in the decoded instruction specifies a register number rs2 representing a substantive register. If the second source operand specifies rs2 (Yes at step S11), the decoder 211 proceeds to step S12. If the second source operand specifies some other thing than rs2 (No at step S11), the decoder 211 advances to step S13.

(Step S12) Since the second source operand specifies a register number rs2 (Yes at step S11), the current combination of first and second source operands matches with pattern #1 or pattern #3 in group A1 discussed above. The decoder 211 then takes action to execute the instruction by using a general-purpose execution unit 110 that accepts register values at both input ports IN1 and IN2. That is, the decoder 211 enqueues the decoded instruction into the reservation station 221 associated with the general-purpose execution unit 110.

(Step S13) The decoder 211 determines whether the first source operand in the decoded instruction specifies a register number rs1 representing a substantive register. If the first source operand specifies rs1 (Yes at step S13), the decoder 211 proceeds to step S14. If the first source operand specifies some other thing than rs1 (No at step S13), the decoder 211 advances to step S15.

(Step S14) Since the second source operand does not specify a register number rs2 (No at step S11), and since the first source operand specifies a register number rs1 (Yes at step S13), the current combination of first and second source operands matches with pattern #2 or pattern #5 in group B1 discussed above. The decoder 211 then takes action to execute the instruction by using a general-purpose execution unit 120 or 130 which accepts register values at one input port IN1 while the other input port IN2 only receives immediate values from the instruction controller 200. That is, the decoder 211 enqueues the decoded instruction to the reservation station 222 associated with the general-purpose execution units 120 and 130.

(Step S15) Since neither of the first and second source operands specifies a register number rs1 or rs2 (No at steps S11 and S13), the current combination of first and second source operands matches with pattern #4 or pattern #6 in group C1 discussed above. The decoder 211 then takes action to execute the instruction by using a general-purpose execution unit 140 whose input ports IN1 and IN2 only accept immediate values from the instruction controller 200. That is, the decoder 211 enqueues the decoded instruction to the reservation station 223 associated with the general-purpose execution unit 140.

It is noted that the decoder 211 may find register number g0 specified in a source operand at steps S12 and S14 discussed above. Since this g0 specifies a particular constant, the decoder 211 replaces the source operand with an immediate value of that constant before enqueuing the instruction to a relevant reservation station 221 or 222. Or alternatively, the decoder 211 may enqueue the instruction to a relevant reservation station 221 or 222 without replacing the source operand, so that the reservation station 221 or 222 will replace the specified register number g0 with its corresponding immediate value when dispatching the instruction.

According to the above-described processing of FIG. 11, the instruction is enqueued to a reservation station 221 in the case where the combination of source operands falls in group A1. In the case where the combination of source operands falls in group B1, the instruction is enqueued to another reservation station 222. In the case where the combination of source operands falls in group C1, the instruction is enqueued to yet another reservation station 223.

When a source operand specifies register number g0 representing a constant, that source operand is treated as if it were an immediate value. This feature permits the general-purpose execution units 120 and 130 to handle the instructions that match with pattern #2 (i.e., register number "g0" in the second source operand), thus reducing the number of instructions that are directed to the general-purpose execution unit 110. In other words, it is possible to distribute the load of computation. Particularly, the second embodiment is designed to provide more general-purpose execution units that accept register values at only one input port IN1 than those that accept register values at both input ports IN1 and IN2. This design enhances the advantage of replacing register number "g0" in a source operand with an immediate value and thus brings a more prominent effect of load distribution.

While not specifically depicted, the instruction controller 200 includes reservation stations associated with the address calculation units 150, 160, and 170. These reservation stations are called "reservation station for address generate" (RSA). Each decoder 211 to 214 sends its decoded instruction to an execution queue in one of those RSAs if the decoded instruction needs some processing by an address calculation unit. This type of instructions may include, for example, load instructions and store instructions. Each decoder 211 to 214 selects a specific RSA as the destination of the decoded instruction, depending on the combination of information specified in two source operands of that instruction.

When a given instruction needs some processing by an address calculation unit, the decoders 211 to 214 perform a procedure similar to the one discussed in FIG. 11 to select an appropriate reservation station (or RSA) associated with the address calculation unit that is to execute the needed processing. For example, when the given combination of first and second source operands matches with a pattern in group A1, the decoder 211 enqueues the instruction to an RSA associated with the address calculation unit 150 similarly to step S12. When the given combination of first and second source operands matches with a pattern in group B1, the decoder 211 enqueues the instruction to an RSA associated with the address calculation units 160 and 170 similarly to step S14. It is noted that the combination patterns of first and second source operands never fall in group C1 in the case where the instruction is among those that need some processing by an address calculation unit.

The RSAs are designed to store instructions in their respective internal execution queues as they arrive from decoders 211 to 214 and dispatch those instructions to relevant address calculation units in the order that their required resources are ready.

Figure 12:
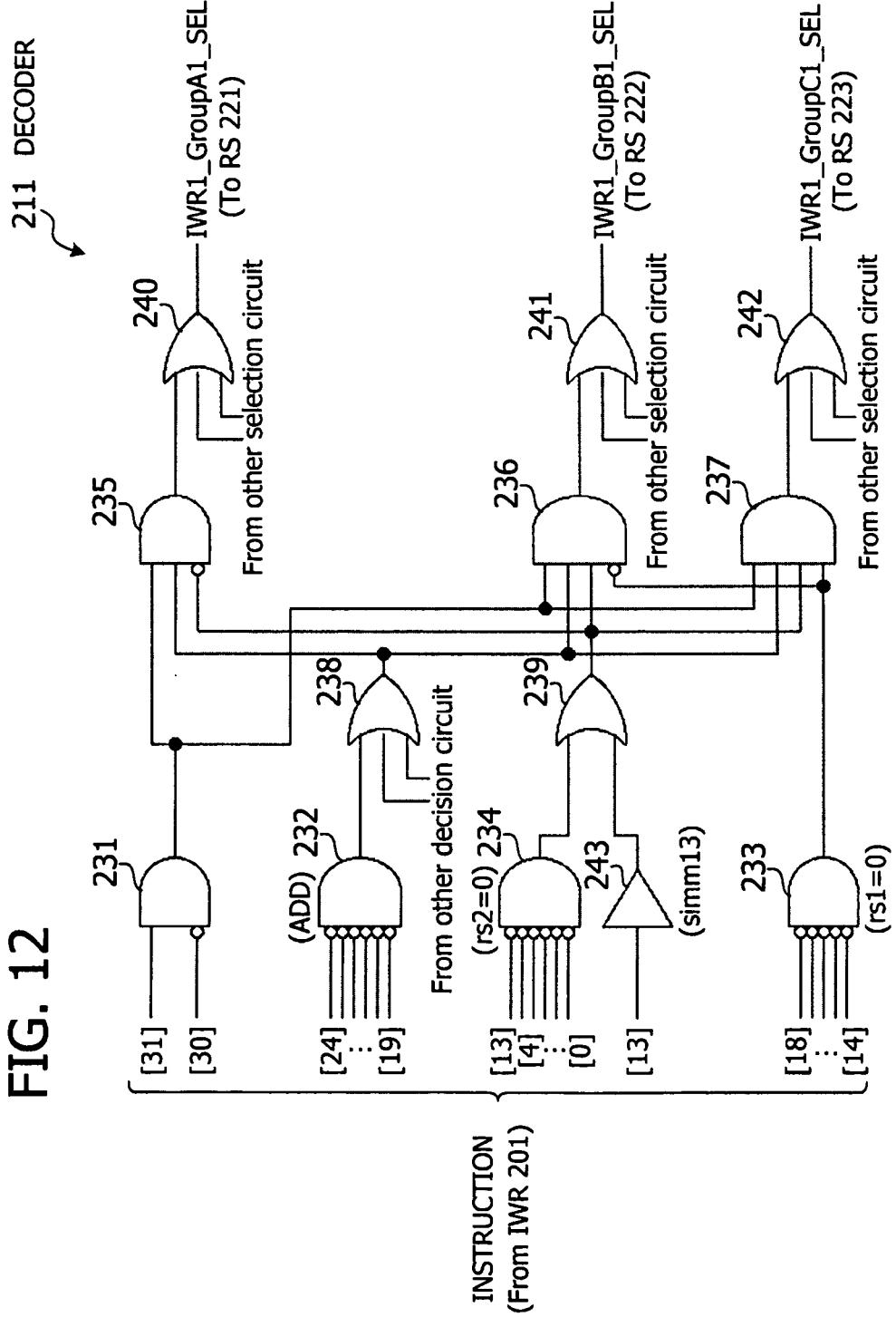
FIG. 12 illustrates an example circuit structure of a decoder according to the second embodiment.

FIG. 12 illustrates an example circuit structure of a decoder according to the second embodiment. Specifically, FIG. 12 exemplifies a structure for decoding add instructions, while omitting components for other instructions. While FIG. 12 illustrates one decoder 211 alone, the same circuit configuration also applies to other decoders 212 to 214. The illustrated decoder 211 in FIG. 12 includes AND (logical product) gates 231 to 237, OR (logical sum) gates 238 to 242, and a buffer 243.

AND gates 231 and 232 constitute a logic circuit for detecting input of an ADD instruction. The former AND gate 231 receives a portion of the instruction in the instruction word register 201, i.e., an inverted value of bit 30 and a non-inverted value of bit 31. The latter AND gate 232 receives another portion of the instruction in the instruction word register 201, i.e. inverted values of bit 19 through bit 24. The former AND gate 231 asserts (turns on) its output when bit 30 is zero and bit 31 is one. The latter AND gate 232 asserts its output when bit 19 to bit 24 are all zeros. That is, the AND gates 231 and 232 assert their respective outputs when the given instruction specifies addition.

The output signal of AND gate 232 is supplied to an OR gate 238. Other inputs of this OR gate 238 are connected to outputs of decision circuits (not illustrated) that detect some other commutative instructions such as multiply instructions. While not depicted in FIG. 12, the decision circuit for multiply instructions asserts its output when the op3 field (bit 19 to bit 24) contains a value of 0x09 in its lower four bits and zeros in the remaining two bits. The OR gate 238 thus asserts its output when the instruction specifies a commutative operation. It is noted that the circuit of FIG. 12, except for the AND gate 232, works for any kind of commutative instruction (e.g., add, multiply).

Another AND gate 233 is placed to determine whether the first source operand of the given instruction specifies a register number rs1 representing a substantive register. This AND gate 233 receives inverted values of bit 14 to bit 18 of the instruction. When all of bit 14 to bit 18 are zeros (i.e., when the first source operand specifies register number g0 representing a constant), the AND gate 233 asserts its output. The AND gate 233 negates its output when at least one of those bits is set to one. This means that the first source operand specifies a register number rs1 representing a substantive register.

Another logic is formed from an AND gate 234, an OR gate 239, and a buffer 243 to determine whether the second source operand of the given instruction specifies a register number rs2 representing a substantive register. Specifically, the AND gate 234 receives inverted values of bit 13 and bit 0 through bit 4 of the instruction, while the buffer 243 receives bit 13 alone. The output signals of the AND gate 234 and buffer 243 are supplied to the OR gate 239.

The AND gate 234 negates (turns off) its output when bit 13 is set to one, i.e., when the second source operand specifies an immediate value simm13. The OR gate 239, however, asserts its output under this condition because the buffer 243 asserts its output because of this bit 13. The buffer 243 is placed to adjust the timing of bit 13 with the output of the AND gate 234 such that the two signals reach the OR gate 239 at the same time.

The AND gate 234 also negates its output when bit 13 is zero while at least one of bit 0 to bit 4 is set to one. In other words, this is when the second source operand specifies a register number rs2 representing a substantive register. The OR gate 239 stays in the off state since the output of the buffer 243 is also negated in this situation.

The AND gate 234 asserts its output when bit 13 and bit 0 to bit 4 are all zeros. This is when the second source operand specifies register number g0 representing a constant. The OR gate 239 asserts its output accordingly.

Three AND gates 235 to 237 form a circuit that determines to which reservation station 221 to 223 to enqueue the given instruction. Specifically, one AND gate 235 receives output signals of the foregoing AND gate 231 and OR gate 238, together with an inverted output signal of the OR gate 239. Another AND gate 236 receives output signals of the AND gate 231 and OR gates 238 and 239, together with an inverted output signal of the AND gate 233. Yet another AND gate 237 receives output signals of the AND gates 231 and 233 and the OR gates 238 and 239.

When the instruction in the instruction word register 201 is not commutative (e.g., subtraction or other non-commutative operation), at least one of the AND gate 231 and OR gate 238 negates the output, which makes all the subsequent AND gates 235 to 237 negate their outputs. When, on the other hand, the instruction in the instruction word register 201 specifies a commutative operation (e.g., addition), both the AND gate 231 and OR gate 238 assert their respective outputs. In this condition, the illustrated circuit performs the following operation.

The AND gate 235 asserts its output when the combination of first and second source operands matches with pattern #1 or pattern #3 in group A1 discussed above (i.e., when the output of OR gate 239 is negated). Neither of the AND gates 236 and 237 asserts the output in this condition. The output signal of the AND gate 235 propagates as selection signal IWR1_GroupA1_SEL to a reservation station 221 via an OR gate 240. That is, when selection signal IWR1_GroupA1_SEL is asserted in consequence of the asserted output of the AND gate 235, the decoder 211 enqueues the instruction from the instruction word register 201 to the reservation station 221.

The AND gate 236 asserts its output when the combination of first and second source operands matches with pattern #2 or pattern #5 in the foregoing group B1 (i.e., when the output of OR gate 239 is asserted while the output of AND gate 233 is negated). Neither of the AND gates 235 and 237 asserts the output in this condition. The output signal of the AND gate 236 propagates as selection signal IWR1_GroupB1_SEL to a reservation station 222 via an OR gate 241. That is, when selection signal IWR1_GroupB1_SEL is asserted in consequence of the asserted output of the AND gate 236, the decoder 211 enqueues the instruction from the instruction word register 201 to the reservation station 222.

The AND gate 237 asserts its output when the combination of first and second source operands matches with pattern #4 or pattern #6 in the foregoing group C1 (i.e., when the outputs of OR gate 239 and AND gate 233 are both asserted). Neither of the AND gates 235 and 236 asserts the output in this condition. The output signal of the AND gate 237 propagates as selection signal IWR1_GroupC1_SEL to a reservation station 223 via an OR gate 242. That is, when selection signal IWR1_GroupC1_SEL is asserted in consequence of the asserted output of the AND gate 237, the decoder 211 enqueues the instruction from the instruction word register 201 to the reservation station 223.

The above-described circuit of FIG. 12 executes the process discussed in FIG. 11 when the instruction in the instruction word register 201 initiates a commutative operation such as addition. While not specifically depicted, the decoder 211 also includes a selection circuit to select a destination for queuing instructions other than commutative instructions. This selection circuit may be provided in plurality to handle different kinds of computations. Each selection circuit provides the OR gate 240 with a respective selection signal, which is asserted when a reservation station 221 is selected for the decoded instruction. Each selection circuit also provides the OR gate 241 with a selection signal, which is asserted when another reservation station 222 is selected for the decoded instruction. Each selection circuits further provides the OR gate 242 with a selection signal, which is asserted when yet another reservation station 223 is selected for the decoded instruction.

The above-described second embodiment adds more execution units while suppressing the increase of read paths from a register file 300 to those execution units. The second embodiment makes it possible to use execution units more efficiently and enhance the parallelism of operations by allocating execution units according to the combination pattern of first and second source operands of each decoded instruction.

The above-described second embodiment includes four general-purpose execution units 110, 120, 130, and 140. In reality, however, it is seldom the case where neither of two source operands specifies register numbers of substantive registers in the case of general-purpose processors. This means that the general-purpose execution unit 140 may be omitted since its input ports IN1 and IN2 only receive immediate values. The reservation station 223 in FIG. 9 may then be omitted as well. With the absence of that general-purpose execution unit 140, the second embodiment may be modified in such a way that decoders enqueue decoded instructions to the reservation station 222 when the combination of source operands matches with pattern #4 or pattern #6 in group C1.

(c) Third Embodiment

This section describes a processing apparatus according to a third embodiment. In this third embodiment, the decoders 211 to 214 discussed in the second embodiment are modified to select execution units as follows. As described before, the values of first and second source operands may be combined in various patterns, of which pattern #1 is the only pattern that specifies substantive registers in both source operands. Patterns #2, #3, and #5 include a substantive register in only one of the two source operands. In the third embodiment, the decoders 211 to 214 are designed to classify the above combination patterns into three groups listed below, depending on the total number of substantive registers specified in two source operands.

group A2: pattern #1 (rs1, rs2)
group B2: pattern #2 (rs1, g0), pattern #3 (g0, rs2), pattern #5 (rs1, simm13)
group C2: pattern #4 (g0, g0), pattern #6 (g0, simm13)

Each group corresponds to particular execution units, and the decoders 211 to 214 use this classification in determining to which execution unit a given instruction has to be issued.

Group B2 specifies a substantive register in only one source operand. This source operand may be either the first source operand or the second source operand. To implement the noted features of classification, the third embodiment modifies the decoders and general-purpose execution units 120 and 130 to have a function of swapping the first source operand and second source operand.

Figure 13:
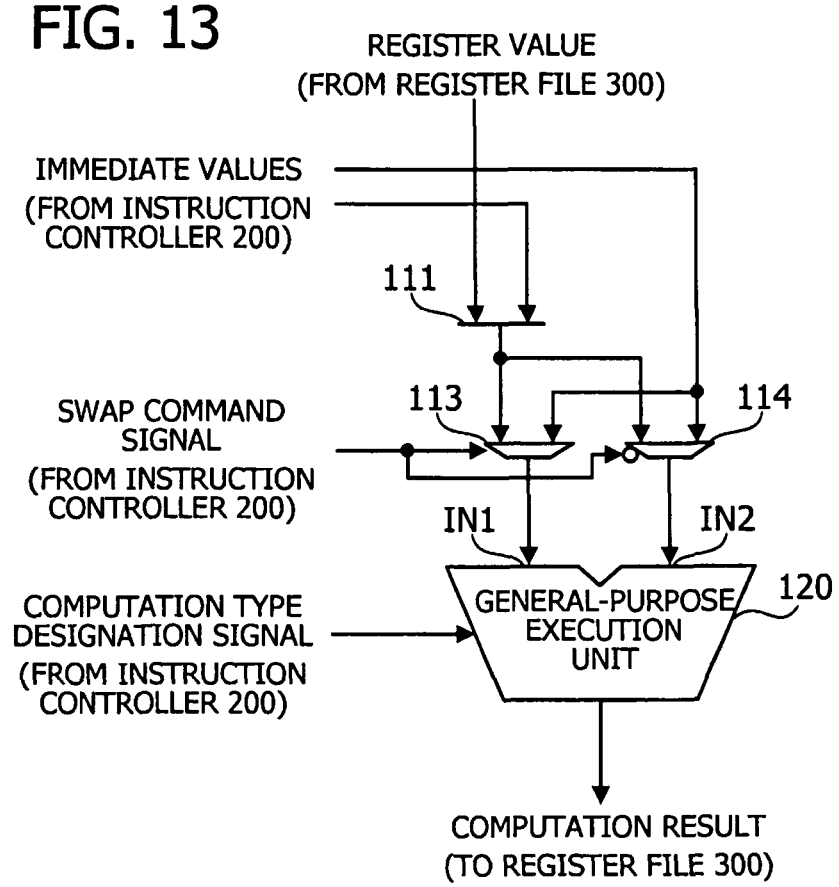
FIG. 13 illustrates an example of input and output signals of general-purpose execution units used in a third embodiment.

FIG. 13 illustrates an example of input and output signals of general-purpose execution units used in the third embodiment. FIG. 13 shares some symbols and reference numerals with FIG. 4 to designate similar elements.

The processing apparatus according to the third embodiment includes a selector placed at the front end of general-purpose execution units to swap the operands. This additional selector is applied to general-purpose execution units 120 and 130 which accept register values at only one input port IN1 or IN2. FIG. 13 illustrates input and output signals of one general-purpose execution unit 120 as an example. The illustrated general-purpose execution unit 120 has two selectors 113 and 114 at input ports IN1 and IN2, respectively, in addition to the existing multiplexer 111.

Each selector 113 and 114 has two input ports, referred to as the "left input port" and "right input port" as viewed in FIG. 13. The left input port of the selector 113 receives either a register value from the register file 300 or an immediate value from the instruction controller 200, via the multiplexer 111. The left input port of the other selector 114 similarly receives either a register value from the register file 300 or an immediate value from the instruction controller 200, via the same multiplexer 111. The right input ports of the selectors 113 and 114 receive an immediate value from the instruction controller 200.

The instruction controller 200 sends a swap command signal to the selectors 113 and 114. One selector 113 receives this swap command signal as is, while the other selector 114 receives an inverted version of the swap command signal. For example, when the swap command signal is negated, the selector 113 selects an input signal at the left input port, and the selector 114 selects an input signal at the right input port. In this state, the general-purpose execution unit 120 can receive either a register value or an immediate value at input port IN1, and only an immediate value at input port IN2, similarly to its counterpart discussed in the second embodiment.

When the swap command signal is asserted, the selector 113 selects an input signal at the right input port, and the selector 114 selects an input signal at the left input port. In this state, the general-purpose execution unit 120 can receive only an immediate value at input port IN1, and a register value or an immediate value at input port IN2. That is, the swap command signal, when asserted, swaps the two data values specified in the first source operand and second source operand of an instruction before they reach the general-purpose execution unit 120.

While not specifically depicted, another general-purpose execution unit 130 is configured in the same way as the above general-purpose execution unit 120 of FIG. 13. That is, the general-purpose execution unit 130 is also operable to receive input signals at its input ports IN1 and IN2 in the combinations discussed above.

Figure 14:
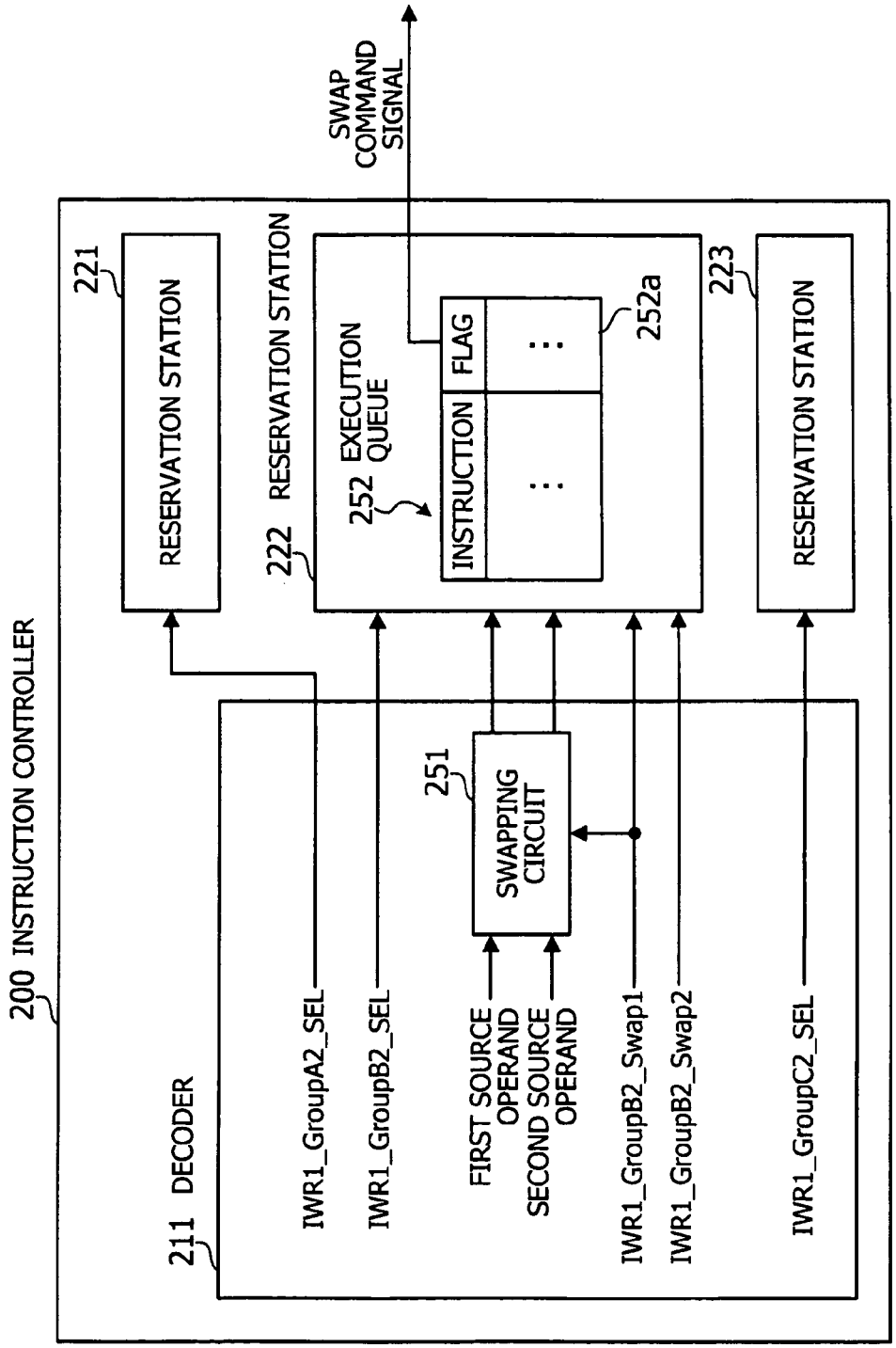
FIG. 14 illustrates an example structure of a decoder and reservation stations according to the third embodiment, as well as signals that they may exchange.

FIG. 14 illustrates an example structure of a decoder and reservation stations according to the third embodiment, as well as signals that they may exchange. FIG. 14 shares some reference numerals with FIG. 9 to designate similar elements.

The illustrated instruction controller 200 includes reservation stations 221 and 223 associated with general-purpose execution units 110 and 140 (not illustrated), respectively. These two reservation stations 221 and 223 in the third embodiment are configured in the same way as their counterparts in the foregoing second embodiment. The instruction controller 200 also includes a reservation station 222 associated with general-purpose execution units 120 and 130 (not illustrated). The reservation station 222 contains an execution queue 252 to store instructions received from decoders 211 to 214. The third embodiment configures this reservation station 222 such that its execution queue 252 further stores a swap flag 252a for each enqueued instruction. This swap flag 252a indicates whether to swap the operands when the corresponding instruction is dispatched to the general-purpose execution unit 120 or 130.

According to the third embodiment, the decoder 211 outputs selection signals IWR1_GroupA2_SEL, IWR1_GroupB2_SEL, IWR1_GroupC2_SEL, IWR1_GroupB2_Swap1, and IWR1_GroupB2_Swap2. The decoder 211 further includes a swapping circuit 251 operable to swap the first and second source operands in an instruction supplied from the instruction word register 201. When selection signal IWR1_GroupB2_Swap1 is asserted, the swapping circuit 251 swaps the first and second source operands before the instruction is enqueued to the reservation station 222.

Selection signal IWR1_GroupA2_SEL is supplied to the reservation station 221. The decoder 211 asserts this selection signal IWR1_GroupA2_SEL when the combination pattern of first and second source operands of a given instruction falls in group A2 discussed above. The decoder 211 then enqueues the instruction to the reservation station 221.

Selection signals IWR1_GroupB2_SEL, IWR1_GroupB2_Swap1, and IWR1_GroupB2_Swap2 are all directed to the reservation station 222. The decoder 211 asserts one of these selection signals IWR1_GroupB2_SEL, IWR1_GroupB2_Swap1, and IWR1_GroupB2_Swap2 when the combination of first and second source operands of a given instruction matches with a pattern in group B2 discussed above.

More specifically, the decoder 211 asserts selection signal IWR1_GroupB2_SEL when the combination of first and second source operands matches with pattern #2 or pattern #5. In this case, the decoder 211 enqueues the instruction to the reservation station 222 without activating the swapping circuit 251 to swap the first and second source operands.

The decoder 211 asserts selection signal IWR1_GroupB2_Swap1 when the combination of first and second source operands matches with pattern #3, and when the instruction instructs a commutative operation. In this case, the decoder 211 enqueues the instruction to the reservation station 222 while activating the swapping circuit 251 to swap the first and second source operands.

The decoder 211 asserts selection signal IWR1_GroupB2_Swap2 when the combination of first and second source operands matches with pattern #3, and when the instruction instructs a non-commutative operation. In this case, the decoder 211 enqueues the instruction to the reservation station 222 without swapping the first and second source operands at the swapping circuit 251. With the selection signal IWR1_GroupB2_Swap2 asserted, the reservation station 222 turns on a swap flag 252a corresponding to the instruction entered to the execution queue 252.

As it does in the foregoing second embodiment, the reservation station 222 dispatches instructions from its execution queue 252 to either of the general-purpose execution units 120 and 130 in the order that their necessary computational resources are ready. According to the third embodiment, the reservation station 222 checks the swap flag 252a associated with each instruction to be dispatched. When the swap flag 252a is on, the reservation station 222 asserts a swap command signal for the destination general-purpose execution unit to control its selectors 113 and 114. In response, the selectors 113 and 114 in the destination general-purpose execution unit swap the operand values before they reach the input ports IN1 and IN2. When the swap flag 252a is off, the reservation station 222 negates the swap command signal for the destination general-purpose execution unit, not to swap the operand values at its selectors 113 and 114.

Selection signal IWR1_GroupC2_SEL is supplied to the reservation station 223. The decoder 211 asserts this selection signal IWR1_GroupC2_SEL when the combination of first and second source operands of a given instruction matches with a pattern in group C2 discussed above. The decoder 211 then enqueues the given instruction to the reservation station 223.

While FIG. 14 illustrates only one decoder 211, the described structure of this decoder 211 also applies to other decoders 212 to 214. The above section has only discussed the reservation stations associated with general-purpose execution units, but the decoders 211 to 214 may also interact with other reservation stations (RSA) associated with address calculation units.

Figure 15:
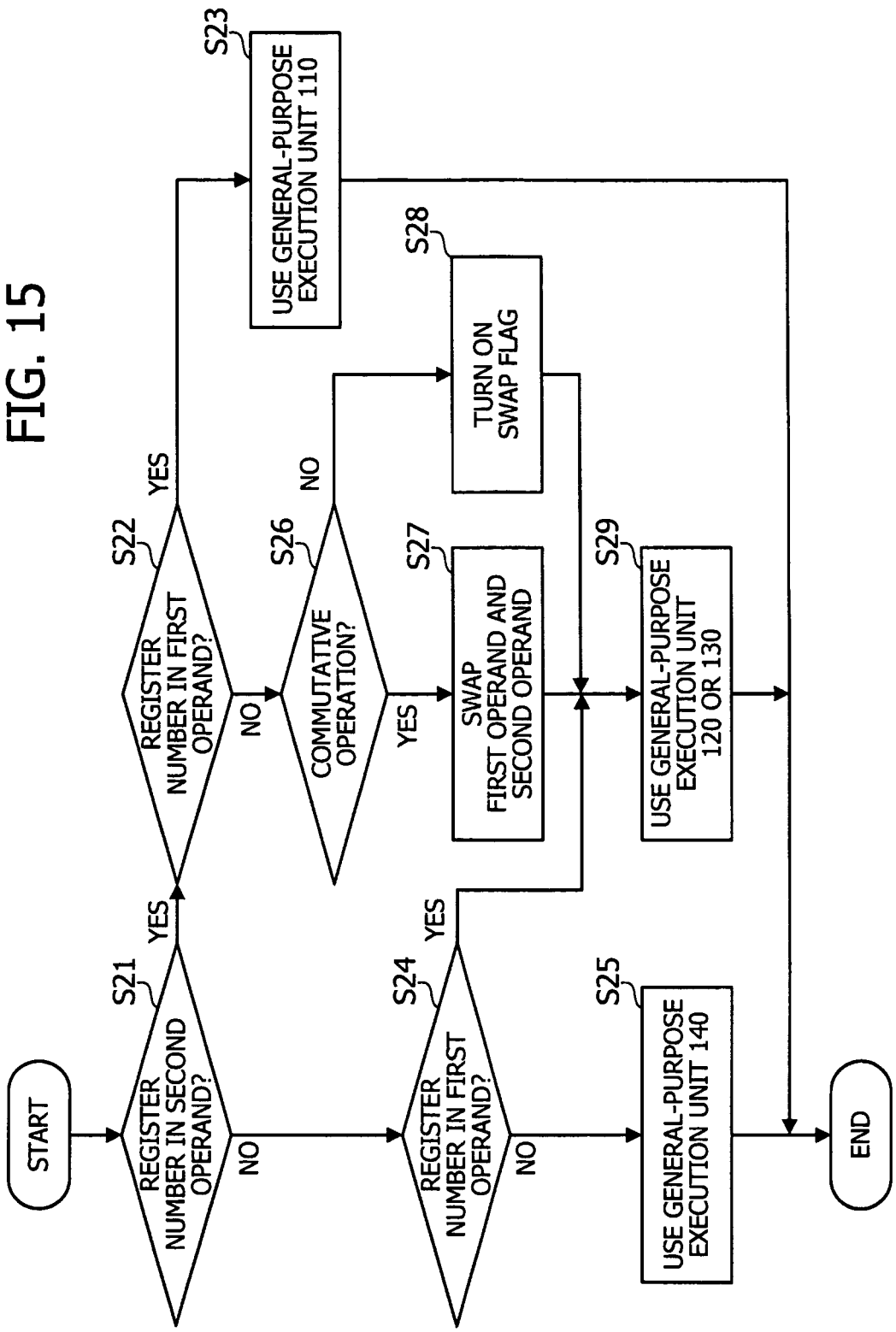
FIG. 15 is a flowchart of a process executed by a decoder according to the third embodiment.

FIG. 15 is a flowchart of a process executed by a decoder according to the third embodiment. Specifically, the process illustrated in FIG. 15 is executed by a decoder 211 when its decoded instruction is determined to request a computation that is executable with a general-purpose execution unit.

(Step S21) The decoder 211 determines whether the second source operand of a given instruction specifies a register number rs2 representing a substantive register. If the second source operand specifies rs2 (Yes at step S21), the decoder 211 proceeds to step S22. If the second source operand specifies some other thing than rs2 (No at step S21), the decoder 211 advances to step S24.

(Step S22) The decoder 211 determines whether the first source operand of the given instruction specifies a register number rs1 representing a substantive register. If the first source operand specifies rs1 (Yes at step S22), the decoder 211 proceeds to step S23. If the first source operand specifies some other thing than rs1 (No at step S22), the decoder 211 advances to step S26.

(Step S23) Since both the first and second source operands specify register numbers (Yes at steps S21 and S22), the current combination of first and second source operands matches with pattern #1 in group A2 discussed above. The decoder 211 then takes action to execute the instruction by using a general-purpose execution unit 110 that accepts register values at both input ports IN1 and IN2. That is, the decoder 211 asserts selection signal IWR1_GroupA2_SEL and enqueues the decoded instruction to the reservation station 221 associated with the general-purpose execution unit 110.

(Step S24) The decoder 211 determines whether the first source operand of the given instruction specifies a register number rs1 representing a substantive register. If the first source operand specifies rs1 (Yes at step S24), the decoder 211 proceeds to step S29. If the first source operand specifies some other thing than rs1 (No at step S24), the decoder 211 advances to step S25.

(Step S25) Since neither of the first and second source operands specifies a substantive register number rs1 or rs2 (No at steps S21 and S24), the current combination of source operands matches with pattern #4 or pattern #6 in group C2 discussed above. The decoder 211 then takes action to execute the instruction by using a general-purpose execution unit 140 whose input ports IN1 and IN2 only accept immediate values from the instruction controller 200. That is, the decoder 211 asserts selection signal IWR1_groupC2_SEL and enqueues the decoded instruction to the reservation station 223 associated with the general-purpose execution unit 140.

(Step S26) The decoder 211 examines operation code op3 in bit 19 to bit 24 of the given instruction to determine whether the requested computation is a commutative operation. When the requested computation is a commutative operation (Yes at step S26), the decoder 211 advances to step S27. When the requested operation is a non-commutative operation (No at step S26), the decoder 211 proceeds to step S28.

(Step S27) Since the second source operand specifies a register number rs2 (Yes at step S21), and since the first source operand does not specify a register number rs1 (No at step S22), the current combination of first and second source operands matches with pattern #3 in group B2 discussed above. Further, since the requested computation is a commutative operation (Yes at step S26), it is allowed to swap the source operands to continue the processing. Accordingly the decoder 211 asserts selection signal IWR1_GroupB2_Swap1 to cause its local swapping circuit 251 to swap the first source operand and second source operand.

(Step S28) Since the second source operand specifies a register number rs2 (Yes at step S21), and since the first source operand does not specify a register number rs1 (No at step S22), the current combination of first and second source operands matches with pattern #3 in group B2 discussed above. It is not allowed, however, to swap the first and second source operands at this stage of enqueuing the instruction to a reservation station, because the requested operation is not commutative (No at step S26). In this case, the decoder 211 commands the destination reservation station 222 to turn on a swap flag 252a when the instruction is enqueued. More specifically, the decoder 211 achieves this by asserting selection signal IWR1_GroupB2_Swap2.

(Step S29) The decoder 211 takes action to execute the instruction by using a general-purpose execution unit 120 or 130, which accepts register values at one input port IN1 while the other input port IN2 only receives immediate values from the instruction controller 200.

For example, Step S29 may be reached when the second source operand does not specify a register number rs2 (No at step S21) whereas the first source operand specifies a register number rs1 (Yes at step S24). If this is the case, the current combination of first and second source operands matches with pattern #2 or pattern #5 in group B2 discussed above. Accordingly the decoder 211 asserts selection signal IWR1_GroupB2_SEL and enqueues the decoded instruction to the reservation station 222 associated with the general-purpose execution units 120 and 130, without swapping source operands. The instruction is thus enqueued with a swap flag 252a turned off.

Step S29 may also be reached when the second source operand specifies a register number rs2 (Yes at step S21) whereas the first source operand does not specify a register number rs1 (No at step S22), and when the requested computation is a commutative operation (Yes at step S26). If this is the case, selection signal IWR1_GroupB2_Swap1 is asserted by the processing at step S27. Then at step S29, the decoder 211 enqueues the decoded instruction to the reservation station 222. In the reservation station 222, the execution queue 252 stores the instruction, whose first and second source operands have already been swapped by the swapping circuit 251, and whose associated swap flag 252a is turned off.

Step S29 may also be reached when the second source operand specifies a register number rs2 (Yes at step S21) while the first source operand does not specify a register number rs1 (No at step S22), and when the requested operation is not a commutative operation (No at step S26). If this is the case, selection signal IWR1_GroupB2_Swap2 has been asserted by the processing at step S28. Then at step S29, the decoder 211 enqueues the decoded instruction to the reservation station 222, not swapping source operands immediately, but turning on its swap flag 252a.

Figure 16:
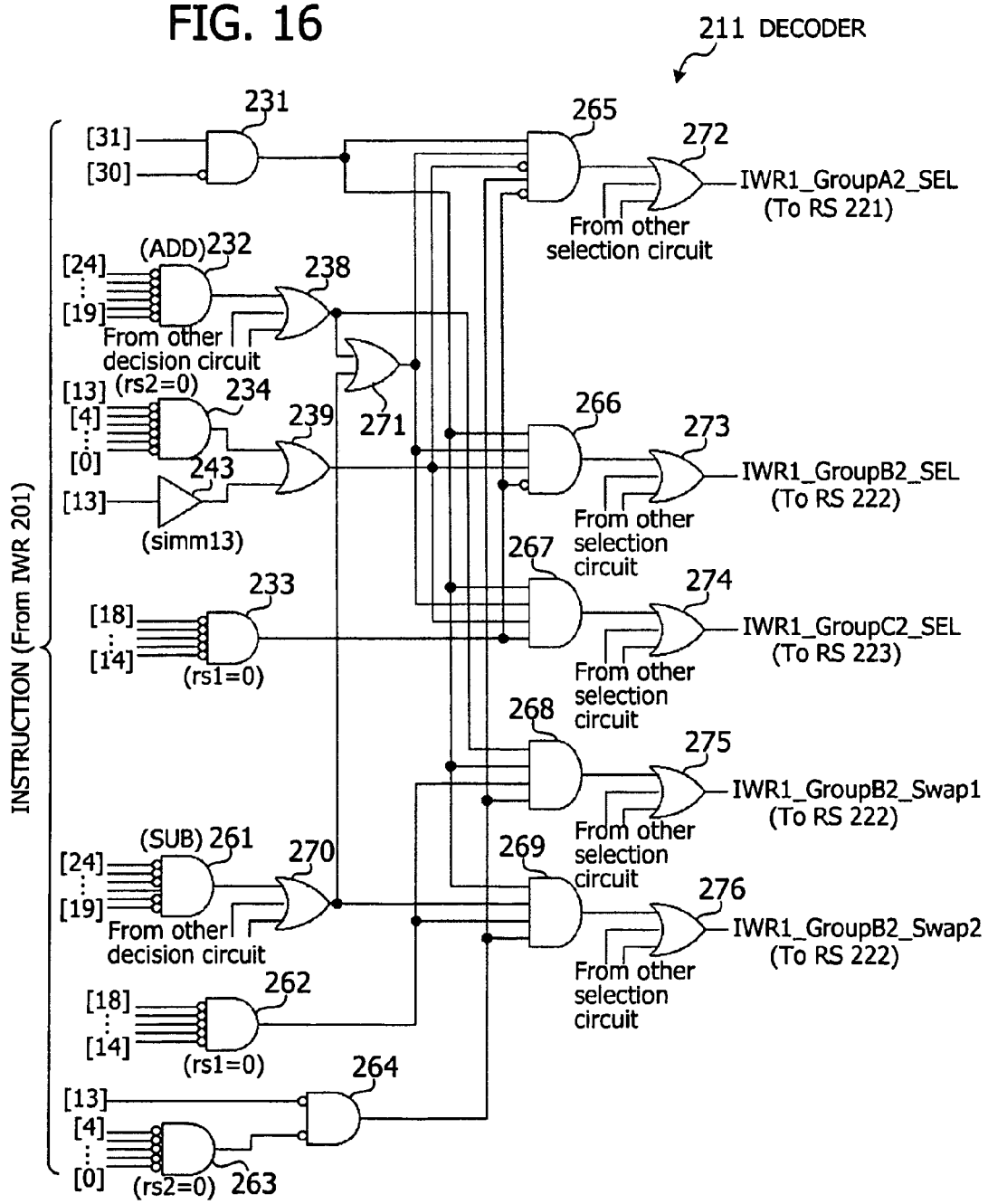
FIG. 16 illustrates an example circuit structure of a decoder according to the third embodiment.

FIG. 16 now illustrates an example circuit structure of a decoder according to the third embodiment. FIG. 16 shares some reference numerals with FIG. 12 to designate similar elements. FIG. 16 exemplifies a structure for decoding add instructions (ADD) and subtract instructions (SUB) as an example of commutative and non-commutative operations, respectively, while omitting components for other purposes. While FIG. 16 illustrates one decoder 211 alone, the same circuit configuration also applies to other decoders 212 to 214.

As can be seen in FIG. 16, the decoder 211 according to the third embodiment includes AND gates 231 to 233 and 261 to 269, OR gates 238, 239, and 270 to 276, and a buffer 243. As described in FIG. 12, AND gates 231 and 232 form a logic circuit for determining input of an ADD instruction. That is, when the instruction specifies an addition, the two AND gates 231 and 232 assert their respective outputs. The output signal of AND gate 232 is supplied to an OR gate 238. Other inputs of this OR gate 238 are connected to outputs of several decision circuits (not illustrated) that detect other kinds of commutative instructions. The OR gate 238 thus asserts its output when the instruction specifies a commutative operation.

As also described in FIG. 12, another AND gate 233 is placed to determine whether the first source operand of an instruction supplied from the instruction word register 201 specifies a register number rs1 representing a substantive register. Specifically, the AND gate 233 asserts its output when the first source operand specifies a register number g0 representing a constant. The AND gate 233 negates its output when the first source operand specifies a register number rs1 representing a substantive register.

As also described in FIG. 12, another logic circuit is provided by an AND gate 234, an OR gate 239, and a buffer 243 to determine whether the second source operand of the given instruction specifies a register number rs2 representing a substantive register. The AND gate 234 negates its output when the second source operand specifies an immediate value simm13. The OR gate 239, however, asserts its output under this condition because the buffer 243 asserts its output. The AND gate 234 negates its output when the second source operand specifies a register number rs2 representing a substantive register. The OR gate 239 negates its output since the output of the buffer 243 is also negated in that case. The AND gate 234 asserts its output when the second source operand specifies register number g0 representing a constant, which makes the OR gate 239 assert its output accordingly.

An AND gate 261 works together with the foregoing AND gate 231 to detect a subtract instruction. When the given instruction is a subtract instruction, the operation code field op3 (bit 19 to bit 24) contains 0x02 in its lower four bits and zeros in the remaining two bits. The AND gate 261 receives a non-inverted value of bit 21 and inverted values of the other bits of op3. When the given instruction specifies a subtraction, the two AND gates 231 and 261 assert their respective outputs.

The output signal of AND gate 261 is supplied to an OR gate 270. Other inputs of this OR gate 270 are connected to outputs of decision circuits (not illustrated) that detect some other non-commutative instructions such as divide instructions. While not depicted in FIG. 16, the decision circuit for divide instructions asserts its output when the op3 field (bit 19 to bit 24) contains a value of 0x0d in its lower four bits and zeros in the remaining two bits. The OR gate 270 thus asserts its output when the instruction specifies a non-commutative operation.

Another AND gate 262 is placed to determine whether the first source operand of the given instruction specifies a register number rs1 representing a substantive register. Specifically, this AND gate 262 asserts its output when the first source operand specifies register number g0 representing a constant. The AND gate 262 negates its output when the first source operand specifies a register number rs1 representing a substantive register. These functions of the AND gate 262 may be provided by the foregoing AND gate 233.

Two AND gates 263 and 264 constitute a logic circuit that determines whether the second source operand of the instruction specifies a register number rs2 representing a substantive register. The former AND gate 263 receives bit 0 through bit 4 of the instruction. The AND gate 263 asserts its output when bit 0 to bit 4 are all zeros, i.e., when the second source operand specifies register number g0 representing a constant. Otherwise, the output of the AND gate 263 is negated.

The latter AND gate 264 receives an inverted output signal of the AND gate 263, together with an inverted value of bit 13 of the instruction. The AND gate 264 negates its output when bit 13 is set to one, i.e., when the second source operand specifies an immediate value simm13. The AND gate 264 also negates its output when bit 13 is zero while bit 0 to bit 4 are all zeros. This is when the second source operand specifies register number g0 representing a constant. The output of the AND gate 264 is thus asserted when the second source operand specifies a register number rs2 representing a substantive register.

Output signals of the above OR gates 238 and 270 are supplied to an OR gate 271. As described above, the OR gate 238 asserts its output when the instruction specifies a commutative operation, and the OR gate 270 asserts its output when the instruction specifies a non-commutative operation. This means that the OR gate 271 asserts its output when the instruction specifies a commutative operation or a non-commutative operation.

Five AND gates 265 to 269 constitute a circuit that determines to which reservation station 221 to 223 to enqueue a given instruction. Specifically, one AND gate 265 receives output signals of the AND gates 231 and 264 and OR gate 271, together with inverted output signals of the AND gate 233 and OR gate 239. Another AND gate 266 receives output signals of the AND gate 231 and OR gates 239 and 271, together with an inverted output signal of the AND gate 233. Yet another AND gate 267 receives output signals of the AND gates 231 and 233 and OR gates 239 and 271. Still another AND gate 268 receives output signals of the AND gates 231, 262, and 264 and OR gate 238. Still another AND gate 269 receives output signals of the AND gates 231, 262, and 264 and OR gate 270.

In operation, the AND gate 231 and OR gate 271 assert their respective outputs when the instruction specifies a commutative operation or a non-commutative operation. The above-described five AND gates 265 to 269 then work as follows.

When the combination of first and second source operands matches with pattern #1 in group A2 discussed above, both the AND gate 233 and OR gate 239 negate their outputs, while the AND gate 264 asserts its output. Consequently the AND gate 265 asserts its output. This output signal of the AND gate 265 propagates as selection signal IWR1_GroupA2_SEL to a reservation station 221 via an OR gate 272. That is, when selection signal IWR1_GroupA2_SEL is asserted in consequence of the asserted output of the AND gate 265, the decoder 211 enqueues the instruction from the instruction word register 201 to the reservation station 221.

When the combination of first and second source operands matches with pattern #2 or pattern #5 in group B2 discussed above, the OR gate 239 asserts its output while the AND gate 233 negates its output. Consequently the AND gate 266 asserts its output. This output signal of the AND gate 266 propagates as selection signal IWR1_GroupB2_SEL to a reservation station 222 via an OR gate 273. That is, when selection signal IWR1_GroupB2_SEL is asserted in consequence of the asserted output of the AND gate 266, the decoder 211 enqueues the instruction from the instruction word register 201 to the reservation station 222, without swapping source operands.

When the combination of first and second source operands matches with pattern #4 or pattern #6 in group C2 discussed above, both the OR gate 239 and AND gate 233 assert their respective outputs. Consequently the AND gate 267 asserts its output. This output signal of the AND gate 267 propagates as selection signal IWR1_GroupC2_SEL to a reservation station 223 via an OR gate 274. That is, when selection signal IWR1_GroupC2_SEL is asserted in consequence of the asserted output of the AND gate 267, the decoder 211 enqueues the instruction from the instruction word register 201 to the reservation station 223.

When the combination of first and second source operands matches with pattern #3 in group B2 discussed above, both AND gates 262 and 264 assert their respective outputs. These asserted output signals are supplied to AND gates 268 and 269. In this situation, the decoder 211 operates as follows, depending on whether the requested computation is a commutative operation or a non-commutative operation.

When the instruction specifies a commutative operation, the OR gate 238 asserts its output while the OR gate 270 negates its output. This causes the AND gate 268 to assert its output and the AND gate 269 to negate its output. This asserted output signal of the AND gate 268 propagates as selection signal IWR1_GroupB2_Swap1 to a reservation station 222 via an OR gate 275, as well as to a swapping circuit 251 inside the decoder 211. That is, when selection signal IWR1_GroupB2_Swap1 is asserted in consequence of the asserted output of the AND gate 268, the decoder 211 enqueues the instruction from the instruction word register 201 to the reservation station 222, with the source operands swapped by the swapping circuit 251.

When, on the other hand, the instruction specifies a non-commutative operation, the OR gate 238 negates its output while the OR gate 270 asserts its output. This causes the AND gate 269 to assert its output and the AND gate 268 to negate its output. The asserted output signal of the AND gate 269 propagates as selection signal IWR1_GroupB2_Swap2 to the reservation station 222 via an OR gate 276. That is, when selection signal IWR1_GroupB2_Swap2 is asserted in consequence of the asserted output of the AND gate 269, the decoder 211 enqueues the instruction from the instruction word register 201 to the reservation station 222, without swapping source operands. With the selection signal IWR1_GroupB2_Swap2 asserted, the reservation station 222 turns on a swap flag 252*a* corresponding to the instruction entered to the execution queue 252.

The above-described decoder circuit of FIG. 16 executes the processing discussed in FIG. 15 when its associated instruction word register 201 provides an instruction including a commutative operation such as addition. While not specifically depicted, the decoder 211 according to the third embodiment may also include a selection circuit to select a destination for queuing other instructions than commutative and non-commutative instructions. This selection circuit may be provided in plurality to handle different kinds of computational operations. Each such selection circuit includes decision circuits similar to the AND gates 265 to 269 discussed in FIG. 16, thus determining which reservation station to use for queuing a given instruction. The resulting output signals from those decision circuits are then provided to the OR gates 272 to 276.

The above-described third embodiment makes it possible to swap the source operands of a computational instruction in the case where a substantive register is specified in one of them. This feature permits more frequent use of execution units that accept register values at only one input port IN1, in comparison with the second embodiment. It becomes less likely for computation requests to concentrate into other execution units such as those capable of accepting register values at both input ports IN1 and IN2, thus increasing the overall efficiency of computation. The improvement of computational efficiency would be more prominent with a greater number of execution units that accept register values at only one input port IN1.

(d) Fourth Embodiment

The third embodiment described in the previous section is designed to allocate an execution unit that accepts register values at one input port IN1 when one source operand specifies a substantive register, no matter whether the requested computation is a commutative operation or a non-commutative operation. In contrast, the fourth embodiment described below is designed to allocate an execution unit that accepts register values at one input port IN1 when one source operand specifies a substantive register, and only when the requested computation is a commutative operation.

As described before, the values of first and second source operands may be combined in various patterns. The fourth embodiment further divides the combinations falling in pattern #3 into the following two groups: pattern #3-1 in the case of commutative operations, and pattern #3-2 in the case of non-commutative operations. According to the fourth embodiment, the groups of combination patterns are redefined as follows:

group A3: pattern #1 (rs1, rs2), pattern #3-2 (g0, rs2: non-commutative operation)

group B3: pattern #2 (rs1, g0), pattern #3-1 (g0, rs2: commutative operation), pattern #5 (rs1, simm13)

group C3: pattern #4 (g0, g0), pattern #6 (g0, simm13)

The decoders 211 to 214 issue instructions to appropriate execution units depending on to which group each instructions belongs.

The fourth embodiment assumes that general-purpose execution units and address calculation units are configured to receive the same combinations of input signals (register values or immediate values) as those in the second embodiment. That is, general-purpose execution units 120 and 130 accept both register values and immediate values at one input port IN1, but only immediate values at the other input port IN2.

Figure 17:
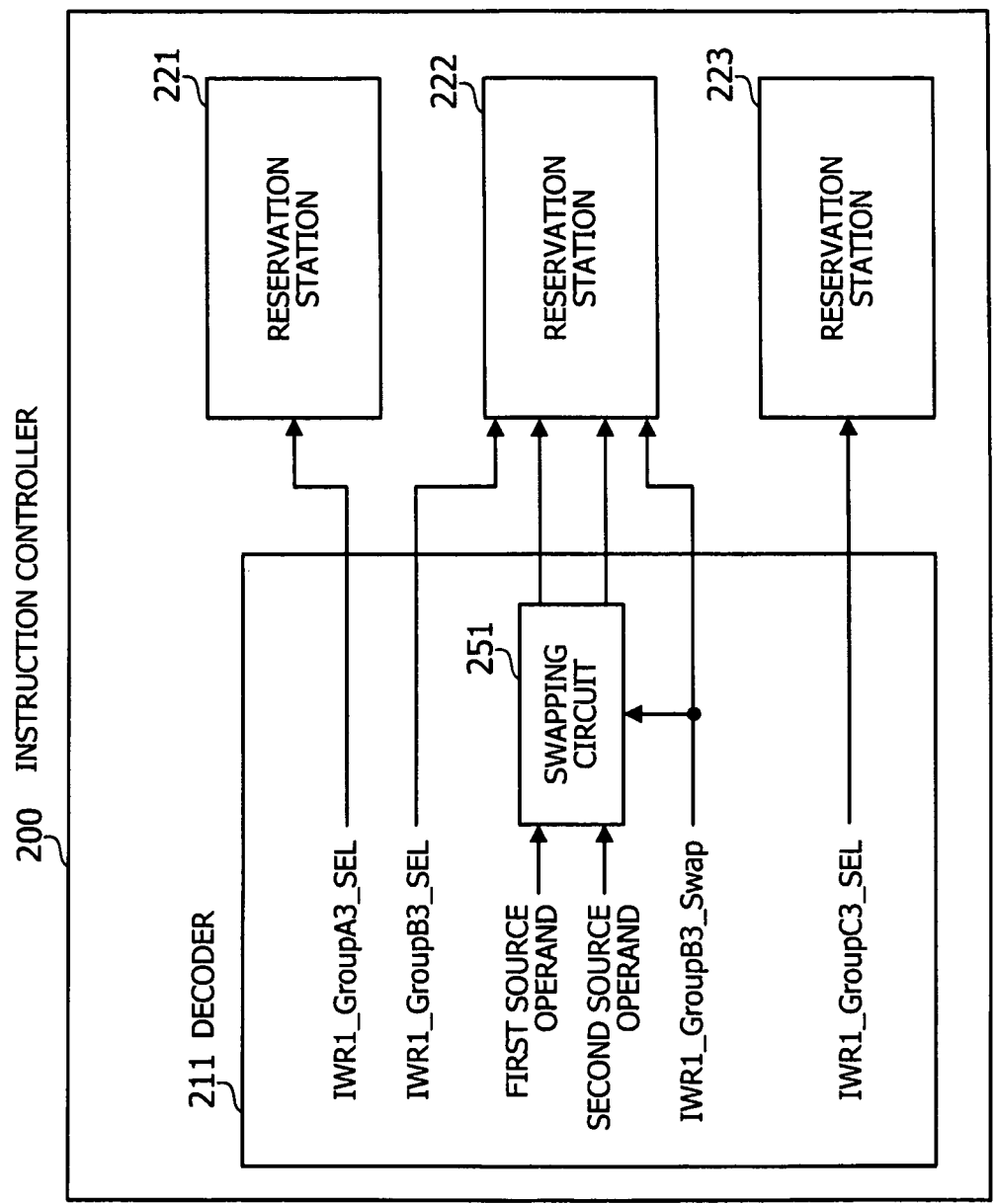
FIG. 17 illustrates an example structure of a decoder and reservation stations according to a fourth embodiment, as well as signals that they may exchange.

FIG. 17 illustrates an example structure of a decoder and reservation stations according to the fourth embodiment, as well as signals that they may exchange. FIG. 17 shares some reference numerals with FIG. 14 to designate similar elements.

Reservation stations 221 and 223 in the fourth embodiment are similar to their counterparts in the foregoing second embodiment. The reservation station 222, associated with general-purpose execution units 120 and 130, includes an execution queue (not illustrated) to store instructions. Unlike the third embodiment, this execution queue does not hold swap flags for the stored instructions.

According to the fourth embodiment, the decoder 211 outputs selection signals IWR1_GroupA3_SEL, IWR1_GroupB3_SEL, IWR1_GroupC3_SEL, and IWR1_GroupB3_Swap as will be described below. Similarly to the third embodiment, the decoder 211 includes a swapping circuit 251 operable to swap the first and second source operands of an instruction. When selection signal IWR1_GroupB3_Swap is asserted, this swapping circuit 251 swaps the first and second source operands before the instruction is enqueued to a reservation station 222.

Selection signal IWR1_GroupA3_SEL is supplied to the reservation station 221. The decoder 211 asserts this selection signal IWR1_GroupA3_SEL when the combination of first and second source operands of a given instruction matches with a pattern in group A3 discussed above. The decoder 211 then enqueues the instruction to another reservation station 221.

Selection signals IWR1_GroupB3_SEL and IWR1_GroupB3_Swap are supplied to the reservation station 222. The decoder 211 asserts selection signal IWR1_GroupB3_SEL or IWR1_GroupB3_Swap when the combination of first and second source operands of a given instruction matches with a pattern in group B3 discussed above. More specifically, the decoder 211 asserts the former selection signal IWR1_GroupB3_SEL when the combination of first and second source operands matches with pattern #2 or pattern #5. The decoder 211 enqueues the instruction to the reservation station 222 without swapping its source operands. The swapping circuit 251 is not activated in this case. The decoder 211 asserts the latter selection signal IWR1_GroupB3_Swap when the combination of first and second source operands matches with pattern #3-1. In this case, the decoder 211 enqueues the instruction to the reservation station 222 while activating the swapping circuit 251 to swap the first and second source operands.

The decoder 211 asserts selection signal IWR1_GroupC3_SEL when the combination of first and second source operands of a given instruction matches with pattern #4 or pattern #6 in group C3 discussed above. The decoder 211 then enqueues the given instruction to yet another reservation station 223.

While FIG. 17 illustrates only one decoder 211, the described structure of this decoder 211 also applies to other decoders 212 to 214. The above discussion in FIG. 17 has been directed to the reservation stations associated with general-purpose execution units. The decoders 211 to 214 may also interact with reservation stations (RSA) associated with address calculation units in a similar way.

Figure 18:
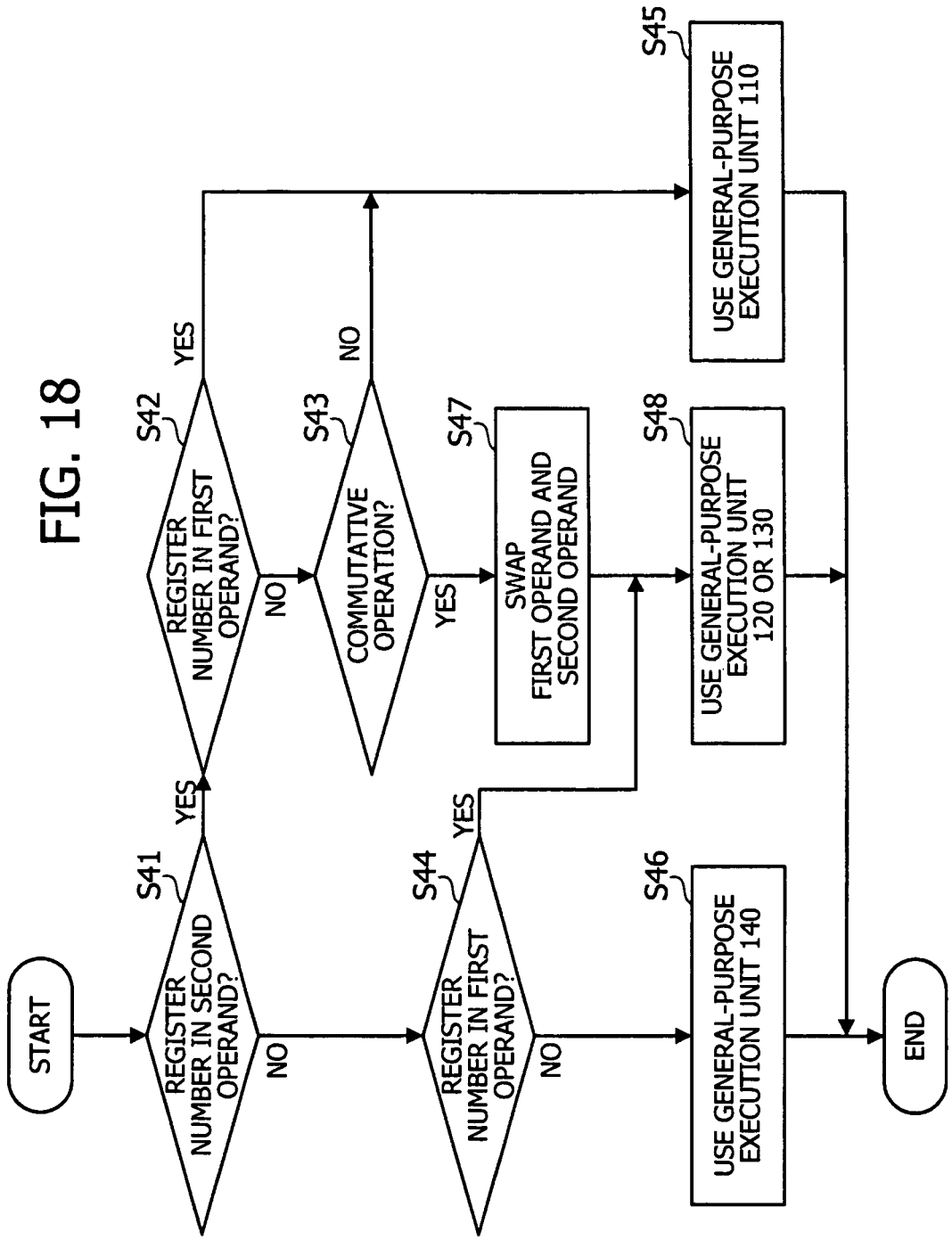
FIG. 18 is a flowchart of a process executed by a decoder according to the fourth embodiment.

FIG. 18 is a flowchart of a process executed by a decoder according to the fourth embodiment. The process illustrated in FIG. 18 is executed by the decoder 211 when its decoded instruction is determined to request a computation that is executable with a general-purpose execution unit.

(Steps S41 to S44) The decoder 211 determines what is specified in the source operands, in the same way as in the process of FIG. 15. For details of steps S41, S42, S43, and S44, see the previous description of steps S21, S22, S26, and S24, respectively.

(Step S45) Step S45 may be reached when both the first and second source operands specify register numbers (Yes at steps S41 and S42). If this is the case, the current combination of first and second source operands matches with pattern #1 in group A3 discussed above. Step S45 may also be reached when the second source operand specifies a register number rs2 representing a substantive register (Yes at step S41) whereas the first source operand does not specify a register number rs1 representing a substantive register (No at step S42), and when the requested operation is a non-commutative operation (No at step S43). If this is the case, the current combination of source operands matches with pattern #3-2 in group A3. In both of the noted cases, the decoder 211 takes action to execute the instruction by using a general-purpose execution unit 110 that accepts register values at both input ports IN1 and IN2. That is, the decoder 211 asserts selection signal IWR1_GroupA3_SEL and enqueues the decoded instruction to the reservation station 221 associated with the general-purpose execution unit 110.

(Step S46) Since neither of the first and second source operands specifies a substantive register number rs1 or rs2 (No at steps S41 and S44), the current combination of source operands matches with pattern #4 or pattern #6 in group C3 discussed above. The decoder 211 then takes action to execute the instruction by using a general-purpose execution unit 140 whose input ports IN1 and IN2 only accept immediate values from the instruction controller 200. That is, the decoder 211 asserts selection signal IWR1_GroupC3_SEL and enqueues the decoded instruction to the reservation station 223 associated with the general-purpose execution unit 140.

(Step S47) Since the second source operand specifies a register number rs2 (Yes at step S41) whereas the first source operand does not specify a register number rs1 (No at step S42), and since the requested computation is a commutative operation (Yes at step S43), the current combination of source operands matches with pattern #3-1 in group B3. It is allowed in this situation to swap the source operands to continue the processing. Accordingly the decoder 211 asserts selection signal IWR1_GroupB3_Swap to cause its local swapping circuit 251 to swap the first source operand and second source operand.

(Step S48) The decoder 211 takes action to execute the instruction by using a general-purpose execution unit 120 or 130 which accepts register values at one input port IN1 while the other input port IN2 only receives immediate values from the instruction controller 200.

Step S48 may be reached when the second source operand does not specify a register number rs2 (No at step S41) whereas the first source operand specifies a register number rs1 (Yes at step S44). If this is the case, the current combination of first and second source operands matches with pattern #2 or pattern #5 in group B3 discussed above. Accordingly the decoder 211 asserts selection signal IWR1_GroupB3_SEL and enqueues the decoded instruction to the reservation station 222 associated with the general-purpose execution units 120 and 130, without swapping its source operands.

Step S48 may also be reached when the second source operand specifies a register number rs2 (Yes at step S41) whereas the first source operand does not specify a register number rs1 (No at step S42), and when the requested computation is a commutative operation (Yes at step S43). If this is the case, selection signal IWR1_GroupB3_Swap has been asserted by the processing at step S47. Then at step S48, the decoder 211 enqueues the decoded instruction to the reservation station 222, with its first and second source operands swapped by the swapping circuit 251.

Figure 19:
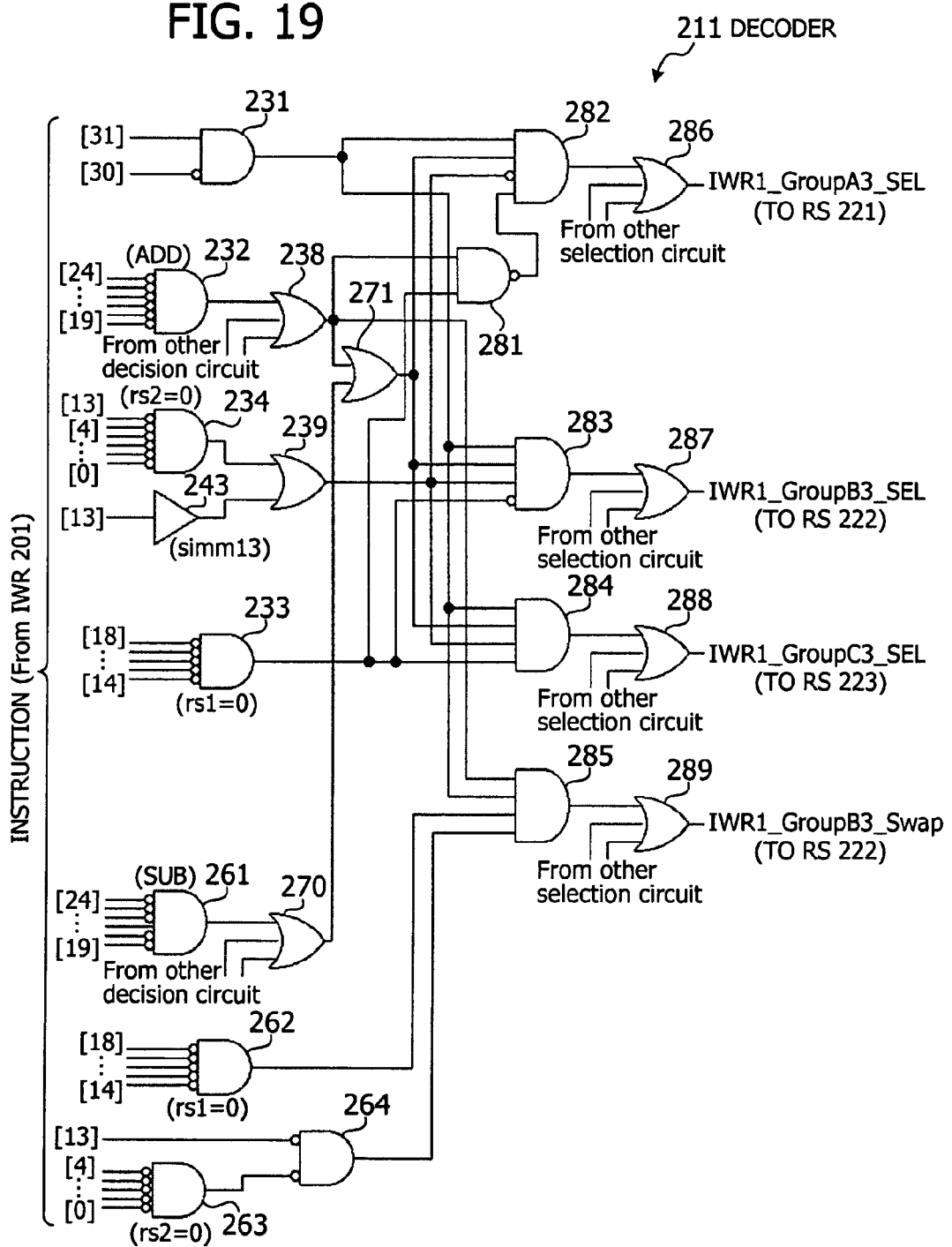
FIG. 19 illustrates an example circuit structure of a decoder according to the fourth embodiment.

FIG. 19 illustrates an example circuit structure of a decoder according to the fourth embodiment. FIG. 19 shares some reference numerals with FIG. 16 to designate similar elements. FIG. 19 exemplifies a structure for decoding add instructions (ADD) and subtract instructions (SUB) as an example of commutative and non-commutative operations, respectively, while omitting components for other purposes. While FIG. 19 illustrates one decoder 211 alone, the same circuit configuration also applies to other decoders 212 to 214.

As can be seen in FIG. 19, the decoder 211 according to the fourth embodiment includes AND gates 231 to 233, 261 to 264, and 281 to 285, OR gates 238, 239, 270, 271, and 286 to 289, and a buffer 243. The AND gates 231 to 233 and 261 to 264, OR gates 238, 239, 270, and 271, and buffer 243 are configured and operate similarly to their respective counterparts in the third embodiment of FIG. 16. The description of these similar elements is not repeated here. The other elements of the illustrated decoder 211 are configured and operate in the following way.

An AND gate 281 is placed to receive output signals of the AND gate 233 and the OR gate 238, thus producing an inverted version of the logical product of those received signals. Specifically, the output of the AND gate 233 is asserted when the first source operand specifies register number g0 representing a constant. The output of the OR gate 238, on the other hand, is asserted when the instruction specifies a commutative operation. Accordingly, the output of the AND gate 281 turns on when the first operand specifies a register number rs1, no matter whether the operation is commutative or non-commutative, or when the instruction requests a non-commutative operation using register number g0 specified in the first source operand.

AND gates 282 to 285 form a circuit that determines to which reservation station 221 to 223 to enqueue the given instruction. Specifically, one AND gate 282 receives output signals of the AND gates 231 and 281 and OR gate 271, together with an inverted output signal of the OR gate 239. Another AND gate 283 receives output signals of the AND gate 231 and OR gates 239 and 271, together with an inverted output signal of the AND gate 233. Yet another AND gate 284 receives output signals of the AND gates 231 and 233 and OR gates 239 and 271. Still another AND gate 285 receives output signals of the AND gates 231, 262, and 264 and OR gate 238.

In operation, the AND gate 231 and OR gate 271 assert their respective outputs when the given instruction specifies a commutative operation or a non-commutative operation. The above-described four AND gates 282 to 284 then work as follows.

When the combination of first and second source operands matches with pattern #1 in group A3 discussed above, the AND gate 281 turns on its output while the OR gate 239 negates its output. Also when the combination of first and second source operands matches with pattern #3-2 in group A3 discussed above, the AND gate 281 similarly asserts its output while the OR gate 239 negates its output. In these cases, the AND gate 282 asserts its output. This output signal of the AND gate 282 propagates as selection signal IWR1_GroupA3_SEL to a reservation station 221 via an OR gate 286. That is, when selection signal IWR1_GroupA3_SEL is asserted in consequence of the asserted output of the AND gate 282, the decoder 211 enqueues the instruction from the instruction word register 201 to the reservation station 221.

When the combination of first and second source operands matches with pattern #2 or pattern #5 in group B3 discussed above, the OR gate 239 asserts its output, and the AND gate 233 negates its output. Consequently the AND gate 283 asserts its output. This output signal of the AND gate 283 propagates as selection signal IWR1_GroupB3_SEL to a reservation station 222 via an OR gate 287. That is, when selection signal IWR1_GroupB3_SEL is asserted in consequence of the asserted output of the AND gate 283, the decoder 211 enqueues the instruction from the instruction word register 201 to the reservation station 222, without swapping source operands.

When the combination of first and second source operands matches with pattern #4 or pattern #6 in group C3 discussed above, both the OR gate 239 and AND gate 233 assert their respective outputs, thus making the AND gate 284 assert its output. This output signal of the AND gate 284 propagates as selection signal IWR1_GroupC3_SEL to a reservation station 223 via an OR gate 288. That is, when selection signal IWR1_GroupC3_SEL is asserted in consequence of the asserted output of the AND gate 284, the decoder 211 enqueues the instruction from the instruction word register 201 to the reservation station 223.

When the given instruction specifies a commutative operation, the AND gate 231 and OR gate 238 assert their respective outputs. When, in this situation, the combination of first and second source operands matches with pattern #3-1 in group B3 discussed above, the AND gates 262 and 264 assert their respective outputs, thus making the AND gate 285 assert its output. The asserted output signal of the AND gate 285 propagates as selection signal IWR1_GroupB3_Swap to the reservation station 222 via an OR gate 289, as well as to the swapping circuit 251 inside the decoder 211. That is, when selection signal IWR1_GroupB3_Swap is asserted in consequence of the asserted output of the AND gate 285, the decoder 211 enqueues the instruction from the instruction word register 201 to the reservation station 222, with its source operands swapped by the swapping circuit 251.

The above-described decoder 211 of FIG. 19 executes the processing discussed in FIG. 18 when its associated instruction word register 201 provides an instruction requesting a commutative operation such as addition. While not specifically depicted, the decoder 211 according to the fourth embodiment may also include a selection circuit to select a destination for queuing other instructions than commutative and non-commutative instructions. This selection circuit may be provided in plurality to handle different kinds of computations. Each such selection circuit includes decision circuits similar to the AND gates 282 to 285 discussed in FIG. 19, thus determining which reservation station to use for queuing the instruction. The resulting output signals from those decision circuits are then provided to the OR gates 286 to 289.

The above-described fourth embodiment makes it possible to swap the source operands of a given computational instruction within a decoder itself when a substantive register is specified in one of them, and only when the instruction requests execution of a commutative operation. This feature permits more frequent use of execution units that accepts register values at only one input port IN1 in comparison with the second embodiment. The fourth embodiment thus makes it less likely for computation requests to concentrate into other execution units such as those capable of accepting register values at both input ports IN1 and IN2. When compared with the third embodiment, the fourth embodiment simplifies the structure of circuits as a whole and is thus advantageous in terms of manufacturing costs and circuit size, because there is no need to add an operand swapping circuit in execution units or to implement swap flags in the execution queue of reservation stations to control those operand swapping circuits.

(e) Fifth Embodiment

The foregoing second to fourth embodiments provide three types of execution units that receive different types of input signals, and select an execution unit corresponding to a specific combination pattern of source operands. Actually, however, some combination patterns may be handled by any of those execution units. For example, the patterns #2 and #5 belonging to group B1 in the second embodiment may be handled not only by general-purpose execution units 120 and 130, but also by another general-purpose execution unit 110. Likewise, the patterns #4 and #6 belonging to group C1 may be handled not only by the general-purpose execution unit 140, but also by any of the other general-purpose execution units 110, 120, and 130.

Figure 20:
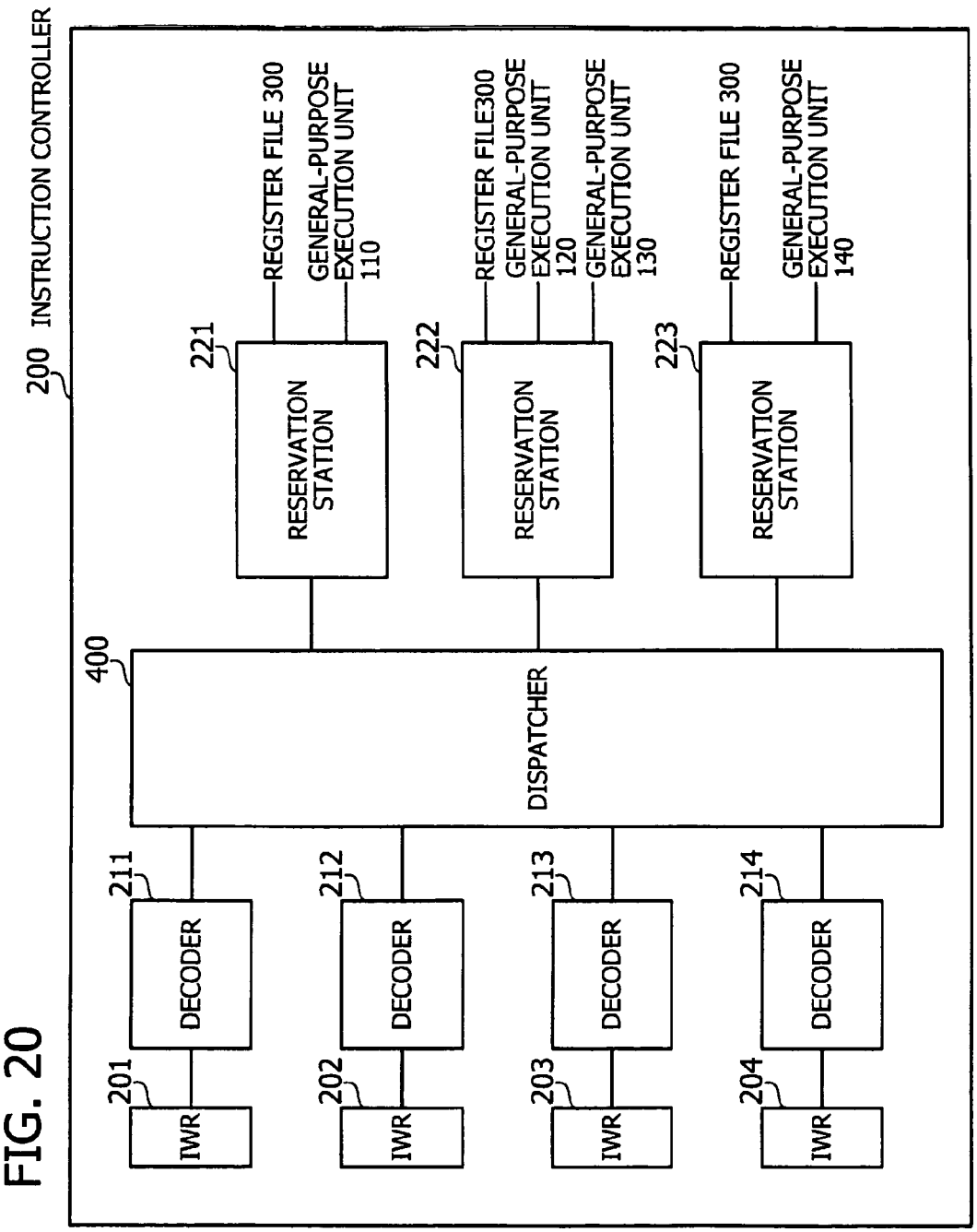
FIG. 20 illustrates an example internal structure of an instruction controller, as well as its control signals, according to a fifth embodiment.

In view of the above, the fifth embodiment provides a processing apparatus in which computational units are allocated in a more flexible way, depending on the execution queue status of reservation stations. FIG. 20 illustrates an example internal structure of an instruction controller, as well as its control signals, according to the fifth embodiment. FIG. 20 shares some reference numerals with FIG. 9 to designate similar elements.

According to the fifth embodiment, the illustrated instruction controller 200 includes instruction word registers (IWR) 201 to 204, decoders 211 to 214, reservation stations 221 to 223, and a dispatcher 400. For illustrative purposes, it is assumed in the subsequent description that the instruction word registers 201 to 204, decoders 211 to 214, and reservation stations 221 to 223 basically have the same structure and functions as their counterparts in the second embodiment, except for the following things. Selection signals from the decoders 211 to 214 are supplied, not to the reservation stations, but to a dispatcher 400. The reservation stations 221 to 223 further have the function of notifying the dispatcher 400 of current status of their respective execution queues.

The decoders 211 to 214 output selection signals to specify to which reservation stations their decoded instructions should go. The dispatcher 400 receives those selection signals and changes the destination of instructions depending on the execution queue status of the destination reservation station. Suppose, for example, that one decoder specifies a reservation station 223 for queuing its decoded instruction. The dispatcher 400 changes this destination to another reservation station 222 when the execution queue in the specified reservation station 223 is full. Similarly, when the reservation station 222 is specified by a decoder, and if its execution queue is full, the dispatcher 400 changes the destination of the instruction to yet another reservation station 221.

Figure 21:
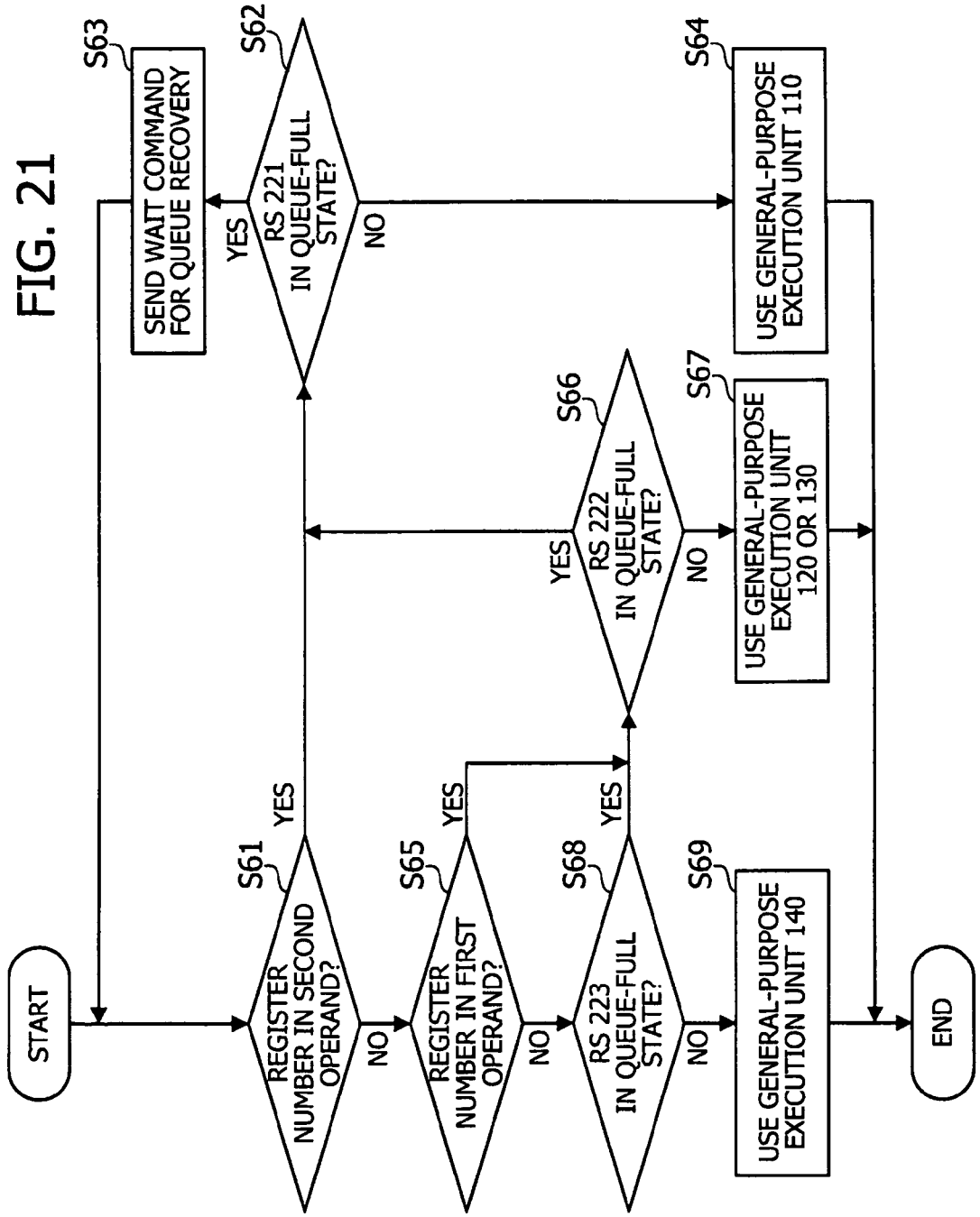
FIG. 21 is a flowchart of a process executed by a decoder and a dispatcher according to the fifth embodiment.

FIG. 21 is a flowchart of a process executed by the decoder and dispatcher according to the fifth embodiment. The process illustrated in FIG. 21 is executed by the decoder 211 and dispatcher 400 when the decoded instruction is determined to request a computation that is executable with a general-purpose execution unit.

(Step S61) The decoder 211 determines whether the second source operand of a given instruction specifies a register number rs2 representing a substantive register. When the second source operand specifies rs2 (Yes at step S61), the decoder 211 asserts selection signal IWR1_GroupA1_SEL (see FIG. 12) to specify a reservation station 221 as the destination of the instruction. The process then proceeds to step S62. When the second source operand specifies some other thing than rs2 (No at step S61), the decoder 211 advances to step S65.

(Step S62) The dispatcher 400 determines whether the reservation station 221 is in the queue-full state. The queue-full state means that the execution queue in the reservation station 221 has no vacant entries to accept more instructions from the decoder 211. When the reservation station 221 is in the queue-full state (Yes at step S62), the dispatcher 400 proceeds to step S63. When the reservation station 221 is not in the queue-full state (No at step S62), the dispatcher 400 proceeds to step S64.

(Step S63) The dispatcher 400 commands the decoder 211 or instruction word register 201 to wait until the reservation station 221 recovers from the queue full state. When the reservation station 221 is found to be in the queue-full state at step S62, a command issued from the dispatcher 400 at step S63 causes the instruction word register 201 to stop issuing new instructions. The process then goes back to step S61 and repeats the processing from there until any of the reservations stations associated with execution units capable of handling the requested operation is found not to be in the queue full state. No new computational instruction are issued from the decoder 211 during that wait period.

(Step S64) The dispatcher 400 takes action to execute the decoded instruction from the decoder 211 by using a general-purpose execution unit 110. That is, the dispatcher 400 enqueues the decoded instruction to the reservation station 221 associated with the general-purpose execution unit 110.

(Step S65) The decoder 211 determines whether the first source operand of the given instruction specifies a register number rs1 representing a substantive register. When the first source operand specifies rs1 (Yes at step S65), the decoder 211 asserts selection signal IWR1_GroupB1_SEL (see FIG. 12) to specify a reservation station 222 as the destination of the instruction. The process then proceeds to step S66. When the first source operand does not specify rs1 (No at step S65), the decoder 211 asserts selection signal IWR1_GroupC1_SEL (see FIG. 12) to specify another reservation station 223 as the destination of the instruction. The process then proceeds to step S68.

(Step S66) The dispatcher 400 determines whether the reservation station 222 is in the queue-full state. When the reservation station 222 is in the queue-full state (Yes at step S66), the dispatcher 400 proceeds to step S62. When the reservation station 222 is not in the queue-full state (No at step S66), the dispatcher 400 proceeds to step S67.

(Step S67) The dispatcher 400 takes action to execute the decoded instruction from the decoder 211 by using a general-purpose execution unit 120 or 130. That is, the dispatcher 400 enqueues the decoded instruction to the reservation station 222 associated with the general-purpose execution units 120 and 130.

(Step S68) The dispatcher 400 determines whether the reservation station 223 is in the queue-full state. When the reservation station 223 is in the queue-full state (Yes at step S68), the dispatcher 400 proceeds to step S66. When the reservation station 223 is not in the queue-full state (No at step S68), the dispatcher 400 proceeds to step S69.

(Step S69) The dispatcher 400 takes action to execute the decoded instruction from the decoder 211 by using a general-purpose execution unit 140. That is, the dispatcher 400 enqueues the decoded instruction to the reservation station 223 associated with the general-purpose execution unit 140.

According to the above-described processing of FIG. 21, the dispatcher 400 examines queue status of a reservation station upon receipt of a selection signal from the decoder 211 which specifies that reservation station for enqueuing a decoded instruction. When the selected destination reservation station is found to be in the queue-full state, the dispatcher 400 changes the destination to another reservation station which is not in queue-full state and capable of handling the requested computation.

Suppose, for example, that the combination of source operands in a given decoded instruction matches with pattern #4 or pattern #6 in group C1 (No at steps S61 and S65). This means that the general-purpose execution unit 140 is suitable for the instruction. The decoder 211 thus selects a reservation station 223 as the destination. The dispatcher 400 then determines whether the selected reservation station 223 is in the queue-full state (S68). When the reservation station 223 is not in the queue-full state (No at step S68), the instruction is enqueue to that reservation station 223 (S69).

When it is found that the reservation station 223 is in the queue-full state (Yes at step S68), the dispatcher 400 determines whether another reservation station 222 is in the queue-full state (S66). The dispatcher 400 checks this reservation station 222 because it is associated with the general-purpose execution units 120 and 130 that can handle pattern #4 or pattern #6 of source operands. When the reservation station 222 is not in the queue-full state (No at step S66), the dispatcher 400 determines to enqueue the instruction to the reservation station 222 (S67).

When it is found that the reservation station 222 is also in the queue-full state (Yes at step S66), the dispatcher 400 determines whether yet another reservation station 221 is in the queue-full state (S62). The dispatcher 400 checks this reservation station 221 because its is associated with the general-purpose execution unit 110 that can handle pattern #4 or pattern #6 of source operands. When the reservation station 221 is not in the queue-full state (No at step S62), the dispatcher 400 determines to enqueue the instruction to the reservation station 221 (S64). When the reservation station 221 is also in the queue-full state (Yes at step S62), the dispatcher 400 commands the decoder 211 not to decode new computational instructions until any of the reservation stations 221 to 223 recovers from the queue full state (S63).

The above-described processing by the dispatcher 400 permits enqueuing computational instructions to different destinations, thus reducing the chances of temporarily halting the operation of queuing instructions due to queue-full state of reservation stations. This control results in a higher degree of parallelism and thus enhances the total computational performance of the processing apparatus.

Figure 22:
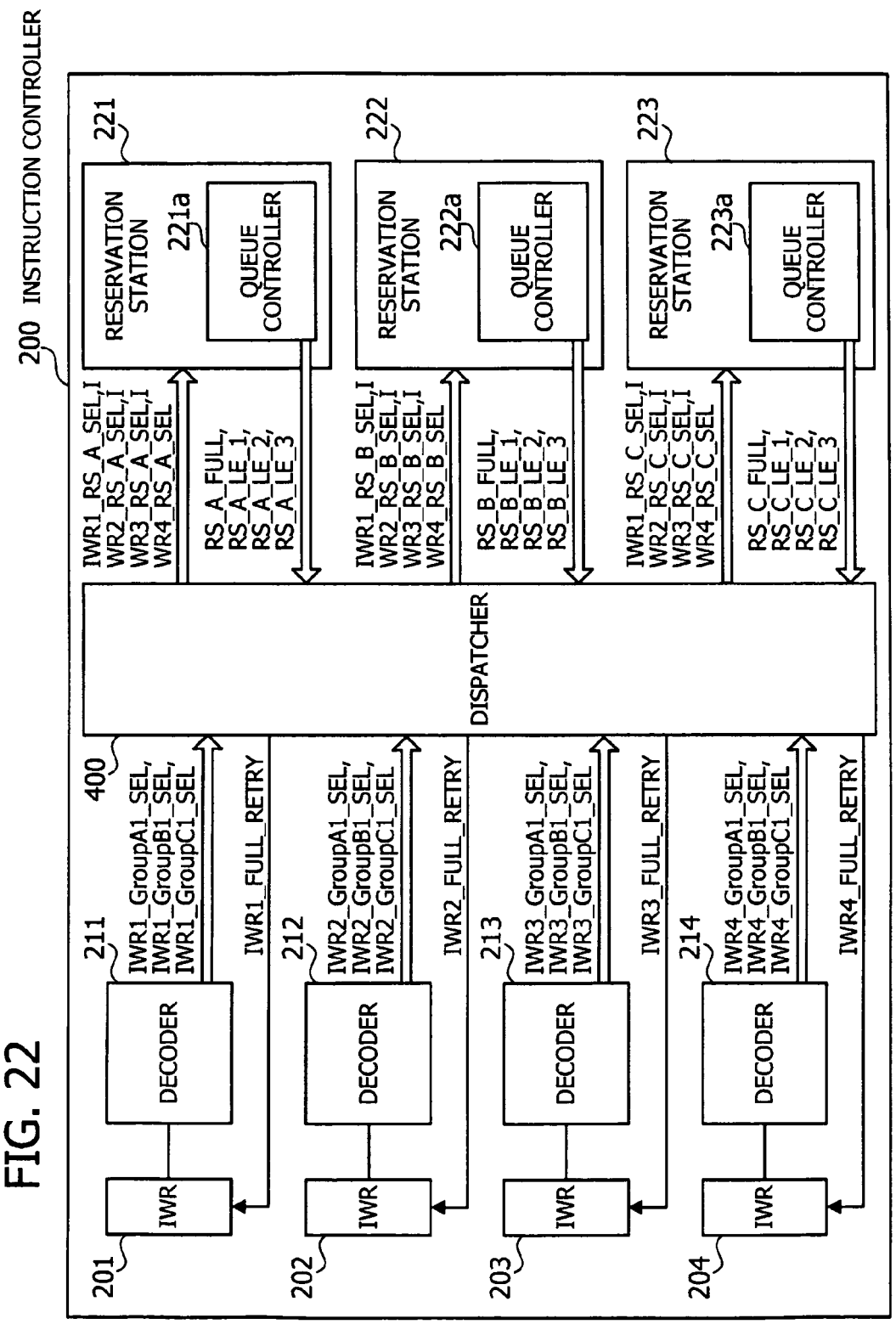
FIG. 22 illustrates an example of signals transmitted in the instruction controller.

An example internal structure of the instruction controller 200 according to the fifth embodiment will now be described below. FIG. 22 illustrates an example of signals transmitted locally in the instruction controller 200. As discussed previously in FIG. 12, the decoder 211 asserts one selection signal to select a particular reservation station suitable for the combination pattern of source operands in a computational instruction. Specifically, it may assert selection signal IWR1_GroupA1_SEL to select a reservation station 221, or selection signal IWR1_GroupB1_SEL to select another reservation station 222, or selection signal IWR1_GroupC1_SEL to select yet another reservation station 223.

Other decoders 212 to 214 may also produce their own selection signals similarly to the decoder 211. Depending on the combination pattern of source operands, the decoder 212 asserts selection signal IWR2_GroupA1_SEL to select a reservation station 221, or selection signal IWR2_GroupB1_SEL to select another reservation station 222, or selection signal IWR2_GroupC1_SEL to select yet another reservation station 223. Similarly, depending on the combination pattern of source operands, the decoder 213 asserts selection signal IWR3_GroupA1_SEL to select a reservation station 221, or selection signal IWR3_GroupB1_SEL to select another reservation station 222, or selection signal IWR3_GroupC1_SEL to select yet another reservation station 223. Further, depending on the combination pattern of source operands, the decoder 214 asserts selection signal IWR4_GroupA1_SEL to select a reservation station 221, or selection signal IWR4_GroupB1_SEL to select another reservation station 222, or selection signal IWR4_GroupC1_SEL to select yet another reservation station 223.

The reservation stations 221 to 223, on the other hand, have their respective queue controllers 221a to 223a to inform the dispatcher 400 of their individual execution queue status. Specifically, the queue controller 221a sends queue status signals RS_A_FULL, RS_A_LE1, RS_A_LE2, and RS_A_LE3 to the dispatcher 400 to indicate status of the execution queue in the reservation station 221. More specifically, the queue controller 221a asserts one queue status signal RS_A_FULL when the execution queue has no vacant entries. The queue controller 221a asserts another queue status signal RS_A_LE1 when the execution queue has a single vacant entry. The queue controller 221a asserts yet another queue status signal RS_A_LE2 when the execution queue has two vacant entries. The queue controller 221a asserts still another queue status signal RS_A_LE3 when the execution queue has three vacant entries.

Other queue controllers 222a, 223a output their own queue status signals to the dispatcher 400 similarly to the above queue controller 221a. That is, the queue controller 222a asserts queue status signals RS_B_FULL, RS_B_LE1, RS_B_LE2, and RS_B_LE3 when the execution queue in the reservation station 222 has zero, one, two, and three vacant entries, respectively. Likewise, the queue controller 223a asserts queue status signals RS_C_FULL, RS_C_LE1, RS_C_LE2, and RS_C_LE3 when the execution queue in the reservation station 223 has zero, one, two, and three vacant entries, respectively.

Based on the above queue status signals sent from each reservation station 221 to 223, the dispatcher 400 determines the final destination of decoded instructions supplied from the decoders 211 to 214. Specifically, the dispatcher 400 outputs selection signals IWR1_RS_A_SEL, IWR2_RS_A_SEL, IWR3_RS_A_SEL, and IWR4_RS_A_SEL to select a reservation station 221 as the destination of instructions. The dispatcher 400 also outputs selection signals IWR1_RS_B_SEL, IWR2_RS_B_SEL, IWR3_RS_B_SEL, and IWR4_RS_B_SEL to select another reservation station 222 as the destination of instructions.

The dispatcher 400 further outputs selection signals IWR1_RS_C_SEL, IWR2_RS_C_SEL, IWR3_RS_C_SEL, and IWR4_RS_C_SEL to select yet another reservation station 223 as the destination of instructions.

The dispatcher 400 sends output control signals IWR1_FULL_RETRY, IWR2_FULL_RETRY, IWR3_FULL_RETRY, and IWR4_FULL_RETRY back to instruction word registers 201 to 204, respectively. When their respective output control signals IWR1_FULL_RETRY, IWR2_FULL_RETRY, IWR3_FULL_RETRY, and IWR4_FULL_RETRY are asserted, the instruction word registers 201 to 204 stop their output of new computational instructions.

It is noted here that the dispatcher 400 may give different priorities to the decoders 211 to 214. For example, the fifth embodiment assumes that the decoders 211, 212, 213, and 214 have successively lower priorities. When a plurality of instructions are destined for a single reservation station, the dispatcher 400 resolves this by enqueuing the instructions to the specified reservation 1Q station in descending order of the priorities that their originating decoders are given.

The priority-based selection of destinations operates as follows. Suppose, for example, that one reservation station 221 is selected as the destination of an instruction from the decoder 214, while the selected reservation station 221 has three vacant entries in its execution queue. This instruction from the decoder 211, however, would be stopped before it reaches the reservation station 221 if all the other three decoders 211 to 213 selected the same reservation station 221 for their own instructions. That is, the instructions from the latter decoders 211 to 213 would be enqueued to the reservation station 221 in preference to the one from the lowest-priority decoder 214.

As can be seen from the above example, the lowest-priority decoder 214 may be unable to enqueue its instruction to a specific reservation station not only when that reservation station has no vacant entries in its execution queue, but even when the execution queue has one, two, or three vacant entries. The dispatcher 400 is therefore configured to receive information on the actual number (e.g., 0, 1, 2, 3) of vacant entries from the queue controller of each reservation station and select appropriate destinations of instructions according to the priority of decoders.

Figure 23:
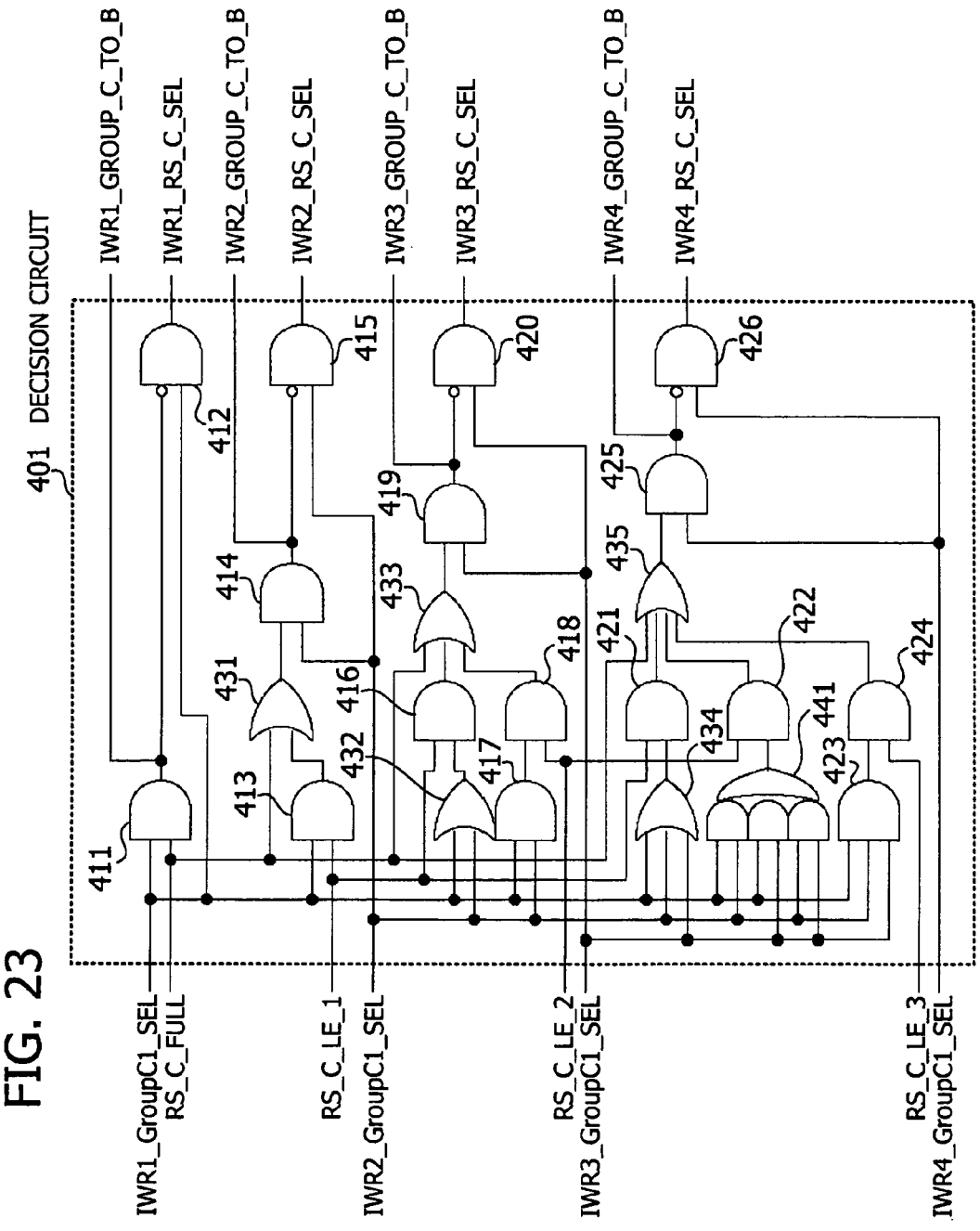
FIG. 23 is a first diagram illustrating an example internal structure of a dispatcher.

FIG. 23 is a first diagram illustrating an example internal structure of the dispatcher 400. Specifically, FIG. 23 illustrates a decision circuit 401, a part of the dispatcher circuit, that determines whether to use the reservation station 223 as the destination of a given instruction. The illustrated decision circuit 401 includes AND gates 411 to 426, OR gates 431 to 435, and a gate circuit 441.

AND gates 411 and 412 provide the function of determining whether to enqueue an instruction to the reservation station 223 when it is received from the decoder 211. The former AND gate 411 receives selection signal IWR1_GroupC1_SEL from the decoder 211 and queue status signal RS_C_FULL from the queue controller 223a in the reservation station 223. The output of this AND gate 411 is supplied as selection signal IWR1_GROUP_C_TO_B to another circuit described later in FIG. 24, which determines whether to enqueue an instruction to another reservation station 222. This selection signal IWR1_GROUP_C_TO_B is asserted when the prospective destination of a given instruction is changed to the reservation station 222. The latter AND gate 412 receives an inverted output of the AND gate 411 and selection signal IWR1_GroupC1_SEL from the decoder 211. The output of this AND gate 412 is supplied to the reservation station 223 as selection signal IWR1_RS_C_SEL that indicates whether to finally select the reservation station 223 as the destination of an instruction from the decoder 211.

In the case where the decoder 211 specifies other reservation stations than the reservation station 223, selection signal IWR1_GroupC1_SEL is not asserted. Accordingly, both the noted selection signals IWR1_RS_C_SEL and IWR1_GROUP_C_TO_B stay in the off state. In the case where the decoder 211 specifies the reservation station 223 as the destination of its instruction, selection signal IWR1_GroupC1_SEL is asserted. In this case the decision circuit 401 operates as follows.

Selection signal IWR1_RS_C_SEL is asserted when the execution queue in the reservation station 223 has one or more vacant entries (i.e., when queue status signal RS_C_FULL is in the off state). Accordingly the instruction from the decoder 211 is enqueued to the reservation station 223 as originally specified by the decoder 211 (i.e., without changing destinations). When, on the other hand, the execution queue in the reservation station 223 has no vacant entries (i.e., when queue status signal RS_C_FULL is asserted), selection signal IWR1_GROUP_C_TO_B is asserted. In this case, the prospective destination of the instruction from the decoder 211 is changed to a different reservation station 222.

Referring to another portion of FIG. 23, AND gates 413 to 415 and OR gate 431 provide the function of determining whether to enqueue an instruction to the reservation station 223 when it is received from the decoder 212. The AND gate 413 receives selection signal IWR1_GroupC1_SEL from the decoder 211 and queue status signal RS_C_LE_1 from the queue controller 223a in the reservation station 223. The OR gate 431 receives queue status signal RS_C_FULL from the queue controller 223a in the reservation station 223, together with the output of the AND gate 413. The AND gate 414 receives selection signal IWR2_GroupC1_SEL from the decoder 212, together with the output of the OR gate 431.

The output of the AND gate 414 is referred to as selection signal IWR2_GROUP_C_TO_B, which is supplied to another circuit described later in FIG. 24, which determines whether to enqueue an instruction to another reservation station 222. This selection signal IWR2_GROUP_C_TO_B is asserted when the prospective destination of an instruction from the decoder 212 is changed to the reservation station 222. The AND gate 415 receives an inverted output of the AND gate 414 and selection signal IWR2_GroupC1_SEL from the decoder 212. The output of this AND gate 415 is supplied to the reservation station 223 as selection signal IWR2_RS_C_SEL that indicates whether to finally select the reservation station 223 as the destination of an instruction from the decoder 212.

In the case where the decoder 212 specifies other reservation stations than the reservation station 223, selection signal IWR2_GroupC1_SEL is not asserted.

Accordingly, both the above-noted selection signals IWR2_RS_C_SEL and IWR2_GROUP_C_TO_B stay in the off state. In the case where the decoder 212 specifies the reservation station 223 as the destination of its instruction, selection signal IWR2_GroupC1_SEL is asserted, and the decision circuit 401 operates as follows.

When the execution queue in the reservation station 223 has two or more vacant entries (i.e., when queue status signals RS_C_FULL and RS_C_LE_1 are both in the off state), selection signal IWR2_RS_C_SEL is asserted. Accordingly the instruction from the decoder 212 is enqueued to the reservation station 223 as originally specified by the decoder 212.

When the execution queue in the reservation station 223 has no vacant entries (i.e., when queue status signal RS_C_FULL is asserted), selection signal IWR2_GROUP_C_TO_B is asserted. In this case, the prospective destination for the instruction from the decoder 212 is changed to a different reservation station 222.

When the execution queue in the reservation station 223 has a single vacant entry (i.e., when one queue status signal RS_C_LE_1 is asserted while another queue status signal RS_C_FULL is negated), the operation of the decision circuit 401 depends on another decoder 211 having priority over the decoder 212. More specifically, the decision circuit 401 operates as follows, depending on whether the decoder 211 specifies the same reservation station 223 as the destination of its instruction.

In the case where the decoder 211 does not specify the reservation station 223 as the destination of its instruction, the instruction from the decoder 212 is allowed to go to the reservation station 223. Since selection signal IWR1_GroupC1_SEL is in the off state in this case, the AND gate 413 negates its output, and selection signal IWR2_RS_C_SEL is thus asserted. Accordingly the instruction from the decoder 212 is enqueued to the reservation station 223 as originally specified by the decoder 212.

In the case where the decoder 211 specifies the reservation station 223 as the destination, its instruction is supposed to be enqueued to the reservation station 223 in preference to the one from the decoder 212. Since selection signal IWR1_GroupC1_SEL is asserted, the AND gate 413 asserts its output, and selection signal IWR2_GROUP_C_TO_B is thus asserted. Accordingly the prospective destination for the instruction from the decoder 212 is changed to a different reservation station 222.

Referring to yet another portion of FIG. 23, AND gates 416 to 420 and OR gates 432 and 433 provide the function of determining whether to enqueue an instruction to the reservation station 223 when it is received from the decoder 213. The AND gate 417 and OR gate 432 equally receive two selection signals IWR1_GroupC1_SEL and IWR2_GroupC1_SEL from decoders 211 and 212, respectively. The AND gate 416 receives queue status signal RS_C_LE_1 from the queue controller 223a in the reservation station 223, together with the output of the OR gate 432. The AND gate 418 receives queue status signal RS_C_LE_2 from the queue controller 223a in the reservation station 223, together with the output of the AND gate 417. The OR gate 433 receives queue status signal RS_C_FULL from the queue controller 223a in the reservation station 223, together with the outputs of the AND gates 416 and 418.

The AND gate 419 receives selection signal IWR3_GroupC1_SEL from the decoder 213, together with the output of the OR gate 433. The output of this AND gate 419 is supplied as selection signal IWR3_GROUP_C_TO_B to another circuit described later in FIG. 24, which determines whether to enqueue an instruction to another reservation station 222. This selection signal IWR3_GROUP_C_TO_B is asserted when the prospective destination of an instruction from the decoder 213 is changed to a different reservation station 222. The AND gate 420 receives an inverted output of the AND gate 419 and selection signal IWR3_GroupC1_SEL from the decoder 213. The output of this AND gate 420 is supplied to the reservation station 223 as selection signal IWR3_RS_C_SEL that indicates whether to finally select the reservation station 223 as the destination of an instruction from the decoder 213.

In the case where the decoder 213 specifies other reservation stations than the reservation station 223, selection signal IWR3_GroupC1_SEL is not asserted. Accordingly, both the above-noted selection signals IWR3_RS_C_SEL and IWR3_GROUP_C_TO_B stay in the off state. In the case where the decoder 213 specifies the reservation station 223 as the destination of its instruction, selection signal IWR3_GroupC1_SEL is asserted, and the decision circuit 401 operates as follows.

Firstly, when the execution queue in the reservation station 223 has three or more vacant entries (i.e., when queue status signals RS_C_FULL, RS_C_LE_1, and RS_C_LE_2 are all negated), selection signal IWR3_RS_C_SEL is asserted. In this case, the instruction from the decoder 213 is enqueued to the reservation station 223 as originally specified by the decoder 213.

Secondly, when the execution queue in the reservation station 223 has no vacant entries (i.e., when queue status signal RS_C_FULL is asserted), selection signal IWR3_GROUP_C_TO_B is asserted. In this case, the prospective destination for the instruction from the decoder 213 is changed to a different reservation station 222.

Thirdly, when the execution queue in the reservation station 223 has only a single vacant entry (i.e., when one queue status signal RS_C_LE_1 is asserted while another queue status signal RS_C_FULL is negated), the decision depends on other decoders 211 and 212 having priority over the decoder 213. More specifically, the decision circuit 401 operates as follows, depending on whether either of the decoders 211 and 212 specifies the reservation station 223 as the destination of its instruction.

In the case where neither of the decoders 211 and 212 specifies the reservation station 223 as the destination of its instruction, the instruction from the decoder 213 is allowed to go to the reservation station 223. Since selection signals IWR1_GroupC1_SEL and IWR2_GroupC1_SEL are both in the off state in this case, the AND gates 416 to 418 negate their outputs, and selection signal IWR3_RS_C_SEL is thus asserted. Accordingly the instruction from the decoder 213 is enqueued to the reservation station 223 as originally specified by the decoder 213.

In the case where one or both of the two decoders 211 and 212 specify the reservation station 223 as the destination, their instructions are supposed to be enqueued to the reservation station 223 in preference to the one from the decoder 212. Since one or both of selection signals IWR1_GroupC1_SEL and IWR2_GroupC1_SEL are asserted in this case, the AND gate 416 asserts its output. Selection signal IWR3_GROUP_C_TO_B is thus asserted. Accordingly the prospective destination for the instruction from the decoder 213 is changed to a different reservation station 222.

Fourthly, when the execution queue in the reservation station 223 has two vacant entries (i.e., when one queue status signal RS_C_LE_2 is asserted while other queue status signals RS_C_FULL and RS_C_LE_1 are both negated), the decision depends on other decoders 211 and 212 having priority over the decoder 213. More specifically, the decision circuit 401 operates as follows, depending on whether both decoders 211 and 212 specify the reservation station 223 as the destination of their instructions.

In the case where both decoders 211 and 212 specify the reservation station 223 as the destination, their instructions are supposed to be enqueued to the reservation station 223 in preference to the one from the decoder 212. Since selection signals IWR1_GroupC1_SEL and IWR2_GroupC1_SEL are both asserted in this case, the AND gates 417 and 418 assert their respective outputs, and selection signal IWR3_GROUP_C_TO_B is thus asserted. Accordingly the prospective destination for the instruction from the decoder 213 is changed to a different reservation station 222.

In the case where one or both of the decoders 211 and 212 specify other reservation stations than the reservation station 223 as the destination, the instruction from the decoder 213 is allowed to go to the reservation station 223. Since one or both of two selection signals IWR1_GroupC1_SEL and IWR2_GroupC1_SEL stay in the off state in this case, the AND gates 416 to 418 negate their respective outputs, and selection signal IWR3_RS_C_SEL is thus asserted. Accordingly the instruction from the decoder 213 is enqueued to the reservation station 223 as originally specified by the decoder 213.

Referring to still another portion of FIG. 23, AND gates 421 to 426, OR gates 434 and 435, and a gate circuit 441 provide the function of determining whether to enqueue an instruction to the reservation station 223 when it is received from the decoder 214. The AND gate 423 and OR gate 434 equally receive three selection signals IWR1_GroupC1_SEL, IWR2_GroupC1_SEL, and IWR3_GroupC1_SEL from decoders 211, 212, and 213, respectively. The AND gate 421 receives queue status signal RS_C_LE_1 from the queue controller 223a in the reservation station 223, together with the output of the OR gate 434. The AND gate 424 receives queue status signal RS_C_LE_3 from the queue controller 223a in the reservation station 223, together with the output of the AND gate 423.

The gate circuit 441 is formed from three AND gates and one OR gate receiving their respective outputs. These AND gates in the gate circuit 441 are referred to herein as first, second, and third AND gates, from the topmost to the bottommost as viewed in FIG. 23. The first AND gate receives selection signals IWR1_GroupC1_SEL and IWR2_GroupC1_SEL from decoders 211 and 212, respectively. The second AND gate receives selection signals IWR1_GroupC1_SEL and IWR3_GroupC1_SEL from decoders 211 and 213, respectively. The third AND gate receives selection signals IWR2_GroupC1_SEL and IWR3_GroupC1_SEL from decoders 212 and 213, respectively.

The AND gate 422 receives queue status signal RS_C_LE_2 from the queue controller 223a in the reservation station 223, together with the OR gate output of the gate circuit 441. The subsequent OR gate 435 receives queue status signal RS_C_FULL from the queue controller 223a in the reservation station 223, together with each output signal of three AND gates 421, 422, and 424. The AND gate 425 receives selection signal IWR4_GroupC1_SEL from the decoder 214, together with the output of the OR gate 435.

The output of the above AND gate 425 is supplied as selection signal IWR4_GROUP_C_TO_B to another circuit described later in FIG. 24, which determines whether to enqueue an instruction to another reservation station 222. This selection signal IWR4_GROUP_C_TO_B is asserted when the prospective destination of an instruction from the decoder 214 is changed to the reservation station 222. The AND gate 426 receives an inverted output of the AND gate 425 and selection signal IWR4_GroupC1_SEL from the decoder 214. The output of this AND gate 426 is supplied to the reservation station 223 as selection signal IWR4_RS_C_SEL that indicates whether to finally select the reservation station 223 as the destination of an instruction from the decoder 214.

In the case where the decoder 214 specifies some other reservation station than the reservation station 223 (i.e., when selection signal IWR4_GroupC1_SEL is not asserted), both the above-noted selection signals IWR4_RS_C_SEL and IWR4_GROUP_C_TO_B stay in the off state. In the case where the decoder 214 specifies the reservation station 223 as the destination of its instruction (i.e., when selection signal IWR4_GroupC1_SEL is asserted), the decision circuit 401 operates as follows.

Firstly, when the execution queue in the reservation station 223 has four or more vacant entries (i.e., when queue status signals RS_C_FULL, RS_C_LE_1, RS_C_LE2, and RS_C_LE_3 are all negated), selection signal IWR4_RS_C_SEL is asserted. In this case, the instruction from the decoder 214 is enqueued to the reservation station 223 as originally specified by the decoder 214.

Secondly, when the execution queue in the reservation station 223 has no vacant entries (i.e., when queue status signal RS_C_FULL is asserted), selection signal IWR4_GROUP_C_TO_B is asserted. In this case, the prospective destination for the instruction from the decoder 214 is changed to a different reservation station 222.

Thirdly, when the execution queue in the reservation station 223 has only a single vacant entry (i.e., when one queue status signal RS_C_LE_1 is asserted while another queue status signal RS_C_FULL is negated), the decision depends on other decoders 211 to 213 having priority over the decoder 214. More specifically, the decision circuit 401 operates as follows, depending on whether any of the decoders 211 to 213 specifies the reservation station 223 as the destination of its instruction.

In the case where none of the three decoders 211 to 213 specifies the reservation station 223 as the destination of its instruction, the instruction from the decoder 214 is allowed to go to the reservation station 223. Since three selection signals IWR1_GroupC1_SEL, IWR2_GroupC1_SEL, and IWR3_GroupC1_SEL are negated in this case, the AND gates 421 to 424 negate their respective outputs, and selection signal IWR4_RS_C_SEL is thus asserted. Accordingly the instruction from the decoder 214 is enqueued to the reservation station 223 as originally specified by the decoder 214.

In the case where one or more of the three decoders 211 to 213 specify the reservation station 223 as the destination, their instructions are supposed to be enqueued to the reservation station 223 in preference to the one from the decoder 214. Since one or more of the selection signals IWR1_GroupC1_SEL, IWR2_GroupC1_SEL, and IWR3_GroupC1_SEL are asserted in this case, the AND gate 421 asserts its output, and selection signal IWR4_GROUP_C_TO_B is thus asserted. Accordingly the prospective destination for the instruction from the decoder 214 is changed to a different reservation station 222.

Fourthly, when the execution queue in the reservation station 223 has two vacant entries (i.e., when one queue status signal RS_C_LE_2 is asserted while other queue status signals RS_C_FULL and RS_C_LE_1 are both negated), the decision depends on other decoders 211 to 213 having priority over the decoder 214. More specifically, the decision circuit 401 operates as follows, depending on whether at least two of those decoders 211 to 213 specify the reservation station 223 as the destination of their instructions.

In the case where two or more of the three decoders 211 to 213 specify the reservation station 223 as the destination, their instructions are supposed to be enqueued to the reservation station 223 in preference to the one from the decoder 214. Since two or more of the selection signals IWR1_GroupC1_SEL, IWR2_GroupC1_SEL, and IWR3_GroupC1_SEL are asserted in this case, the AND gate 422 asserts its output. Selection signal IWR4_GROUP_C_TO_B is thus asserted. Accordingly the prospective destination for the instruction from the decoder 214 is changed to a different reservation station 222.

In the case where one or none of the three decoders 211 to 213 specifies the reservation station 223 as the destination, the instruction from the decoder 214 is allowed to go to the reservation station 223. Since only one of the three selection signals IWR1_GroupC1_SEL, IWR2_GroupC1_SEL, and IWR3_GroupC1_SEL is asserted in this case, the AND gates 421 to 424 negate their respective outputs, and selection signal IWR4_RS_C_SEL is thus asserted. Accordingly the instruction from the decoder 214 is enqueued to the reservation station 223 as originally specified by the decoder 214.

Fourthly, when the execution queue in the reservation station 223 has three vacant entries (i.e., when one queue status signal RS_C_LE_3 is asserted while other queue status signals RS_C_FULL, RS_C_LE_1, and RS_C_LE_2 are all negated), the decision depends on other decoders 211 to 213 having priority over the decoder 214. More specifically, the decision circuit 401 operates as follows, depending on whether all those decoders 211 to 213 specify the reservation station 223 as the destination of their instructions.

In the case where all the three decoders 211 to 213 specify the reservation station 223 as the destination, their instructions are supposed to be enqueued to the reservation station 223 in preference to the one from the decoder 214. Since selection signals IWR1_GroupC1_SEL, IWR2_GroupC1_SEL, and IWR3_GroupC1_SEL are all asserted in this case, the AND gates 423 and 424 assert their outputs. Selection signal IWR4_GROUP_C_TO_B is thus asserted. Accordingly the prospective destination for the instruction from the decoder 214 is changed to a different reservation station 222.

In the case where two or less of the three decoders 211 to 213 specify the reservation station 223 as the destination, the instruction from the decoder 214 is allowed to go to the reservation station 223. Since at least one selection signal IWR1_GroupC1_SEL, IWR2_GroupC1_SEL, or IWR3_GroupC1_SEL is negated in this case, the AND gates 421 to 424 negate their respective outputs. Selection signal IWR4_RS_C_SEL is thus asserted. Accordingly the instruction from the decoder 214 is enqueued to the reservation station 223 as originally specified by the decoder 214.

Figure 24:
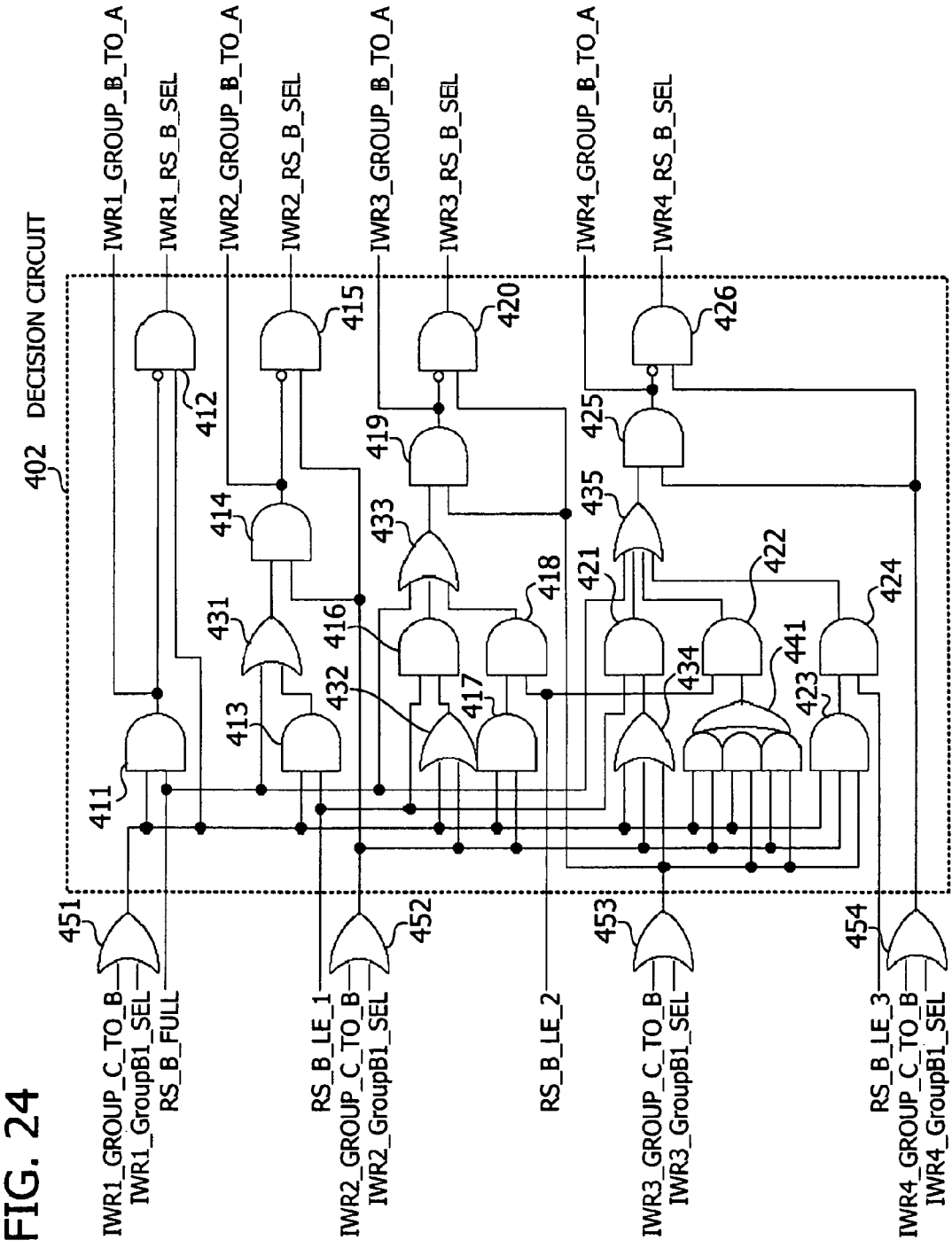
FIG. 24 is a second diagram illustrating an example internal structure of a dispatcher.

FIG. 24 is a second diagram illustrating an example internal structure of the dispatcher 400. Specifically, FIG. 24 illustrates another part of the dispatcher 400 which determines whether to use a reservation station 222 as the destination of an instruction. The illustrated circuit includes a decision circuit 402 and four OR gates 451 to 454 attached in front of the decision circuit 402.

The decision circuit 402 is identical to the foregoing decision circuit 401 of in FIG. 23 in terms of circuit structure and operation. FIG. 24 thus depicts the logic of this decision circuit 402 by using the same reference numerals used in the decision circuit 401 of FIG. 23. Because the decision circuit 402 operates similarly to the decision circuit 401, its details are not described here.

The topmost OR gate 451 in FIG. 24 receives selection signal IWR1_GroupC1_SEL from one decoder 211 and selection signal IWR1_GROUP_C_TO_B from the foregoing decision circuit 401 of FIG. 23. The output of this OR gate 451 is distributed to various components in the decision circuit 402, including AND gates 411 to 413, 417, and 423, OR gates 432 and 434, and first and second AND gates in the gate circuit 441.

The next OR gate 452 receives selection signal IWR2_GroupC1_SEL from another decoder 212 and selection signal IWR2_GROUP_C_TO_B from the foregoing decision circuit 401 of FIG. 23. The output of this OR gate 452 is distributed to various components in the decision circuit 402, including AND gates 414, 415, 417, and 423, OR gates 432 and 434, and the first and third AND gates in the gate circuit 441.

The next OR gate 453 receives selection signal IWR3_GroupC1_SEL from yet another decoder 213 and selection signal IWR3_GROUP_C_TO_B from the foregoing decision circuit 401 of FIG. 23. The output of this OR gate 452 is distributed to various components in the decision circuit 402, including AND gates 419, 420, and 423, OR gate 434, and the second and third AND gates in the gate circuit 441.

The bottommost OR gate 454 receives selection signal IWR4_GroupC1_SEL from still another decoder 214 and selection signal IWR4_GROUP_C_TO_B from the foregoing decision circuit 401 of FIG. 23. The output of this OR gate 454 is supplied to AND gates 425 and 426 in the decision circuit 402.

The output of one AND gate 411 in the decision circuit 402 is supplied as selection signal IWR1_GROUP_B_TO_A to another circuit described later in FIG. 25, which determines whether to enqueue an instruction to the reservation station 221. On the other hand, the output of another AND gate 412 is supplied as selection signal IWR1_RS_B_SEL from the decision circuit 402 to the reservation station 222. When the decoder 211 specifies the reservation station 222 as the destination of its instruction, selection signal IWR1_RS_B_SEL is asserted if that reservation station 222 has a vacant entry in its execution queue. In this case, the instruction from the decoder 211 is enqueued to the intended reservation station 222. If, on the other hand, the reservation station 222 has no vacant entries in its execution queue, selection signal IWR1_GROUP_B_TO_A is then asserted. In this case, the prospective destination of the instruction from the decoder 211 is changed to a different reservation station 221.

Figure 25:
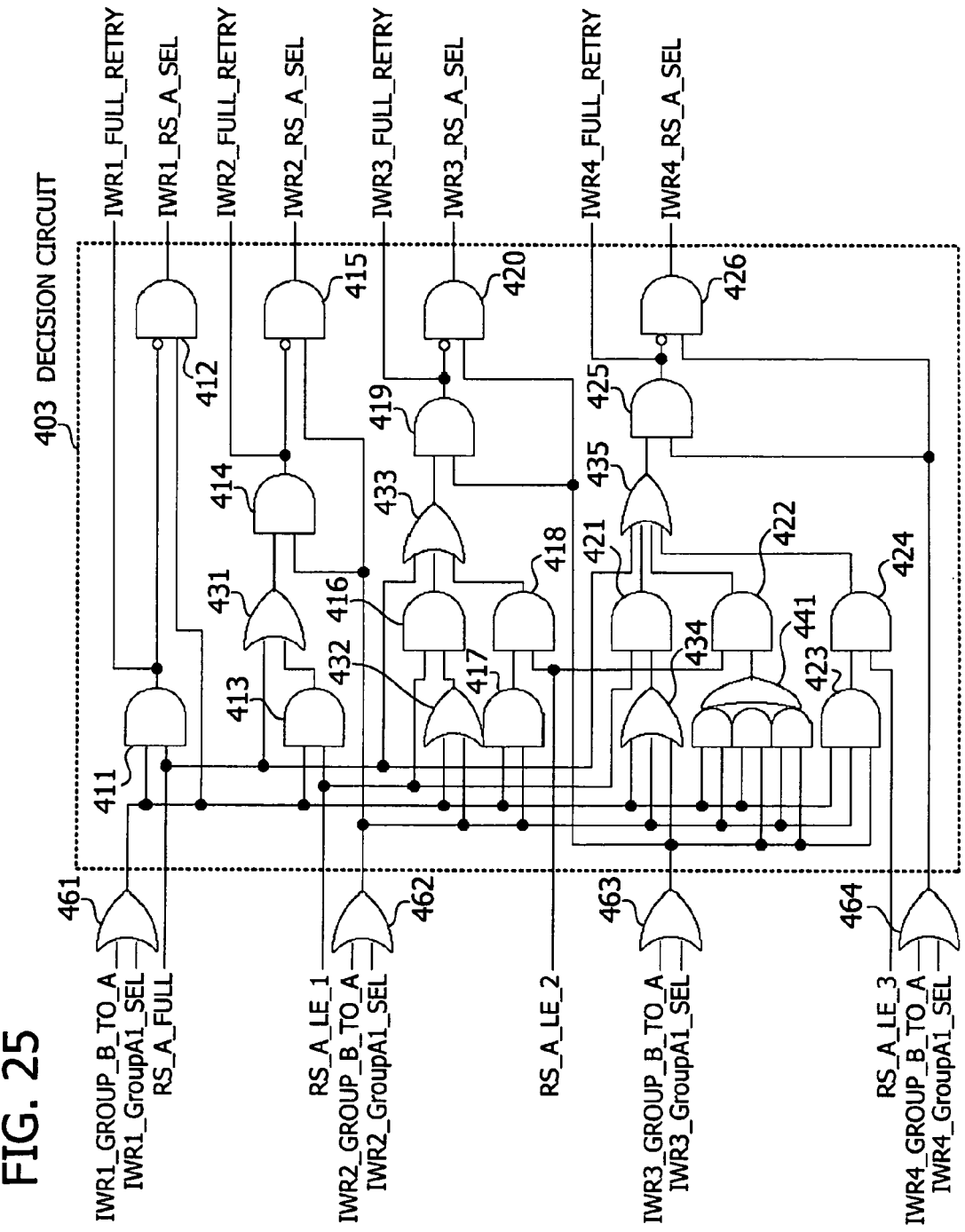
FIG. 25 is a third diagram illustrating an example internal structure of a dispatcher.

The output of yet another AND gate 414 in the decision circuit 402 is supplied as selection signal IWR2_GROUP_B_TO_A to another circuit illustrated in FIG. 25, which determines whether to enqueue an instruction to the reservation station 221. The output of still another AND gate 415 is supplied as selection signal IWR2_RS_B_SEL from the decision circuit 402 to the reservation station 222. When the decoder 212 specifies the reservation station 222 as the destination of its instruction, selection signal IWR2_RS_B_SEL is asserted if that reservation station 222 has a vacant entry in its execution queue for storing the instruction from the decoder 212. In this case, the instruction from the decoder 212 is enqueued to the intended reservation station 222. If, on the other hand, the reservation station 222 has no vacant entries in its execution queue for storing the instruction from the decoder 212, selection signal IWR2_GROUP_B_TO_A is then asserted. In this case, the prospective destination of the instruction from the decoder 212 is changed to a different reservation station 221.

The output of yet another AND gate 419 in the decision circuit 402 is supplied as selection signal IWR3_GROUP_B_TO_A to another circuit illustrated in FIG. 25, which determines whether to enqueue an instruction to the reservation station 221. The output of still another AND gate 420 is supplied as selection signal IWR3_RS_B_SEL from the decision circuit 402 to the reservation station 222. When the decoder 213 specifies the reservation station 222 as the destination of its instruction, selection signal IWR3_RS_B_SEL is asserted if that reservation station 222 has a vacant entry in its execution queue for storing the instruction from the decoder 213. In this case, the instruction from the decoder 213 is enqueued to the intended reservation station 222. If, on the other hand, the reservation station 222 has no vacant entries in its execution queue for storing the instruction from the decoder 213, selection signal IWR3_GROUP_B_TO_A is then asserted. In this case, the prospective destination of the instruction from the decoder 213 is changed to a different reservation station 221.

The output of yet another AND gate 425 in the decision circuit 402 is supplied as selection signal IWR4_GROUP_B_TO_A to another circuit illustrated in FIG. 25, which determines whether to enqueue an instruction to the reservation station 221. The output of still another AND gate 426 is supplied as selection signal IWR4_RS_B_SEL from the decision circuit 402 to the reservation station 222. When the decoder 214 specifies the reservation station 222 as the destination of its instruction, selection signal IWR4_RS_B_SEL is asserted if that reservation station 222 has a vacant entry in its execution queue for storing the instruction from the decoder 214. In this case, the instruction from the decoder 214 is enqueued to the intended reservation station 222. If, on the other hand, the reservation station 222 has no vacant entries in its execution queue for storing the instruction from the decoder 214, selection signal IWR4_GROUP_B_TO_A is then asserted. In this case, the prospective destination of the instruction from the decoder 214 is changed to a different reservation station 221.

FIG. 25 is a third diagram illustrating an example internal structure of the dispatcher 400. Specifically, FIG. 25 illustrates a part of the dispatcher 400 which determines whether to use a reservation station 221 as the destination of an instruction. The illustrated circuit includes a decision circuit 403 and four OR gates 461 to 464 attached in front of the decision circuit 403.

The decision circuit 403 is identical to the foregoing decision circuit 401 of in FIG. 23 in terms of circuit structure and operation. FIG. 25 thus depicts the logic of this decision circuit 403 by using the same reference numerals used in the decision circuit 401 of FIG. 23. Because the decision circuit 403 operates similarly to the decision circuit 401, its details are not described here.

The topmost OR gate 461 in FIG. 25 receives selection signal IWR1_GroupA1_SEL from one decoder 211 and selection signal IWR1_GROUP_B_TO_A from the foregoing decision circuit 402 of FIG. 24. The output of this OR gate 461 is distributed to various components in the decision circuit 403, including AND gates 411 to 413, 417, and 423, OR gates 432 and 434, and first and second AND gates in the gate circuit 441.

The next OR gate 462 receives selection signal IWR2_GroupA1_SEL from another decoder 212 and selection signal IWR2_GROUP_B_TO_A from the decision circuit 402 of FIG. 24. The output of this OR gate 462 is distributed to various components in the decision circuit 403, including AND gates 414, 415, 417, and 423, OR gates 432 and 434, and the first and third AND gates in the gate circuit 441.

The next OR gate 463 receives selection signal IWR3_GroupA1_SEL from yet another decoder 213 and selection signal IWR3_GROUP_B_TO_A from the decision circuit 402 of FIG. 24. The output of this OR gate 463 is distributed to various components in the decision circuit 403, including AND gates 419, 420, and 423, OR gate 434, and the second and third AND gates in the gate circuit 441.

The bottommost OR gate 464 receives selection signal IWR4_GroupA1_SEL from still another decoder 214 and selection signal IWR4_GROUP_B_TO_A from the decision circuit 402 of FIG. 24. The output of this OR gate 464 is supplied to AND gates 425 and 426 in the decision circuit 403.

The output of one AND gate 411 in the decision circuit 403 is supplied as output control signal IWR1_FULL_RETRY to one instruction word register 201. The output of the subsequent AND gate 412 is supplied as selection signal IWR1_RS_A_SEL from the decision circuit 403 to the reservation station 221. When the decoder 211 specifies the reservation station 221 as the destination of its instruction, selection signal IWR1_RS_A_SEL is asserted if that reservation station 221 has a vacant entry in its execution queue. In this case, the instruction from the decoder 211 is enqueued to the intended reservation station 221. If, on the other hand, the reservation station 221 has no vacant entries in its execution queue, output control signal IWR1_FULL_RETRY is then asserted, which makes the instruction word register 201 stop providing new instructions.

The output of another AND gate 414 in the decision circuit 403 is supplied as output control signal IWR2_FULL_RETRY to another instruction word register 202. Also, the output of the subsequent AND gate 415 is supplied as selection signal IWR2_RS_A_SEL from the decision circuit 403 to the reservation station 221. When the decoder 212 specifies the reservation station 221 as the destination of its instruction, selection signal IWR2_RS_A_SEL is asserted if that reservation station 221 has a vacant entry in its execution queue for storing the instruction from the decoder 212. In this case, the instruction from the decoder 212 is enqueued to the intended reservation station 221. If, on the other hand, the reservation station 221 has no vacant entries for storing the instruction from the decoder 212, output control signal IWR2_FULL_RETRY is then asserted, which makes the instruction word register 202 stop providing new instructions.

The output of yet another AND gate 419 in the decision circuit 403 is supplied as output control signal IWR3_FULL_RETRY to yet another instruction word register 203. The output of the subsequent AND gate 420 is supplied as selection signal IWR3_RS_A_SEL from the decision circuit 403 to the reservation station 221. When the decoder 213 specifies the reservation station 221 as the destination of its instruction, selection signal IWR3_RS_A_SEL is asserted if that reservation station 221 has a vacant entry in its execution queue for storing the instruction from the decoder 213. In this case, the instruction from the decoder 213 is enqueued to the intended reservation station 221. If, on the other hand, the reservation station 221 has no vacant entries for storing the instruction from the decoder 212, output control signal IWR3_FULL_RETRY is then asserted, which makes the instruction word register 203 stop providing new instructions.

The output of still AND gate 425 in the decision circuit 403 is supplied as output control signal IWR4_FULL_RETRY to still another instruction word register 204. Also, the output of the subsequent AND gate 426 is supplied as selection signal IWR4_RS_A_SEL from the decision circuit 403 to the reservation station 221. When the decoder 214 specifies the reservation station 221 as the destination of its instruction, selection signal IWR4_RS_A_SEL is asserted if that reservation station 221 has a vacant entry in its execution queue for storing the instruction from the decoder 214. In this case, the instruction from the decoder 214 is enqueued to the reservation station 221. If, on the other hand, the reservation station 221 has no vacant entries for storing the instruction from the decoder 214, output control signal IWR4_FULL_RETRY is then asserted, which makes the instruction word register 204 stop providing new instructions.

The instruction controller 200 described above in FIGS. 22 to 25 prioritizes decoders 211 to 214 such that instructions from a higher-priority decoder are assigned vacant entries of an execution queue in a reservation stations in preference to other decoders. This feature makes it possible to execute instructions without stopping enqueuing operations unless necessary even when the same reservation station is selected as the destination of instructions from two or more decoders. This feature brings a higher degree of parallelism and thus enhances the efficiency of processing in the processing apparatus.

In the above fifth embodiment, each decoder determines the destination of its instructions by applying a selection method described in second embodiment. As an alternative, the fifth embodiment may be modified to use another method such as the one discussed in the third embodiment or fourth embodiment. In the case of applying the selection method of the third embodiment, the dispatcher 400 may be configured to recognize that the reservation station 222 has been specified as the destination of an instruction, when the decoder 211 asserts one of the selection signals IWR1_GroupB2_SEL, IWR1_GroupB2_Swap1, and IWR1_GroupB2_Swap2. Similarly, in the case of applying the selection method of the fourth embodiment, the dispatcher 400 may be configured to recognize that the reservation station 222 has been specified as the destination of an instruction, when the decoder 21 asserts either of the selection signals IWR1_GroupB3_SEL and IWR1_GroupB3_Swap.

(f) Sixth Embodiment

The foregoing second to fifth embodiments are designed to select an appropriate execution unit according to the combination pattern of source operands before enqueuing an instruction to a reservation station. Alternatively, the destination execution unit of an instruction may be selected after the instruction is issued from a reservation station as will be described below as a sixth embodiment.

Figure 26:
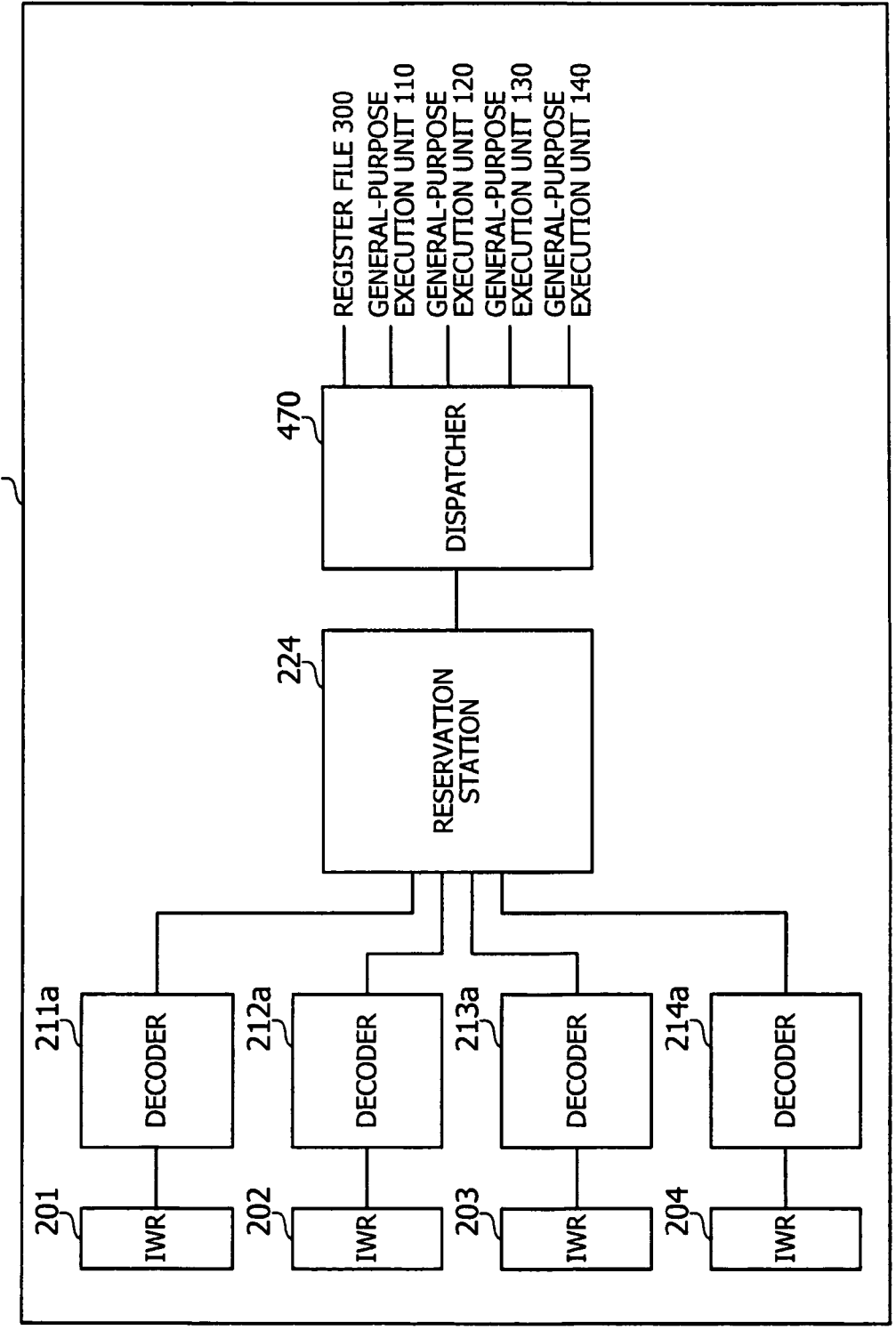
FIG. 26 illustrates an example of an instruction controller according to a sixth embodiment.

FIG. 26 illustrates an example of an instruction controller according to the sixth embodiment. FIG. 26 shares some reference numerals with FIG. 9 to designate similar elements.

The illustrated reservation station 224 of FIG. 26 is supposed to enqueue decoded instructions that request computations executable with, for example, general-purpose execution units. Decoders 211a to 214a decode instructions supplied from their corresponding instruction word registers 201 to 204 and enqueue them to the reservation station 224 associated with execution units capable of executing computations specified by the respective instructions.

When an instruction is issued from the reservation station 224, a dispatcher 470 selects which general-purpose execution unit to use to execute the specified computation, based on the combination pattern of source operands in the instruction. This dispatcher 470 may be configured to execute one of the procedures discussed previously in, for example, FIGS. 11, 15, and 18 to select an appropriate general-purpose execution unit for the instruction. For example, in the case of implementing the procedure of FIG. 15 or FIG. 18, the dispatcher 470 may include a circuit to swap the source operands of a given instruction. As an alternative method, the instructions necessitating swapping of source operands (i.e., those that match with the foregoing pattern 3) may be directed not to the general-purpose execution units 120 and 130, but to the general-purpose execution unit 110. When this is the case, there is no need to swap the source operands of instructions.

The sixth embodiment discussed above adds more execution units while suppressing the increase of read paths from a register file 300 to execution units.

(g) Conclusion

Various embodiments of a processing apparatus and processing method have been described. The above embodiments enhance the computational performance while suppressing the increase of read paths from registers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A processing apparatus comprising:
   a first execution unit which performs computation on two operand inputs each being selectable between read data from a register and an immediate value;
   a second execution unit which performs computation on two operand inputs, one of which is selectable between read data from a register and an immediate value, and the other of which is only of an immediate value;
   a control unit which determines, based on a received instruction specifying a computation on first and second source operands, whether each of the first and second source operands specifies read data from a register or an immediate value;
   a first reservation station, coupled to the first execution unit and including a first execution queue to temporarily store instructions, to dispatch the instructions in the first execution queue to the first execution unit in an order that the instructions are ready for dispatching;
   a second reservation station, coupled to the second execution unit and including a second execution queue to temporarily store instructions, to dispatch the instructions in the second execution queue to the second execution unit in an order that the instructions are ready for dispatching;
   wherein:
      the control unit enqueues the received instruction to the second execution queue in the second reservation station, when one or both of the first and second source operands in the received instruction are determined to specify an immediate value, and when that second execution queue has a vacant entry,
      the control unit enqueues the received instruction to the first execution queue in the first reservation station, when one or both of the first and second source operands in the received instruction are determined to specify an immediate value, and when the second execution queue has no vacant entries,
      the control unit causes the first execution unit to execute computation specified by each instruction dispatched thereto, and
      the control unit causes the second execution unit to execute computation specified by each instruction dispatched thereto.

2. The processing apparatus according to claim 1, further comprising:
   a third execution unit to perform computation on two operand inputs both being only of immediate values; and
   a third reservation station, coupled to the third execution unit and including a third execution queue to temporarily store instructions, to dispatch the instructions in the third execution queue to the third execution unit in an order that the instructions are ready for dispatching;
   wherein the control unit enqueues the received instruction to the third execution unit when the first and second source operands are both determined to specify immediate values, and causes the third execution unit to execute computation specified by the instruction dispatched thereto.

3. The processing apparatus according to claim 1, wherein:
   the control unit comprises a plurality of decision units to process a plurality of instructions received in parallel, each decision unit determining which of the first and second execution units is to execute a computation specified by an instruction;
   the plurality of decision units are prioritized; and
   when two or more of the decision units have simultaneously determined to use the second execution unit to execute the computations specified by the received instructions, the control unit enqueues, to a vacant entry in the second execution queue in the second reservation station coupled to the second execution unit, the instruction processed by one of the two or more decision units which has a highest priority.

4. The processing apparatus according to claim 3, wherein the control unit enqueues the instruction processed by another one of the two or more decision units to a vacant entry of the first execution queue in the first reservation station coupled to the first execution unit, when the second reservation station associated with the second execution unit has become unable to accept the instruction processed by said another one of the two or more decision units as a result of said enqueuing of the instruction processed by the decision unit having the highest priority.

5. A processing method comprising:
   determining, based on a received instruction specifying a computation on first and second source operands, whether each of the first and second source operands specifies read data from a register or an immediate value;
   enqueuing a received instruction to a second execution queue in a second reservation station associated with a second execution unit, when one or both of first and second source operands in the received instruction are determined to specify an immediate value, and when the second execution queue has a vacant entry;
   enqueuing the received instruction to a first execution queue in a first reservation station associated with the first execution unit when one or both of the first and second source operands in the received instruction are determined to specify an immediate value, and when the second execution queue has no vacant entries; and
   dispatching instructions in the first and second execution queues respectively to first and second execution units in an order that the instructions are ready for dispatching;
   causing the first execution unit to execute computation specified by each instruction dispatched thereto, the first execution unit being configured to perform computation on two operand inputs each being selectable between read data from a register and an immediate value; and
   causing the second execution unit to execute computation specified by each instruction dispatched thereto the second execution unit being configured to perform computation on two operand inputs, one of which is selectable between read data from a register and an immediate value, and the other of which is only of an immediate value.

* * * * *